Jan. 1, 1952 K. C. SHERMAN 2,580,853

SETTING-UP TABLE FOR BOWLING PIN SETTING MACHINES

Filed Nov. 1, 1945 24 Sheets-Sheet 1

INVENTOR.
Kenneth C. Sherman.
BY
Brown, Jackson, Boettcher & Dienner
Attys.

Jan. 1, 1952 K. C. SHERMAN 2,580,853

SETTING-UP TABLE FOR BOWLING PIN SETTING MACHINES

Filed Nov. 1, 1945 24 Sheets-Sheet 2

INVENTOR.
Kenneth C. Sherman.
BY
Brown, Jackson, Boettcher & Dienner
Attys.

Jan. 1, 1952 K. C. SHERMAN 2,580,853

SETTING-UP TABLE FOR BOWLING PIN SETTING MACHINES

Filed Nov. 1, 1945 24 Sheets-Sheet 3

INVENTOR.
Kenneth C. Sherman.
BY
Brown, Jackson, Boettcher & Dienner
Attys

Jan. 1, 1952 K. C. SHERMAN 2,580,853

SETTING-UP TABLE FOR BOWLING PIN SETTING MACHINES

Filed Nov. 1, 1945 24 Sheets-Sheet 4

INVENTOR.
Kenneth C. Sherman.
BY
Brown, Jackson, Boettcher & Dienner
Att'ys

Jan. 1, 1952 K. C. SHERMAN 2,580,853

SETTING-UP TABLE FOR BOWLING PIN SETTING MACHINES

Filed Nov. 1, 1945 24 Sheets-Sheet 5

INVENTOR.
Kenneth C. Sherman.
BY
Brown, Jackson, Boettcher & Dienner
Attys

Jan. 1, 1952 K. C. SHERMAN 2,580,853

SETTING-UP TABLE FOR BOWLING PIN SETTING MACHINES

Filed Nov. 1, 1945 24 Sheets-Sheet 6

Inventor:
Kenneth C. Sherman.
By Brown, Jackson, Boettcher & Dienner
Attys.

Jan. 1, 1952 K. C. SHERMAN 2,580,853

SETTING-UP TABLE FOR BOWLING PIN SETTING MACHINES

Filed Nov. 1, 1945 24 Sheets-Sheet 7

Inventor:
Kenneth C. Sherman.
By Brown, Jackson, Boettcher & Dienner
Attys.

Jan. 1, 1952 K. C. SHERMAN 2,580,853

SETTING-UP TABLE FOR BOWLING PIN SETTING MACHINES

Filed Nov. 1, 1945 24 Sheets-Sheet 8

Inventor:
Kenneth C. Sherman.
By Brown, Jackson, Boettcher & Dienner
Attys.

Jan. 1, 1952 K. C. SHERMAN 2,580,853

SETTING-UP TABLE FOR BOWLING PIN SETTING MACHINES

Filed Nov. 1, 1945 24 Sheets-Sheet 9

Inventor:
Kenneth C. Sherman.
By Owen, Jackson, Brittle & Dienes
Attys.

Jan. 1, 1952 K. C. SHERMAN 2,580,853

SETTING-UP TABLE FOR BOWLING PIN SETTING MACHINES

Filed Nov. 1, 1945 24 Sheets-Sheet 10

INVENTOR.
Kenneth C. Sherman
BY
Brown, Jackson, Boettcher & Dienner
Attys.

Inventor:
Kenneth C. Sherman.
By Brown, Jackson, Boettcher & Dienner
Attys.

Jan. 1, 1952 K. C. SHERMAN 2,580,853

SETTING-UP TABLE FOR BOWLING PIN SETTING MACHINES

Filed Nov. 1, 1945 24 Sheets-Sheet 12

INVENTOR.
Kenneth C. Sherman
BY
[signature]
Att'ys.

Jan. 1, 1952 K. C. SHERMAN 2,580,853

SETTING-UP TABLE FOR BOWLING PIN SETTING MACHINES

Filed Nov. 1, 1945 24 Sheets-Sheet 13

INVENTOR.
Kenneth C. Sherman
BY
Brown, Jackson, Boettcher & Dienner
Attys

Jan. 1, 1952 K. C. SHERMAN 2,580,853

SETTING-UP TABLE FOR BOWLING PIN SETTING MACHINES

Filed Nov. 1, 1945 24 Sheets-Sheet 14

INVENTOR.
Kenneth C. Sherman.
BY
Brown, Jackson, Boettcher & Dienner
Attys.

Jan. 1, 1952 K. C. SHERMAN 2,580,853

SETTING-UP TABLE FOR BOWLING PIN SETTING MACHINES

Filed Nov. 1, 1945 24 Sheets-Sheet 15

INVENTOR.
Kenneth C. Sherman.
BY
Brown, Jackson, Boettcher & Dienner
Attys.

SETTING-UP TABLE FOR BOWLING PIN SETTING MACHINES

Filed Nov. 1, 1945

INVENTOR.
Kenneth C. Sherman.
BY
Brown, Jackson, Boettcher & Dienner
Attys.

SETTING-UP TABLE FOR BOWLING PIN SETTING MACHINES

Filed Nov. 1, 1945 24 Sheets-Sheet 17

INVENTOR.
Kenneth C. Sherman
BY
Brown, Jackson, Boettcher & Dienner
Attys.

Jan. 1, 1952 K. C. SHERMAN 2,580,853

SETTING-UP TABLE FOR BOWLING PIN SETTING MACHINES

Filed Nov. 1, 1945 24 Sheets-Sheet 18

INVENTOR.
Kenneth C. Sherman.
BY
Brown, Jackson, Boettcher & Dienner
Attys.

SETTING-UP TABLE FOR BOWLING PIN SETTING MACHINES

Filed Nov. 1, 1945 24 Sheets-Sheet 19

INVENTOR.
Kenneth C. Sherman
BY Brown, Jackson, Boettcher & Dienner
Attys.

Jan. 1, 1952 K. C. SHERMAN 2,580,853

SETTING-UP TABLE FOR BOWLING PIN SETTING MACHINES

Filed Nov. 1, 1945 24 Sheets-Sheet 20

INVENTOR.
Kenneth C. Sherman.
BY
Brown, Jackson, Boettcher & Dienner
Att'ys

Jan. 1, 1952 K. C. SHERMAN 2,580,853

SETTING-UP TABLE FOR BOWLING PIN SETTING MACHINES

Filed Nov. 1, 1945 24 Sheets-Sheet 21

INVENTOR.
Kenneth C. Sherman.
BY
[illegible]
Attys.

Jan. 1, 1952 K. C. SHERMAN 2,580,853

SETTING-UP TABLE FOR BOWLING PIN SETTING MACHINES

Filed Nov. 1, 1945 24 Sheets-Sheet 22

INVENTOR.
Kenneth C. Sherman.
BY
Brown, Jackson, Boettcher & Dienner
Attys.

INVENTOR.
Kenneth C. Sherman
BY Brown, Jackson, Boettcher & Dienner.
Attys.

Jan. 1, 1952 K. C. SHERMAN 2,580,853

SETTING-UP TABLE FOR BOWLING PIN SETTING MACHINES

Filed Nov. 1, 1945 24 Sheets-Sheet 24

INVENTOR.
Kenneth C. Sherman.
BY
Brown, Jackson, Boettcher & Dienner
Attys.

Patented Jan. 1, 1952 2,580,853

UNITED STATES PATENT OFFICE 2,580,853

SETTING-UP TABLE FOR BOWLING PIN SETTING MACHINES

Kenneth C. Sherman, New London, Conn., assignor to Electric Boat Company, Groton, Conn., a corporation of New Jersey Application November 1, 1945, Serial No. 626,013

12 Claims. (Cl. 273—43)

This invention relates to machines for setting pins, such as duckpins and tenpins, and for analogous purposes.

Numerous attempts have been made to produce machines for setting pins, such as duckpins and tenpins, but, so far as I am aware, none of such attempts have proved successful. It is important, in setting pins, that the pins be placed accurately on the alley and that pins which have been moved off spot be replaced on the alley in precisely the same off spot positions which they occupied before being removed therefrom. It is also desirable that delay due to setting up of the pins be avoided. By the machine of my invention I have met the above requirements, that is, the pins are spotted accurately upon the alley, off spot pins are replaced upon the alley accurately in the off spot positions which they occupied when removed from the alley, and no appreciable delay is incurred due to the setting up operation.

The main object of my invention is to provide a setting up table having pin grippers and timing means therefor, in conjunction with appropriate controls, which table will set the pins accurately on spot on the alley, in a resetting operation, and will pick up standing pins from the alley and replace them thereon in the same positions which they occupied when picked up, particularly off spot pins, in what I term the dead wood operation. More particularly, I provide a setting up table vertically adjustable to several positions for effecting the resetting operation and the dead wood operation, this table having pairs of apposed pin gripping members movable toward and away from each other, such members having means disposed to grip the necks of the pins, in the resetting operation, and means disposed to grip the neck and shoulder portions of pins standing on the alley, in the deadwood operation. The pin gripping members are provided with feelers which cooperate with the pins for controlling the travel of such members in a manner to assure that they will be equally spaced from a pin therebetween preliminary to their final closing movement into gripping engagement with the pin.

In the drawings:

Figure 14 is a perspective front view of the pin carriage and the latch releasing and control means therefor and for the pin receiving table driving means, and associated parts, showing also certain of the control and guide means for the pin distributor, with certain parts broken away and shown in section;

Figure 37:
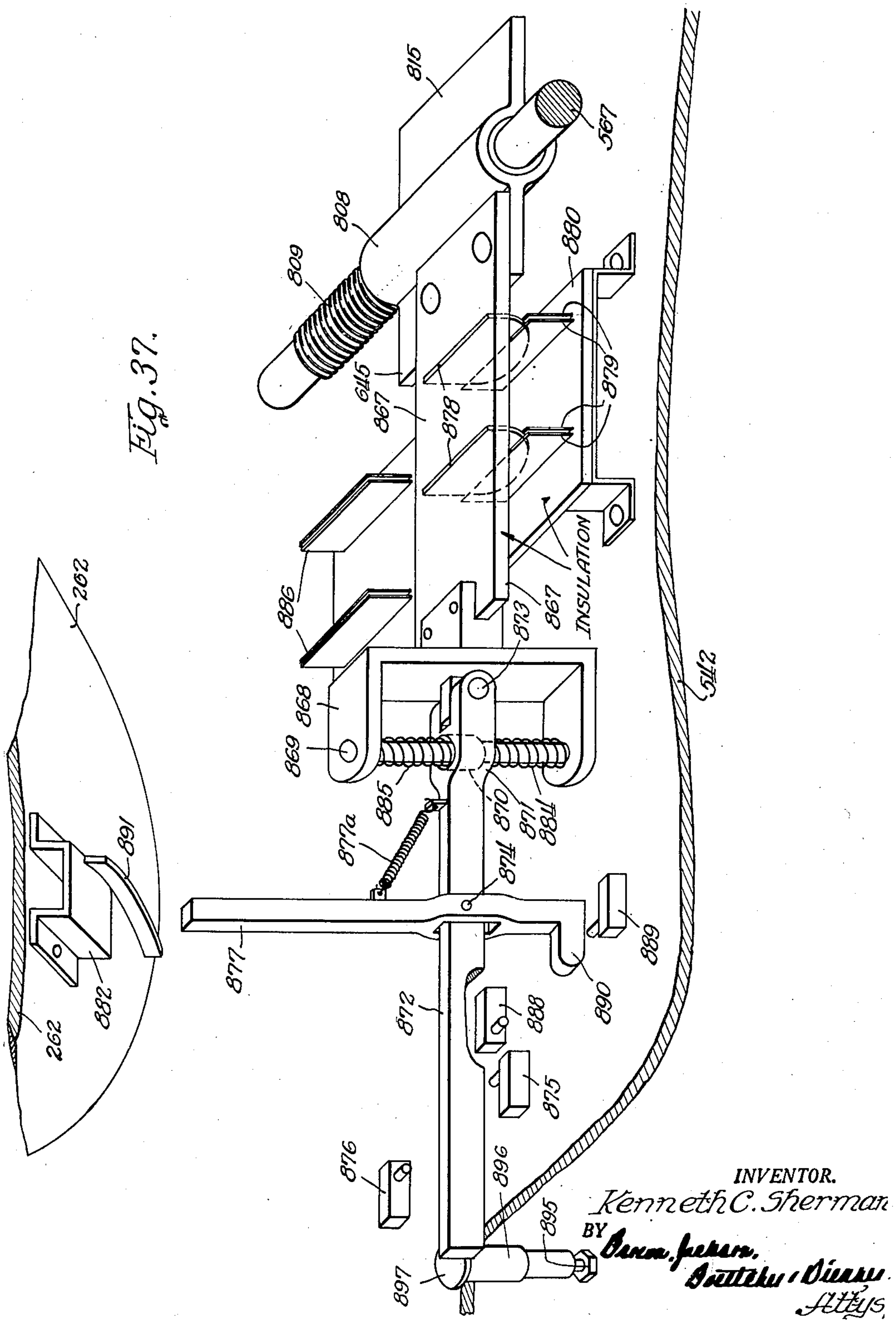
Figure 38:
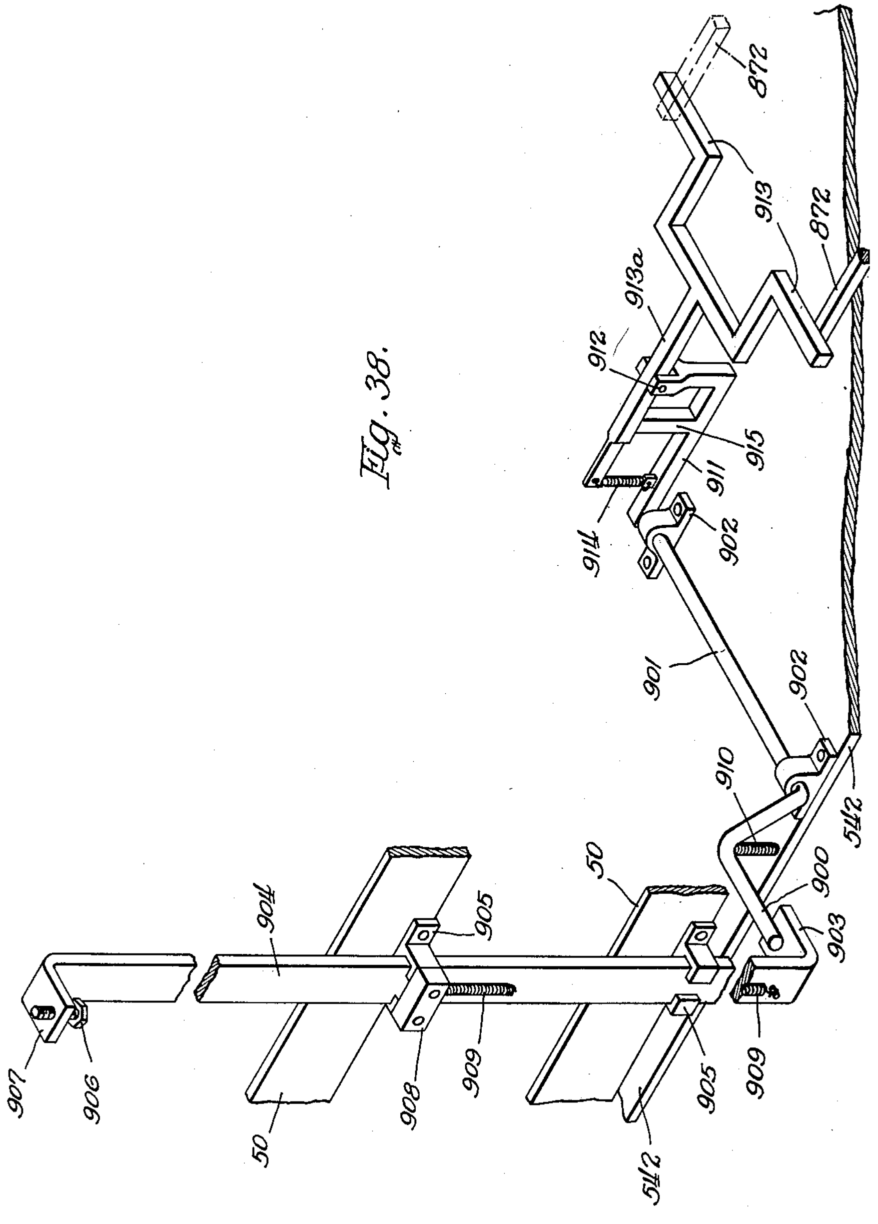

Figure 37 is an isometric view of the setting up table and the associated motor control and timing mechanisms, the rotatable pin receiving table being shown fragmentarily and in section in underneath view and the setting up table being broken away and shown in section, certain parts being broken away and certain other parts being omitted for clearness of illustration; and Figure 38 is an isometric view of the mechanism for controlling the circuit of the motor which drives the timing mechanism and the pin gripping members, in the movement of the setting up table during the dead wood or replacing operation, certain parts being broken away and shown in section and certain other parts being omitted for clearness of illustration.

In many of the figures of the drawings, only those parts with which the particular figure has to do have been shown, other parts being omitted or indicated more or less diagrammatically. The various mechanisms are thus shown more clearly than would be possible if it were attempted to show them in association with all of the other related mechanisms, and their relation and cooperation will be clear from the drawings.

In the following disclosure I shall describe the machine of my invention as used for setting duckpins, by way of example. It will be understood, however, that by appropriate change in shape or size, or both, of parts of the machine it may be used also for setting tenpins, candlepins and analogous play pieces.

Figures 1, 2:
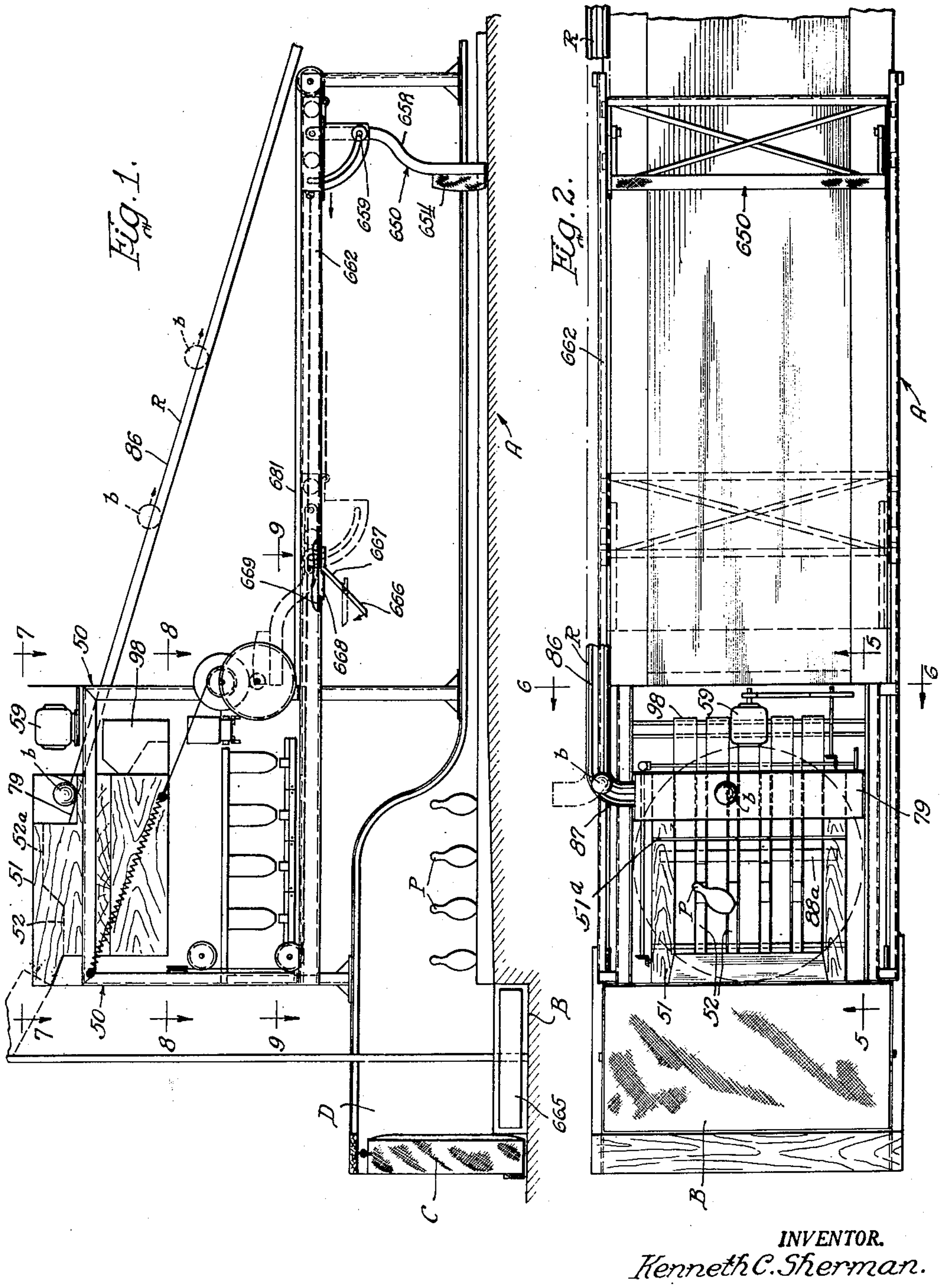
Figure 1 is a side view of a conventional type of bowling alley intended for the playing of duckpins, with a pin setting machine embodying my invention associated with the alley.
Figure 2 is a plan view of the alley and the machine of Figure 1.

In Figures 1 and 2 I have illustrated the machine of my invention, by way of example, as applied to a bowling alley A of conventional type, such as used for the playing of duckpins, having a pit B, a back stop or pad C, kickbacks D, and a return rail R extending along one side of the alley for returning the balls to the forward end or front end thereof, at which there is located a post; all as is well known in the art. The pin setting machine of my invention comprises a suitably constructed and braced frame 50 conveniently formed, in the main, of angle iron construction. Frame 50 is substantially rectangular in plan, overlies the pin area at the rearward end of the alley A, and conveniently is mounted on the kickbacks D. A suitably constructed hopper 51 is mounted in the upper portion of frame 50. Vibrator bars 52, of considerable height, are rockably mounted at their rearward ends on a common shaft 53 (Figures 5, 6 and 7) extending transversely of hopper 51, and extend forwardly from this shaft in parallel spaced relation, each of the bars 52 being provided with an upwardly and forwardly inclined shoulder 54, it being noted that the shoulders of the bars 52 are staggered, that is, the shoulders of alternate bars are disposed further forward than those of the other bars, for a purpose to be explained later. Each of the bars 52 is provided with a reduced forward extension 55 carrying, at its forward end, a roller 56. The rollers 56 are held in contact with eccentrics 57, fixed on a shaft 58 rotatably mounted on the front wall of hopper 51 transversely thereof, by tension springs 54a anchored to extensions 55 of bars 52 and to the front wall of hopper 51. Shaft 58 is driven from an electric motor 59, suitably mounted on frame 50, by a belt 60 passing about a pulley 61 secured on the motor shaft, and about a pulley 62 secured on a countershaft 63 perpendicular to shaft 58 and rotatably mounted at its forward end on frame 50 and, at its rearward end, in a bracket 64 fixed to the front of hopper 51. Normally, the motor 59 operates continuously while the pin setting machine is in use. A bevel gear 65 (Figure 7), keyed on the rearward end of countershaft 63, meshes with a bevel gear 66 keyed on shaft 58, whereby the latter shaft is driven from the motor 59. Bevel gear 66 is disposed at one end of shaft 58 and a bevel gear 67, keyed on the other end of this shaft, meshes with a bevel gear 68, keyed on the upper end of a vertical shaft 69 rotatably mounted on hopper 51 and on frame 50. It will be seen that during operation of motor 59 shaft 58 is rotated and, through the eccentrics 57 and rollers 56, causes reciprocation of the vibrator bars 52 in alternately opposite relation.

A second bevel gear 70, secured on shaft 69, meshes with a bevel gear 71 keyed on the forward end of a horizontal shaft 72 rotatably mounted along the right hand side of the hopper 51. A bevel gear 73 is keyed on the rearward end of shaft 72, and meshes with a bevel gear 74, keyed on the right hand end of a shaft 75 rotatably mounted across the back of hopper 51. A plurality of worms 76 are keyed on shaft 75, spaced apart lengthwise thereof, these worms respectively meshing with worm wheels 77 keyed on the reduced rearward ends of pin straightening shafts 78 extending from front to back of hopper 51 in underlying relation to the vibrator bars 52, shafts 78 being rotatably mounted in the front and the back walls of the hopper and inclined downwardly and forwardly thereof. As will be noted more clearly from Figure 7, a single shaft 78 is disposed beneath each side of hopper 51 and extends slightly inward therebeyond transversely of the hopper, the remaining shafts 78 being arranged in pairs, with the shafts of each pair underlying one of the bars 52 and projecting slightly beyond the sides thereof. The bars 52 are spaced apart a distance slightly less than the maximum diameter of a duckpin P (or a tenpin), as will be clear from Figure 7. The reduced forward portions 55 of the bars 52 underlie a ball receiving trough 79 of appropriate cross sectional contour pivoted, at 80, at its mid-length (Figure 6), on the inner face of the front wall of the hopper 51 and provided, a short distance from each end, with a slot 81 receiving a cap screw 82 threading into the front wall of the hopper. At each end of its bottom wall, adjacent the rear thereof, trough 79 has secured thereto a downwardly extending finger 83 (Figure 5) having a slot 84 therein receiving a cap screw 85 screwing into the side wall of hopper 51. Trough 79 is thus mounted for adjustment about the axis of pivot 80 so as to be inclined downward toward either side of the hopper 51 for delivering the balls from either side of the machine, as desired. Referring to Figures 1 and 2, the ball return rail R is provided with an upwardly and rearwardly inclined portion 86 of concaved or trough shape in cross section, having at its upper end a curved element 87 disposed for reception of a ball *b* delivered thereto from the trough 79, the latter being inclined downward toward element 87. It will be understood that the balls *b* delivered from trough 79 roll by gravity down portion 86 of rail R and forward along the rail into position at the post.

Figure 5:
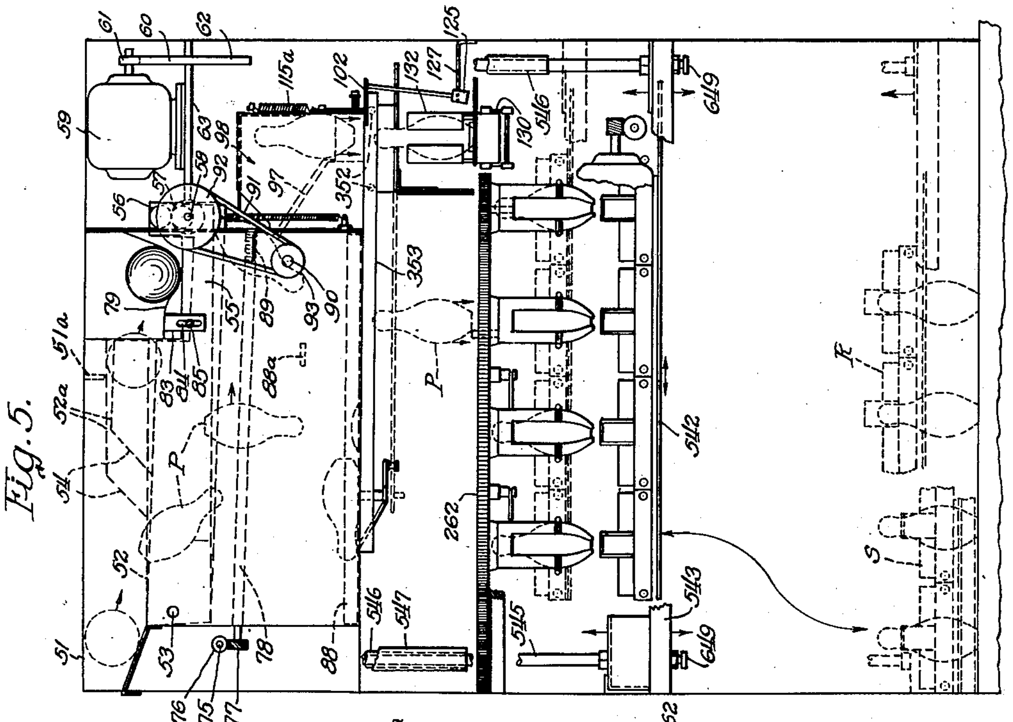
Figure 5 is a sectional view of the machine, with certain parts broken away and certain other parts shown in elevation, on an enlarged scale, taken substantially on line 5—5 of Figure 2; certain other parts being omitted for clearness of illustration.

When a player has completed a frame, any pins remaining on the alley, either standing or down, are swept into the pit B. The pins and the balls are raised from the pit, by a pit elevator, and discharged into the hopper 51, as will be described more fully later. The pins and the balls first fall upon the reciprocating bars 52, and due to the reciprocating action of these bars, move forward therealong toward the front of hopper 51. Such pins as do not at first pass downward between the bars 52 are brought into contact with the shoulders 54 thereof and thereby turned into parallelism with bars 52, between which they then pass. The pins then pass downward between the pin straightening shafts 78 until they are suspended thereby in inverted position, as indicated in Figure 5, the distance between any two of the shafts 78 which receive the pins between them being but slightly less than the maximum diameter of a pin. The shafts 78 are rotated in alternately opposite directions by means of the worms 76 and the cooperating worm wheels 77, above mentioned. Due to the forward and downward inclination of shafts 78, and the alternately opposite rotation thereof, the pins, supported in inverted position, are fed toward the front of hopper 51. During their forward travel each of the pins is also rotated about its own axis, due to the opposite rotation of the shafts 78 supporting that pin. In the event the pin is chipped or broken, thereby appreciably reducing its maximum diameter, such a pin will pass downward between the shafts 78 and will be deposited in one or the other of two defective pin trays 88, removably mounted in hopper 51 under the shafts 78. A defective pin thus discharged from the machine is, of course, replaced by a good pin, it being understood that the hopper always contains a sufficient number of good pins to assure operation of the machine in the intended manner. A bar 88a extends across hopper 51, a suitable distance from the front thereof, in position to be contacted by pins supported on shafts 78, and serves to stop oscillation of such pins.

Figure 7:
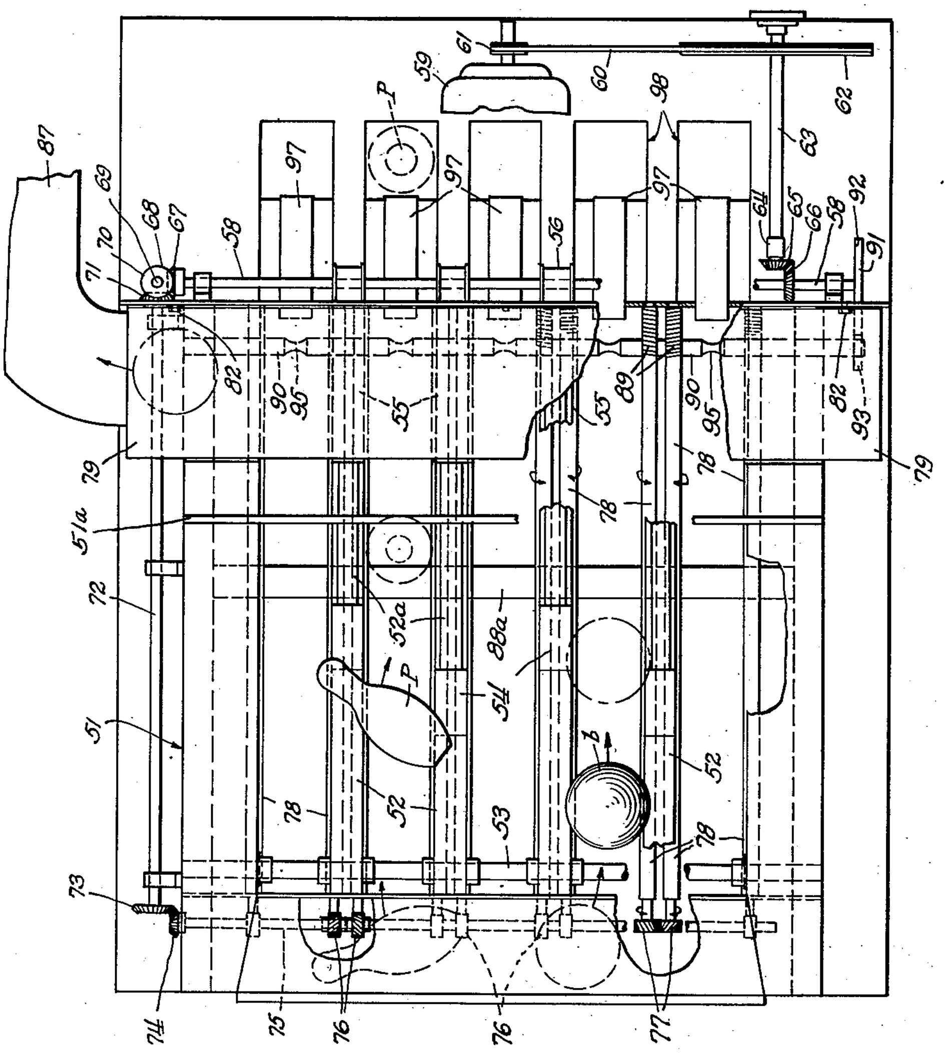
Figure 7 is a plan view, on an enlarged scale, of the machine of Figure 2, with certain parts broken away to show the underlying parts, taken substantially on line 7—7 of Figure 1, certain other parts being omitted for clearness of illustration.

Each of the shafts 78 is provided with inclined grooves 89 at its forward portion, extending a short distance therealong, the grooves 89 of each pair of shafts 78 being oppositely related, as shown in Figure 7. A pin tipping shaft 90 is rotatably mounted in hopper 51 and extends thereacross below the threaded portions 89 of shafts 78. This shaft 90 is rotated from shaft 58, by means of a belt 91 passing about a pulley 92 secured on shaft 58 and about a pulley 93 secured on shaft 90. The latter shaft is provided with restrictions 95 suitably spaced therealong to receive the necks of pins P travelling along the shafts 78. The balls *b*, which enter the hopper 51 with the pins, are of greater diameter than the distance between adjacent ones of the vibrator bars 52 and, in the vibration thereof, travel along these bars toward the trough 79. The upward extensions $52^a$ of bars 52, providing the shoulders 54, are of materially less thickness than the body portion of the respective bars, being spaced a sufficient distance apart to accommodate passage of the balls *b* therebetween. The balls are discharged into the trough 79, from which they are delivered to element 87 and inclined portion 86 of the return rail R, as above stated. The two outer bars 52 are, of course, properly spaced from the side walls of the hopper to deliver the balls to the trough in the manner stated.

A pin stop bar $51^a$ (Figures 2, 5 and 7) extends across hopper 51, above extensions $52^a$ of bars 52 and a short distance in back of ball trough 79. Occasionally, a ball may travel forward along the bars 52 so rapidly that a pin on the bars 52, in the path of the ball, would be propelled by the ball over the shoulders 54 and into trough 79, if means to prevent that were not provided. The bar $51^a$ serves effectively to arrest a pin propelled along bars 52 by a ball, restraining it against further travel toward trough 79. In the continued reciprocation of bars 52, the pin is shifted into parallelism with bars 52 and passes therebetween to the pin straightening shafts 78, between which it is suspended in inverted position as above explained. The ball then passes forward along bars 52 into trough 79.

As a pin P approaches the forward ends of the shafts 78 supporting it, it is engaged by the grooved portions 89 of the shafts 78 so as to be positively moved toward the front of hopper 51. At the same time, the neck of the pin contacts the tilting shaft 90, which is rotated in clockwise direction as viewed in Figure 5 so as to impart a forward impulse to the pin in the general direction of its length. In that manner the pin is tilted from its inverted position and is delivered from between the shafts 78 onto a downwardly and forwardly inclined plate 97 mounted in a pin receiving box 98 (Figures 12 and 13) suitably supported on frame 50 at the front of hopper 51. A pin receiving box 98 is provided for each pair of pin straightening shafts 78, for receiving the pins therefrom.

Box 98 is provided (Figures 5, 6, 12 and 13) with a bottom outlet opening normally closed by two doors 99 pivoted on the side walls of box 98 by pintle pins 100, these doors normally being held in closed position, inclined downward and inward of box 98, by torsion springs 101 mounted on pintles 100 and having bearing on the side walls of box 98 and on the doors 99. Each of the doors 99 is provided with upwardly extending tabs 103 disposed to contact the adjacent side wall of pin box 98 at the inner face thereof, thereby limiting movement of door 99 in closing direction.

A latch plate 102 underlies the front portion of pin box 98 and normally is held in raised position with its rearward portion underlying the doors 99. Latch plate 102 extends forwardly of pin box 98 a considerable distance, as shown more clearly in Figures 5 and 13, and is provided with an upwardly extending elongated tongue 104. Tongue 104 is provided with an oblong slot 105 in its upper portion, which receives a guide block 106 mounted on a stud 107 fixed to strap 108 extending across and secured to the front walls of the pin boxes 98. Strap 108 is notched out at 109 to accommodate tongue 104 and permit tilting thereof, for which purpose block 106 is provided with laterally projecting fingers 110, the rearward faces of which are of rounded contour and seat against strap 108. At its lower portion tongue 104 is provided with a lengthwise slot 111 which receives a threaded stud 112 secured to a second strap 113 also secured to the front walls of the pin boxes 98, and to frame 50. A compression spring 114, mounted about stud 112, and confined between a flanged thimble 115 mounted on stud 112 and bearing against strap 113, and a flanged thimble 116 mounted on stud 112 and bearing against a nut $112^a$ threaded on stud 112, normally holds tongue 104 in contact with straps 108 and 113. A tension spring $115^a$, anchored at its upper end to the front wall of box 98 and at its lower end to the upper end of tongue 104, normally holds this tongue, and with it latch plate 102 in raised position. The spring $115^a$ is of just sufficient strength to hold latch plate 102 raised when there is no pin in box 98. When the pin passes from between the straightening shafts 78 into the pin box 98, it slides downward along plate 97 and enters the forward portion of box 98 in upright position resting upon the doors 99, as shown in dotted lines in Figures 5 and 12. The weight of the pin on the doors 99 moves them downward a short distance in opening direction, in opposition to torsion springs 101. This limited opening movement of the doors 99 forces the latch plate 102 downward a short distance, in opposition to tension spring $115^a$, to the extent permitted by slot 111 of tongue 104 and thimble 115 (Figures 12 and 13), from its normal raised position to its lower position indicated in dotted lines. The latch plate 102 normally is held in its rearward position by compression spring 114, and when in its lower position underlies the doors 99 effective for preventing opening thereof by the pin.

As the pin assumes upright position in the forward portion of box 98, it moves in forward direction the downwardly extending arm $117^a$ of a gate member 117 of approximately L-shape pivoted, adjacent the juncture of its arms, in a U-bracket 118 secured to the front wall of pin box 98 adjacent the top thereof. Member 117 has a mounting tab 119 secured thereto, at each side thereof, these tabs receiving a pintle pin 120 which also passes through the arms of bracket 118. Suitable spacers 121 are mounted on pintle pin 120, between tabs 119 and the arms of the bracket 118, for holding member 117 in centered position within pin box 98. A tension spring 122, anchored at its upper end to the front wall of hopper 51 and at its lower end to arm 123 of member 117, adjacent the rearward end of arm 123, normally holds member 117 in position with arm 123 extending at an inclination upward and rearward of box 98 and arm $117^a$ extending at an inclination downward and rearward of box 98 and spaced, at its lower end, a considerable distance from the front wall of the box, as shown in full lines in Figure 13. When the pin moves into the forward portion of box 98 and there assumes its upright position, it forces arm $117^a$ forward against the front wall of box 98, thereby swinging arm 123 downward into substantially horizontal position, as indicated in dotted lines in Figures 13. That closes the top of box 98 against entry thereinto of a second pin, as will be clear from Figures 5 and 13, assuring that a second pin cannot enter the pin box until a preceding pin which has entered the box has been discharged therefrom. A rod 124 (Figures 5, 6, 8 and 13) is fixed at its upper end to the forward extension of latch plate 102 and carries a roller 125 at its lower end. The roller 125 is aligned with a slot 126 in a plate 127 (Figure 8) fixed to frame 50 at the front thereof and extending rearward in a horizontal plane. It will be understood that the slots 126 in plate 127 correspond in number to the pin boxes 98.

Figure 15:
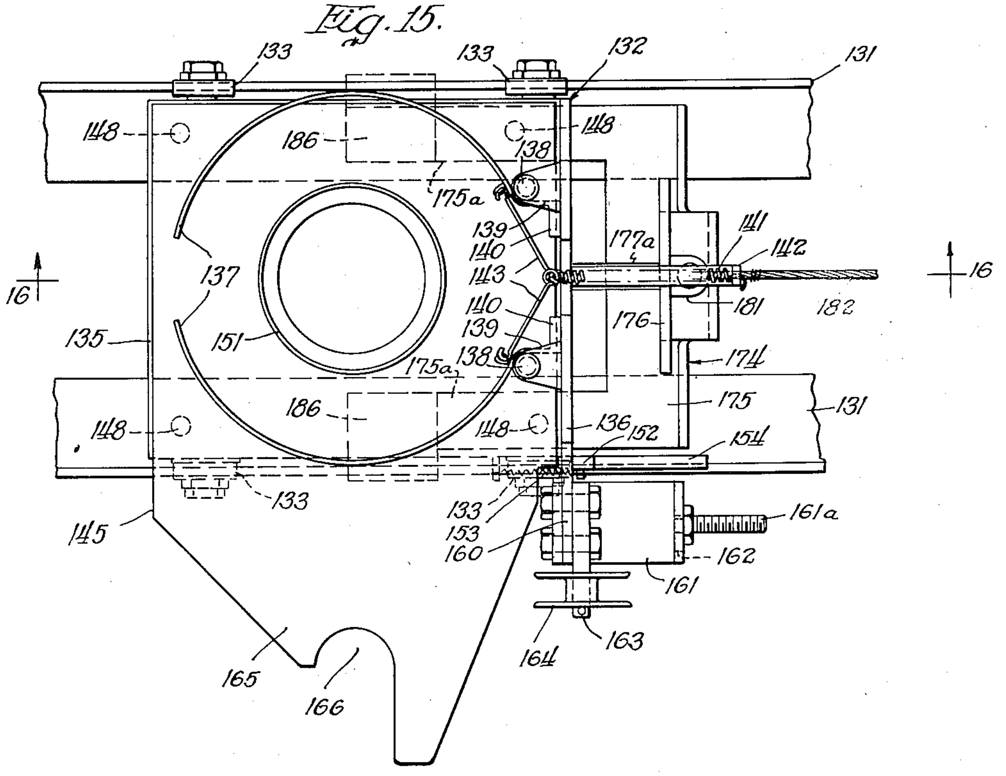
Figure 15 is a plan view, on an enlarged scale, of the pin carriage and associated parts, with the track broken away.
Figure 16:
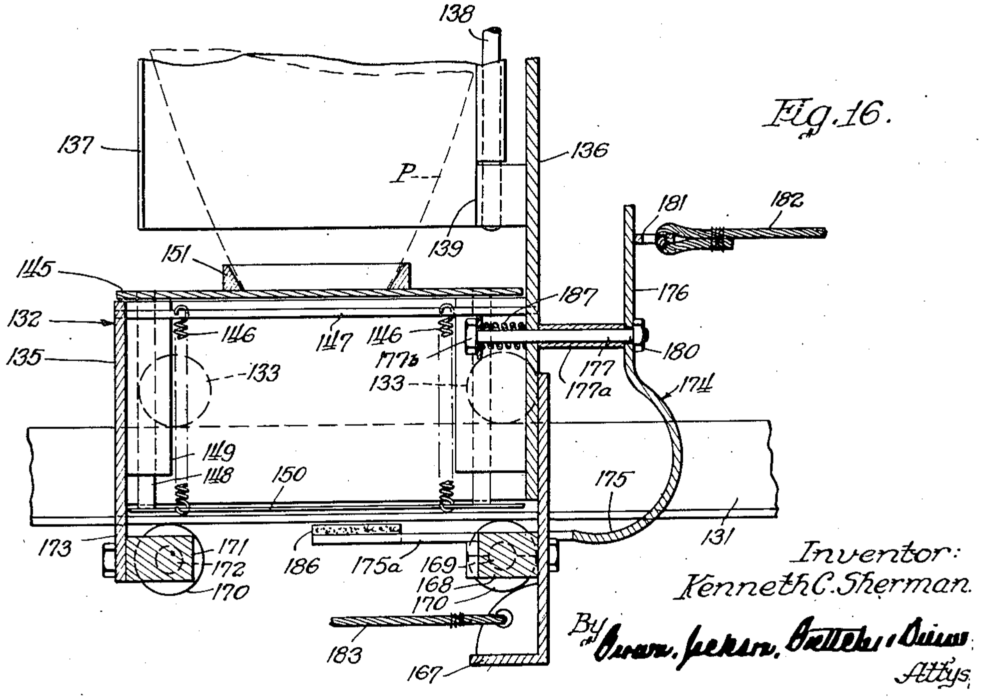
Figure 16 is a sectional view, taken substantially on line 16—16 of Figure 15, certain parts being broken away and certain other parts being shown in section.

The boxes 98 are arranged in alignment transversely of frame 50 and in overlying relation to a track 130, conveniently formed of two parallel opposed angle members 131, mounted in frame 50 transversely thereof. A pin carriage 132 (Figures 15, 16 and 17) is mounted on track 130, by means of rollers 133 travelling upon the upper edges of the outer vertical flanges of angle members 131, for reciprocation lengthwise thereof. The pin carriage 132 comprises a box-like body 135 having at one end an upward extension 136. Two opposed jaws 137, approximately semi-circular in plan, are mounted for swinging movement on vertical rods 138 mounted in bosses 139 secured to extension 136 adjacent the upper and the lower ends thereof, each jaw being provided with a stop element 140 disposed to contact extension 136 and thereby limit inward or closing movement of the jaw. A tension spring 141 is anchored at one end to a bracket 142 secured to extension 136, the other end of this spring being connected by diverging links 143 to the respective jaws 137, the upper portion of extension upright 136 being slotted to accommodate the links and the spring. The tension spring 141 normally holds the jaws 137 in their closed position.

A base plate 145 is urged upward toward a raised position, a short distance above body 135, by means of tension springs 146 (Figure 16) anchored at their upper ends to rods 147 secured in body 135. Studs 148 are secured to base plate 145 and are slideable through bosses 149 of body 135, there being straps 150 secured to the lower ends of studs 148, to which straps the lower ends of tension springs 146 are anchored. The springs 146 urge base plate 145 upward, as noted, straps 150 limiting upward travel of the base plate by contact with the lower ends of the bosses 149. A cup member 151 is suitably secured to the upper face of base plate 145 within the outline of the jaws 137 substantially concentric therewith, when the latter are in their closed position, for reception of the base of a pin delivered to the carriage from a pin box 98. When a pin is delivered to the carriage, the weight of the pin depresses base plate 145 (Figure 16) into contact with the top of body 135, in which position the base plate is then locked by a latch member 152, pivoted on one side of the carriage body and urged toward the base plate by tension spring 153. The bill of latch member 152 is of sufficient height to contact the adjacent edge of plate 145, when the latter is raised, so as to limit its movement toward the plate, as shown in Figure 14. This latch member 152 is provided with an arm 154 extending outwardly beyond the adjacent end of the carriage body, for a purpose which will be explained later.

Extension 136 of carriage 132 is provided with a forwardly projecting finger 160 to which is secured a U-shaped bracket 161 the outer arm of which is provided with an elongated slot 162 for a purpose which will appear presently. A stub shaft 163 is suitably secured to finger 160 and bracket 161 and projects forwardly therefrom, receiving a flanged roller 164 for a purpose which will appear later. Base plate 145 is provided with a forward extension 165 of generally V-shape in plan having therein an arcuate notch 166, the purpose of which will be explained more fully later. An angle bracket 167 (Figure 16) is secured to the body 135 of carriage 132 adjacent extension 136 and extends downward therefrom, having secured thereto a block 168 carrying stub shafts 169 on which are mounted rollers 170 which underlie the opposed horizontal flanges of the angle track members 131. Similarly, a block 171 provided with stub shafts 172 is secured to a downward extension 173 at the other end of body 135 of carriage 132. Rollers 170 are mounted on the stub shafts 172 and also underlie the flanges of angle members 131. As will be clear, the upper rollers 133 support the carriage for travel on the track, and the lower rollers cooperate with the horizontal flanges of the angle members 131 to restrain the carriage against upward movement.

An L-shaped lever 174, having a bifurcated lower arm 175, is rockably mounted on the stub shafts 169, the other or upper arm 176 of this lever extending upward along the outer end of carriage 132. A stud 177 passes loosely through the outer end wall of carriage 132, and receives about its portion within the carriage a compression spring 187 confined between an abutment $177^b$ on stud 177 and the carriage wall. Stud 177 carries a spacing member $177^a$ disposed thereon between the carriage and arm 176 of lever 174, through which arm the stud passes loosely, receiving an abutment member, conveniently in the form of a nut 180, at the outer face of arm 176. This arm carries an eye 181 through which is secured one end of a cable 182 which, is wound on to a drum, as will be explained more fully later, for moving the carriage along the track 130 toward the right hand side of frame 50, as viewed in Figure 8. A second cable 183 is attached to bracket 167, below the body 135 of the carriage, from which it extends outward toward the left side, as viewed in Figure 8, of frame 50. Cable 183 extends from bracket 167 about a first pulley 184 (Figure 18) mounted in a bracket $184^a$ mounted on one of the track members 131, thence about a second pulley $184^b$ slidable on a rod $184^c$ mounted in frame 50, and is anchored at its other end to frame 50. A second cable $184^d$ is attached at one end to an angle arm $184^e$ carried by the mounting of pulley $184^b$. Cable $184^d$ passes about pulley $184^f$ mounted at the right hand side of frame 50, as viewed from the front thereof, thence upward about a second pulley $184^g$ mounted at the right hand side of frame 50, and has a weight 185 secured on its other end. The weight 185 is effective for moving carriage 132 along track 130 toward the left side of frame 50. As above noted, the lower arm 175 of lever 174 is bifurcated providing, in effect, two spaced apart arms $175^a$. Each of these arms $175^a$ is provided, at the upper face of its outer end portion, with a facing 186 (Figure 16) of leather or other suitable friction material, secured to arm $175^a$ by means of rivets or in any other suitable manner. In the event of cable 182 being subjected to a sudden pull or jerk, lever 174 is rocked about the stub shafts 169, in opposition to compression spring 187, bringing the facings 186 into pressure contact with the flanges of the angle members or rails 131, thereby exerting a braking effect which prevents too rapid travel of the carriage along the track. Thereafter the cable 182 is wound on its drum and travel of the carriage along the track, toward the right side of frame 50, continues.

The cable 182 extends from eye 181 to a winding drum 189 adjacent the right hand side of frame 50 (Figure 17), to which drum it is secured. Drum 189 is loose on a stub shaft 190 which is rotatably mounted at its upper end in a bearing bracket 191 fixed on frame 50 and, at its lower end, is rotatably mounted in a bearing member (not shown) carried by a mounting plate 192 fixedly supported in frame 50 in horizontal position. A spur gear 193 is keyed on stub shaft 190, adjacent the lower end thereof, and meshes with a spur pinion 194 rotatably mounted on a stub shaft 195 secured in plate 192. Pinion 194 meshes with a pinion 196 loose on shaft 69, the latter pinion 196 having fixed thereto a tooth clutch member 197. Member 197 cooperates with a tooth clutch member 198, splined on shaft 69 and urged downward by a compression spring 199 mounted about this shaft and confined between member 198 and an abutment, such as a washer 200, mounted about shaft 69 and restrained against upward movement by a pin 201. The clutch member 198 is provided with a circumferentially grooved neck, as usual, which receives pins carried by the arms of a yoke 202 of an angle shift lever 203 rockably mounted in a slotted post 204 fixed to plate 192. The lower portion of post 204 is of stepped cylindrical formation to provide a bearing element, in the nature of a stub shaft, on which is rotatably mounted a spur pinion 205 which meshes with pinion 196. It will be seen that gear 193 and pinion 205 are driven from shaft 69 through the gearing just described, when clutch member 198 is engaged with clutch member 197. Shift lever 203 is provided, at the upper end of its upwardly extending arm, with a roller 206, for a purpose which will be explained later. If desired, instead of using a toothed clutch comprising the members 197 and 198, I may use a friction clutch of any suitable known type.

The drum 189 is provided, at its lower end, with a relatively thin spur gear 207 fixed thereto. At its upper end, drum 189 is provided with a tooth clutch member 208 which cooperates with an upper clutch member 209 splined on stub shaft 190, this upper member 209 having a circumferentially grooved neck for reception of pins carried by the arms of a yoke 210, at one end of a shift lever 211 pivoted at its other end on frame 50 at 212. The lever 211 passes through a cut-out or notch 213 in a lever 214 (Figures 14 and 17) pivoted, at its lower end at 215, on the vertical flange of the forward track rail 131. Lever 214 is urged in counter-clockwise direction about its pivot 215, as viewed in Figure 14, by a tension spring 216 anchored at one end to lever 214 and at its other end to track rail 131. The upper end portion of lever 214 is shaped to provide a detent 217 normally engaged by the bill 218 of an angle latch member 219 pivoted in a bracket 220 secured on the inner face of plate 221 constituting a part of the general structure of frame 50. A compression spring 222, confined between plate 221 and arm 223 of latch member 219, normally maintains the latter in engagement with detent 217 so as to hold lever 214 in position toward the right side of frame 50, as viewed in Figures 8 and 14, in opposition to tension spring 216. A latch member 225 is pivotally mounted at 226, between a pair of upwardly extending ears 227 fixed to latch member 219, it being noted that member 225 extends a substantial distance towards the left beyond member 219 and is provided, at its inner end, with an upwardly extending bill 228, member 225 also being provided, a short distance from bill 228, with an upwardly extending rounded cam element 229.

The carriage 132 cooperates with a distributor 230 (Figures 3 and 8) pivoted at one end, at 231, in a bracket 232 secured to frame 50, for movement about a vertical axis. The distributor 230 will be described more fully later, it sufficing for present purposes to note that this distributor is capable of assuming various positions, its normal position being that in which it is disposed in overlying relation to and substantially parallel with track 130. In that position of distributor 230, a part carried by the distributor is in contact with the arm 223 of latch member 219 holding that member disengaged from detent 217. When that occurs, arm 214 is swung in counter-clockwise direction, from its position shown in Figure 14, so that a roller 235, carried by shift lever 211, enters a depression 236 in arm 214 at the bottom of notch 213 thereof. That permits downward movement of the rearward end of shift lever 211, by gravity, clutching drum 189 to stub shaft 190 for rotation therewith, as will be clear from Figure 17. In the rotation of drum 189 the cable 182 is wound thereon, moving the carriage 132 from its position at the left of frame 50, as viewed in Figure 8, toward the right of the frame. As the carriage approaches the right of the frame, the roller 164 contacts a trip lever and thereby releases the distributor 230 for movement from its position above referred to, as will be explained more fully later. In the continued travel of the carriage toward the right, bracket 161 passes over latch member 225, which enters the slot 162, as indicated in dot and dash lines in Figure 14, and immediately thereafter an adjustable screw stud $161^a$ carried by bracket 161 contacts a finger 237 projecting from detent element 217. That returns the arm 214 to its position shown in Figure 14, in which position it is then retained by the bracket 161, latch member 225 being then held in engagement with bracket 161 by compression spring 240 confined between the latch members 219 and 225 and seating in suitable recesses therein. During the travel of the carriage toward the right, and as it approaches the limit of such travel, mechanism is set into operation for moving the distributor 230 in clockwise direction, as viewed in Figure 8, from its normal or receiving position. During the first part of such movement of the distributor, the latch member 219 is released and is returned by compression spring 222 to its normal holding position of Figure 14, so as to retain arm 214 in its normal position, in which the drum 189 is declutched from stub shaft 190. Immediately thereafter, a part of the distributor 230 contacts cam 229, depressing latch 225 and releasing bracket 161. Also, as the carriage approaches the limit of its rightward travel, arm 154 of latch 152 contacts a cam element 242 of a finger 243 fixedly mounted on the forward track rail 131, thereby releasing base plate 145, which is then returned to its raised position by the tension springs 146. In the raised position of base plate 145 the edge of the bill of latch member 152, the bill of which is of considerable vertical extent, is in contact with the adjacent edge of base plate 145 so that when this plate is again depressed the latch member 152 will again engage over it and hold it in such position.

When the latch member 225 is disengaged from bracket 161, in the manner above stated, the weight 185 moves carriage 132 along track 130 toward the left. The gear 207 carried by drum 189 (Figure 17) meshes with a spur pinion 245 of a speed governor 246 of known type mounted on plate 192 adjacent gear 193. This governor 246 is of conventional type and need not be illustrated nor described in detail, its function being to hold the speed of rotation of drum 189, during unwinding of cable 182 therefrom, down to such a value as to avoid excessive speed of the carriage during its travel toward the left of the machine.

Figures 8, 9:
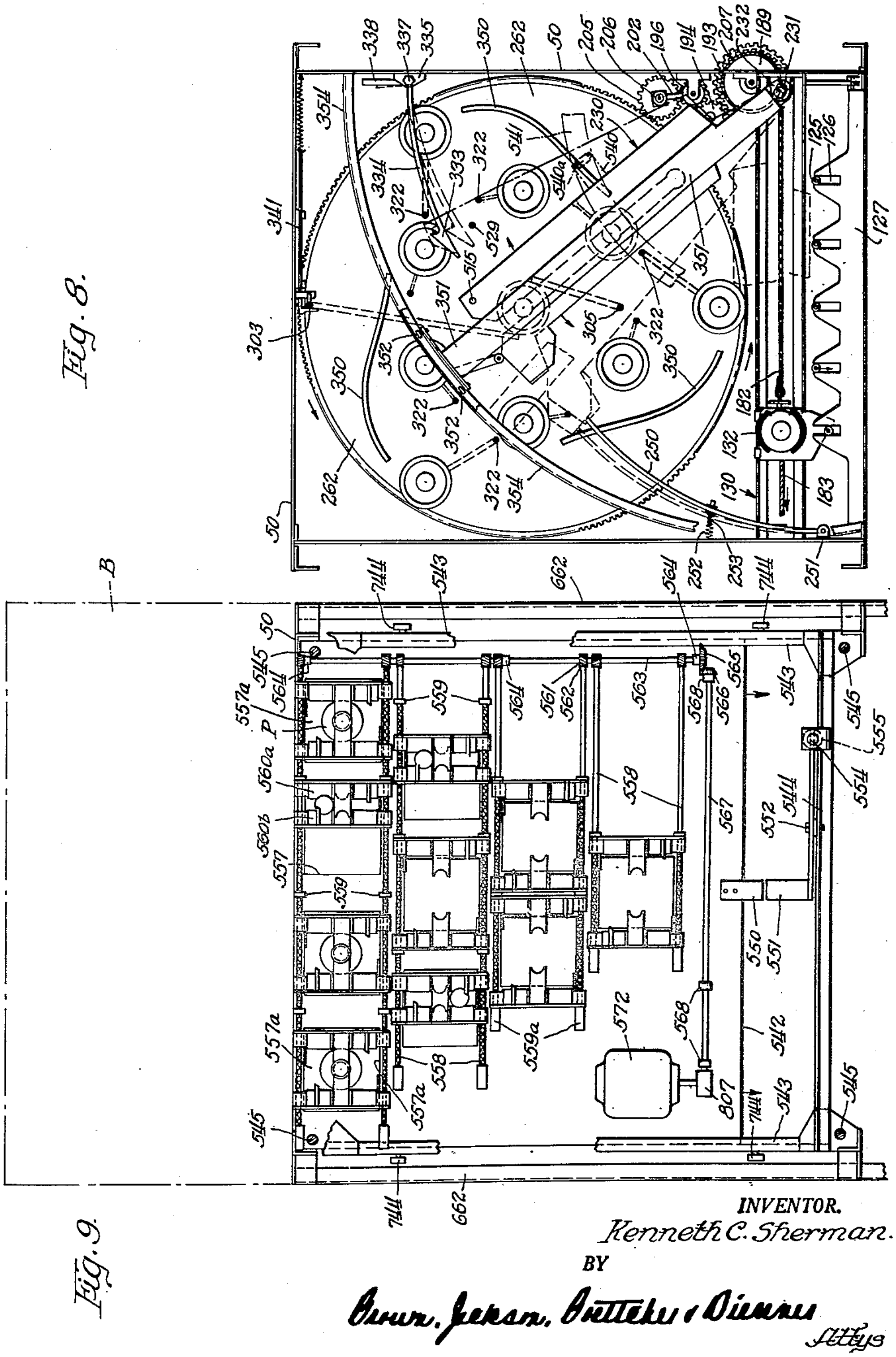
Figure 8 is a sectional view taken substantially on line 8—8 of Figure 1, on an enlarged scale, with certain parts broken away and certain other parts omitted for clearness of illustration.
Figure 9 is a sectional view, on an enlarged scale, taken substantially on line 9—9 of Figure 1, with certain parts broken away and certain other parts omitted for clearness of illustration.
Figures 12, 13:
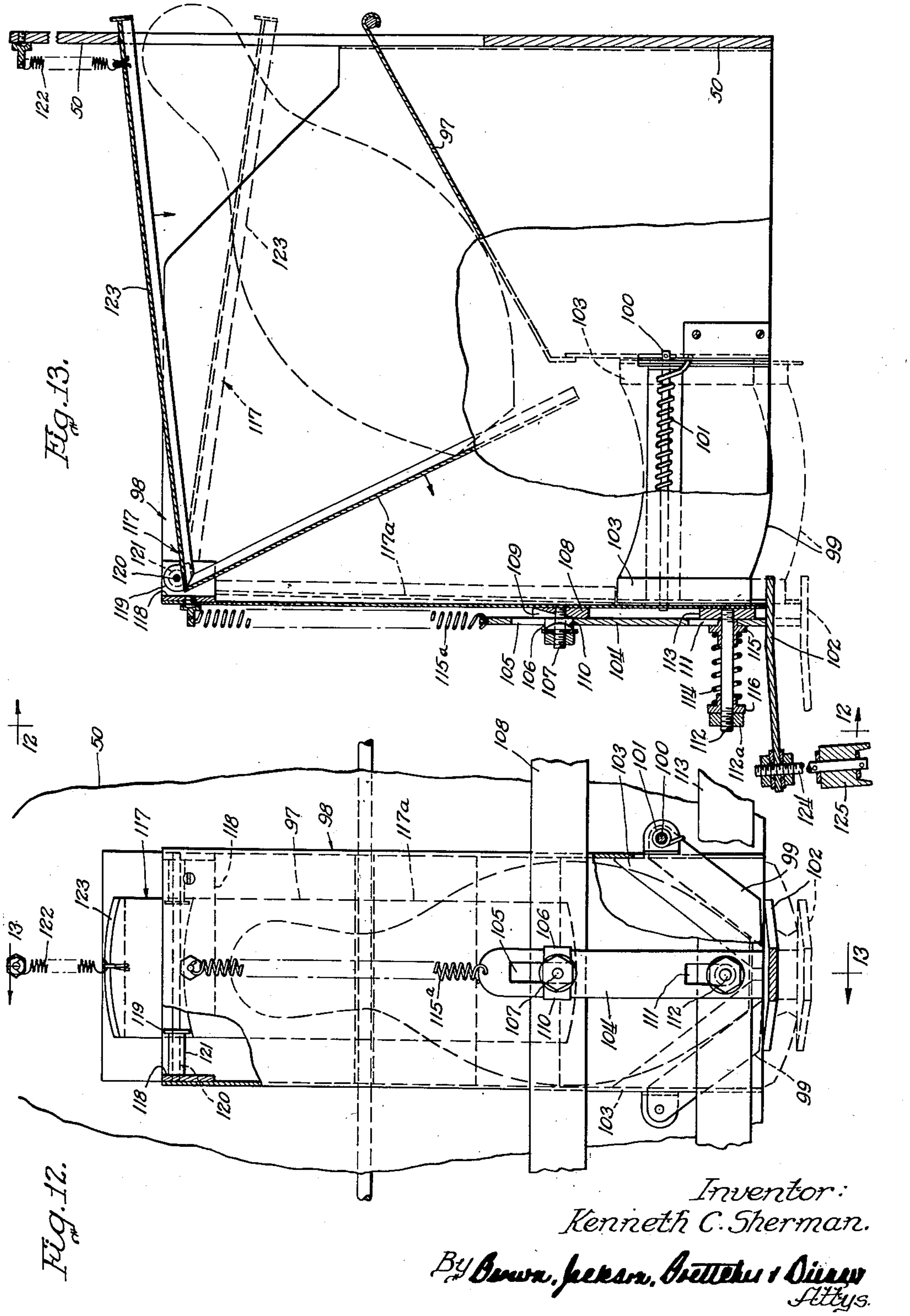
Figure 12 is a front view, on an enlarged scale, of one of the pin receiving boxes and associated parts, with certain parts broken away and shown in section.
Figure 13 is a sectional view taken substantially on line 13—13 of Figure 12, with certain parts shown in elevation and certain other parts broken away.
Figure 11:
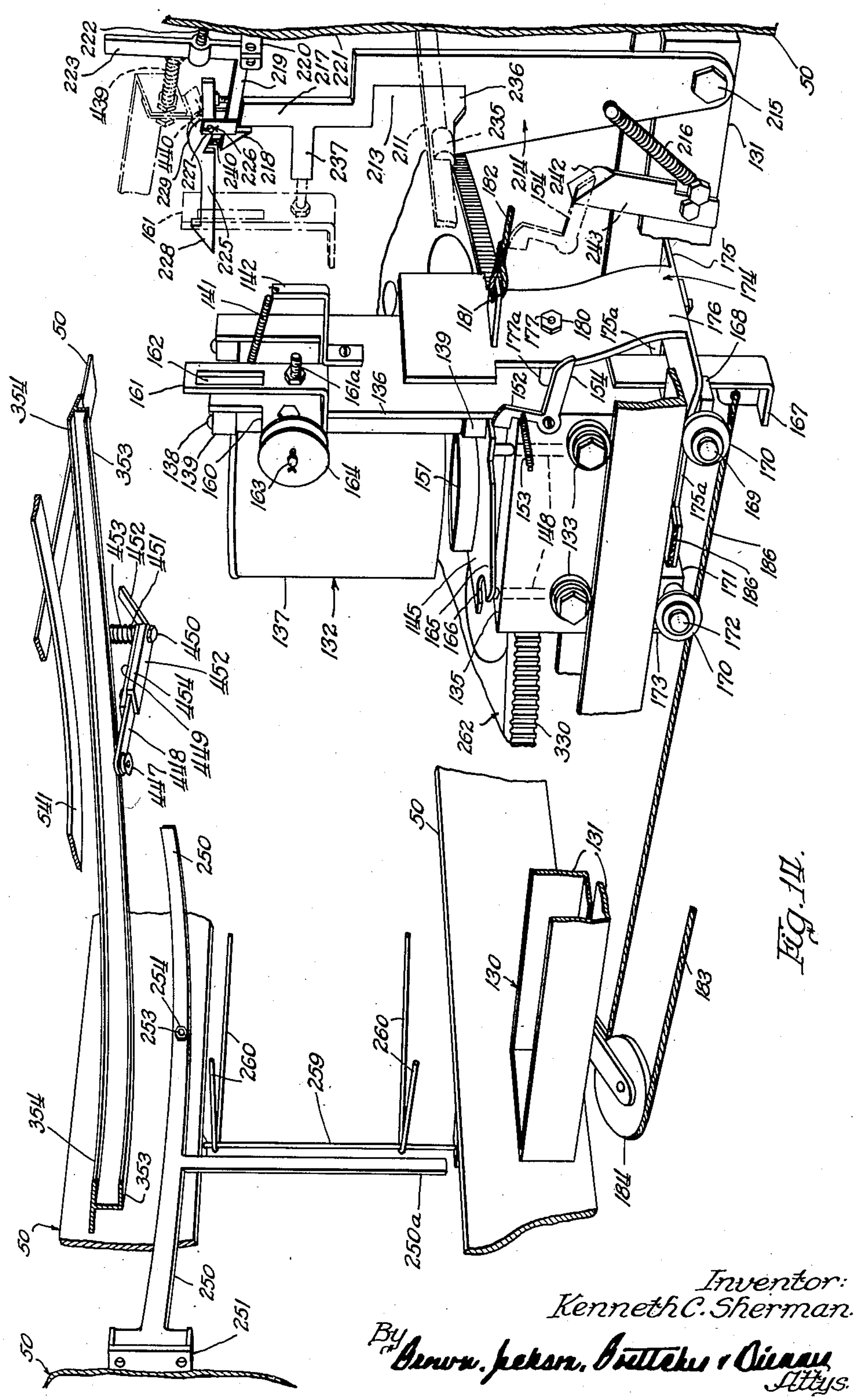

If there is a pin in one of the pin boxes 98, the corresponding roller 125 will be in its rearward lower position shown in Figure 5, since the latch plate 102 is then held in its lower rearward position, as previously described. As the carriage 132 moves towards the left, the inclined left forward edge of extension 165 of base plate 145 (Figures 8 and 15) will contact roller 125 and displace it forward, thus rocking latch plate 102 forward away from pin box 98 (Figure 13). That releases the doors 99 which swing downward under the weight of the pin, and at that time roller 125 has entered the arcuate notch 166 in extension 165 of plate 145, effective for holding the carriage in fixed position with the cup 151 accurately aligned with the superposed pin. In Figure 8 carriage 132 is shown at the left of this figure, in pin receiving position. Upon release of the doors 99, the pin drops by gravity into the cup 151 and depresses plate 145, which is then held in its depressed position by latch member 152. That releases the carriage from roller 125, since plate 145 has then been moved downward into a position below the lower end of the roller, and the carriage then resumes its travel toward the left. When a pin has been removed from a box 98, and the doors 99 have been closed by torsion springs 101, roller 125 is in its normal rearward upper position, to which it is returned by tension spring $115^a$ in cooperation with compression spring 114 (Figure 13).

In the continued travel of the carriage 132 toward the left, it contacts a finger $250^a$ fixed to and depending from a stop arm 250 pivoted, at its forward end, in a bracket 251 mounted on frame 50 (Figures 8 and 14). The arm 250 is arcuate in plan, as shown in Figure 8, and is urged toward the right side of frame 50 by a compression spring 252 mounted about a curved stud 253 fixed to frame 50 and extending loosely through member 250, with an abutment member, such as a nut 254, secured on its inner end. Also, in the movement of the carriage 132 toward the left, if there is no pin in the carriage and plate 145 thereof is in its raised position, the extension 165 of plate 145 contacts and displaces a cam member 256 (Figure 18) pivoted in a bracket 257 secured to the plate 127. If there is a pin in carriage 132, plate 145 is depressed and clears cam member 256. Cam member 256 is held by bracket 257 against turning movement in clockwise direction beyond its normal position while being free to swing in counterclockwise direction, so that it is effective for moving plate 145 into its lowered position, from its raised position, if the carriage without a pin therein is moved from its extreme left-hand position toward the right along the track 130. That guards against contact by extension 165 of plate 145 with a roller 125 associated with a box 98 having a pin therein, in the event of carriage 132, without a pin therein, being moved along the track from its left-hand position, thereby guarding against possible damage to the machine.

A vertically disposed rod 259 (Figure 14) is secured to the frame 50 adjacent the left-hand end of track 130 and is provided with two vertically spaced pairs of inwardly diverging fingers 260. The lower pair of fingers 260 is disposed to pass beneath the jaws 137 of the carriage 132, so as to contact the base of the pin, and the upper pair of fingers is disposed to pass above the jaws 137 so as to contact the upper portion of the pin body, the fingers 260 thus acting to center the pin accurately in the cup 151. In the event the distributor 230 has been moved from its normal receiving position, overlying track 130 in substantial parallelism therewith, above referred to, rearward into another position, such as that shown in full lines in Figure 8, the stop arm 250 prevents return of distributor 230 to its receiving position until the carriage 132 has returned to its position at the left side of frame 50 and has moved stop arm 250 from its full line position (Figure 8) to a position in which it will clear the distributor 230 for return of the latter to pin receiving position.

A pin receiving table 262 is mounted for rotation about a vertical axis, on a circular track 263 (Figure 18), suitably supported in frame 50. The table 262 is provided therein with ten openings (Figure 8) for reception of the pins, these openings being arranged in the same manner in which the pins are arranged when set up on the alley, there being one opening at the center of table 262, six openings equally spaced about the center opening and equidistant therefrom, and an outer series of three openings disposed in triangular arrangement about the center opening and equidistant therefrom.

Figures 19, 20:
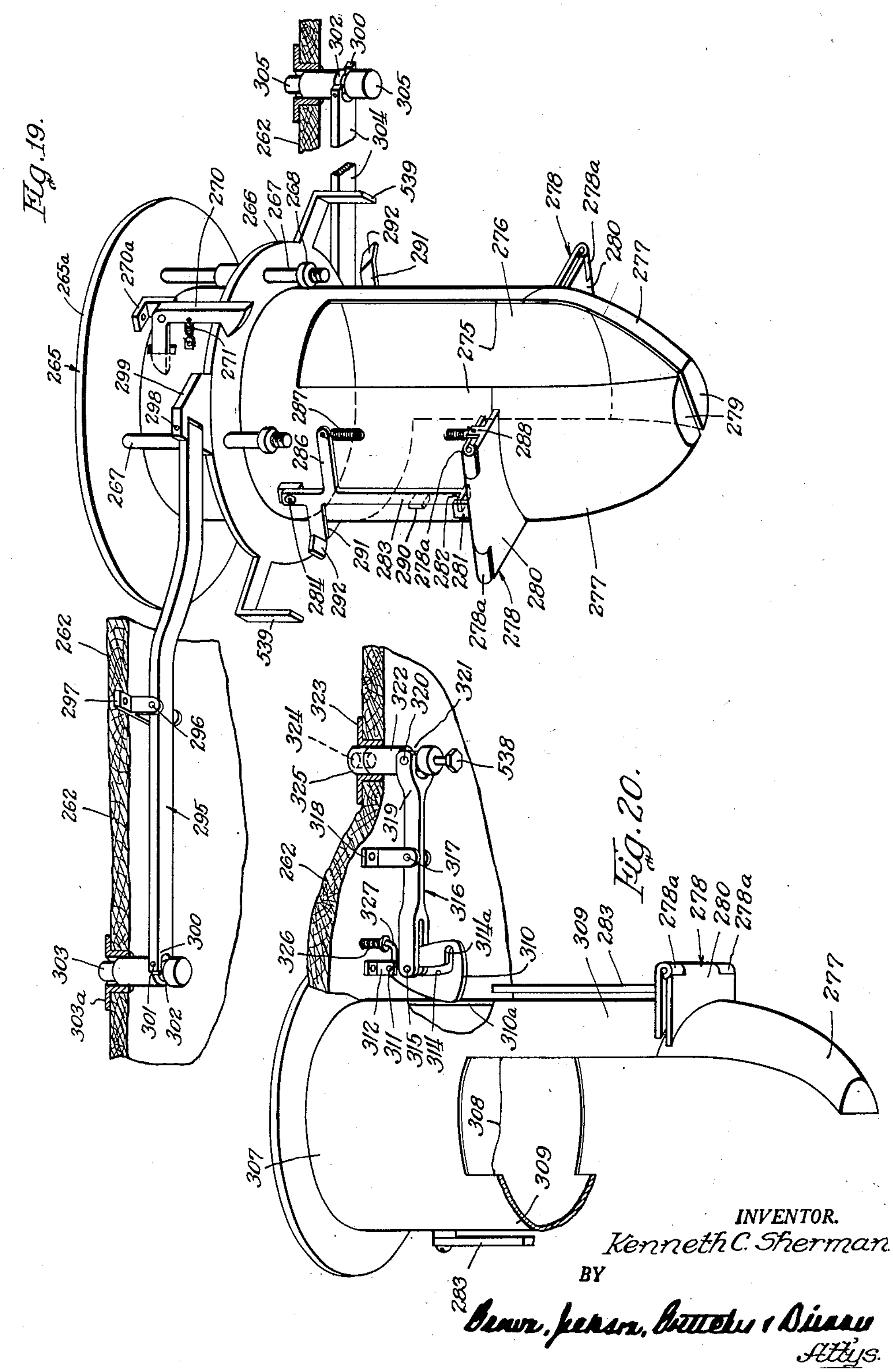
Figure 19 is an isometric side view of the central pin receiving bucket and associated parts, of the rotatable pin receiving table, the latter being shown fragmentarily and in section.
Figure 20 is a view similar to Figure 19 of one of the outer pin receiving buckets of the rotatable pin receiving table.

A flanged collar 265 is secured to table 262 centrally thereof (Figures 8 and 19) and extends downward therethrough. Collar 265 is disposed coaxially with a ring 266 slideably mounted on rods 167 secured to flange $265^a$ of collar 265 and extending through and downward beyond table 262, these rods having stop members 268 thereon limiting downward movement of ring 266. Angle latches 270, one of which is shown in Figure 19, disposed at opposite sides of collar 265, are pivoted on brackets $270^a$ secured to the under face of flange $265^a$. The latches 270 are respectively urged in latching direction by a tension spring 271 and normally engage beneath ring 266 so as to hold it in its raised position. The upper arm of each latch 270 extends through a slot in collar 265 into position to be contacted by a pin passing through the collar so as to swing the outer arms of the latches outward away from the ring 266 for releasing the latter. The ring 266 has secured thereto and depending therefrom two opposed pin retaining members 275 of arcuate cross section and each of somewhat more than 90 degrees in extent, leaving between the members 275 two aligned vertically extending slots 276 of considerable width. A door 277 is hinged, at its upper end at 278, to the lower end of each of the members 275, these doors curving downward and inward toward each other and each having, at its lower end, a substantially horizontal web element 279. The hinges 278 are of such character as to limit inward movement of the doors 277 and hold them substantially in their positions shown in Figure 19. The members 275, together with the doors 277 and associated parts, constitute a pin retainer structure or bucket for receiving and retaining a pin delivered thereto through collar 265.

The lower leaf 280 of each hinge 278 has fixed thereto an upwardly extending finger 281, which projects through a slot of adequate length in the upper leaf 278ª of hinge 278. The finger 281 is disposed for contact with a flange 282 at the lower end of a latch member 283 pivoted at its upper end, at 284, on member 275. The latch member 283 is provided with a finger 286 projecting from one side thereof, which is connected by a tension spring 287 to a tab 288 fixed to the lower leaf 280 of hinge 278. This tension spring 287 normally urges latch member 283 in clockwise direction about its pivot 284, as viewed in Figure 19, holding it in contact with a stop 290 carried by member 275. Latch member 283 is provided at the other side thereof with a finger 291, the outer end portion of which is bent at an angle and disposed to provide an inclined cam element 292. Under normal conditions, the doors 277 are locked in closed position by flanges 282 of latch members 283, it being understood that there are two latch members and associated elements, one for each door. Upon movement of the respective latch members 283 into position in which flange 282 thereof is clear of finger 281, the respective doors may be swung outward on the hinges 278 for the purpose of discharging a pin from the retainer or bucket, as will be explained more fully later.

A lever 295 is pivoted at about its mid-length, at 296, in a bracket 297 secured to and extending downward from the rotatable table 262. At its inner end lever 295 is loosely pivoted, at 298, to a slotted lug 299 fixed to ring 266. At its outer end lever 295 is provided with a yoke 300, the arms of which carry pins 301 extending into a circumferential groove 302 formed in the lower portion of a plunger 303, slideable through a bushing 303ª secured in table 262 and movable upward into position extending an appreciable distance above this table. Similarly, a lever 304, disposed at the opposite side of ring 266 from lever 295, is connected to a second plunger 305 slideable through table 262. When a pin is delivered to collar 265 the latch members 270 are tripped thereby, releasing ring 266, this ring and the parts carried thereby being then moved downward along the rods 267 until halted by the stop members 268. During such downward movement the pin is retained within the structure, resting upon web elements 279, until such time as it is removed therefrom by means which will be later described.

Figure 22:
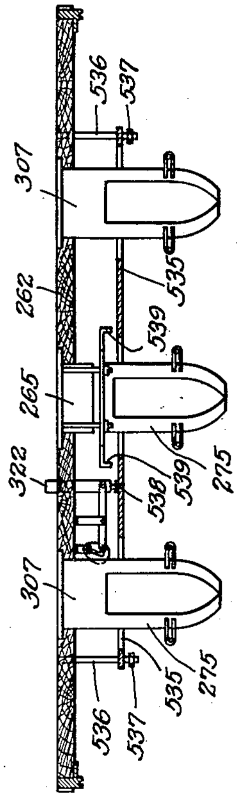
Figure 22 is a vertical sectional view, on a reduced scale, of the rotatable pin receiving table and parts carried thereby, certain parts being shown in elevation and certain other parts being omitted for clearness of illustration.

A flanged tube 307 (Figure 20) is secured, at its upper end, in each of the other pin openings in table 262 and extends downward therefrom, being provided with two opposite lengthwise slots 308, with the portions of the tube between these slots forming retaining elements 309 of arcuate cross section. A door 277 is hinged to the lower end of each of the elements 309 and normally is locked in closed position in the same manner as in Figure 19. Each of the tubes 307 has associated therewith a cam plate 310 pivoted at its upper end, at 311, in a bracket 312 secured to the under face of table 262. Plate 310 is provided with a cam slot 314 therein which receives a pin 315 of a lever 316 pivoted, at 317, in a bracket 318 secured to the under face of table 262. The outer portion of lever 316 is shaped to provide a yoke 319 having studs 320 extending into a circumferential groove 321 at the lower end of a plunger 322 slideable through a bushing 323 secured in table 262. The upper end portion of plunger 322 is reduced to provide a stud 324 which receives a roller 325. A compression spring 326 is confined between table 262 and an L-shaped finger 327 fixed to plate 310 adjacent the upper end thereof and extending outward therefrom. Normally, plate 310 projects into tube 307 through a slot 310ª therein, with pin 315 engaging under shoulder 314ª of cam slot 314, the parts being held in such positions by the compression spring 326. The plunger 322 is then held in its raised position extending above table 262, as shown in Figure 22. When a pin is delivered to tube 307, the plate 310 is displaced outward of the tube, disengaging shoulder 314ª from pin 315 and permitting this pin to move upward in slot 314, with corresponding downward movement of plunger 322 through bushing 323, as shown in Figure 20. It will be understood that each of the pin receiving openings of table 262, except the center opening, is provided with a tube 307 and an associated plunger 322 and operating means therefor, the same as just described.

The table 262 is rotated in counter-clockwise direction, as viewed from above, by means of a circumferential ring gear 330 (Figures 8 and 17) secured thereon meshing with pinion 205; when pinion 196 is clutched to shaft 69. After the tenth pin has been delivered by the distributor to the center opening of table 262, the distributor is swung in clockwise direction, as viewed in Figure 8, into its extreme inner or rearward position indicated in dot and dash lines. During that movement of the distributor, a part 531 carried thereby contacts roller 206 (Figure 17) of the shift lever 203 and declutches pinion 196 from shaft 69. At about the same time, a plunger 515 (Figures 3, 8 and 11), which is carried by and has been projected downward beyond distributor 230, in a manner to be described later, contacts the inclined face of bill 333 of a hook 334 (Figures 8 and 17) pivoted at its outer end in a bracket 335 secured to frame 50. A torsion spring 336, mounted about pintle pin 337, on which the hook 334 swings, has one end in engagement with bracket 335 and its other end in engagement with hook 334 urging it in clockwise direction as viewed in Figures 8 and 17. A finger 338, rigid with hook 334, cooperates with bracket 335 to limit turning of the hook under the influence of the torsion spring. In the swinging movement of distributor 230 referred to, plunger 515 displaces hook 334 into substantially its position indicated in dotted lines (Figure 8), after which the plunger passes beyond the bill of hook 334 and the latter is returned to its full line position, restraining distributor 230 against movement in counter-clockwise direction about its pivot 231.

Figure 21:
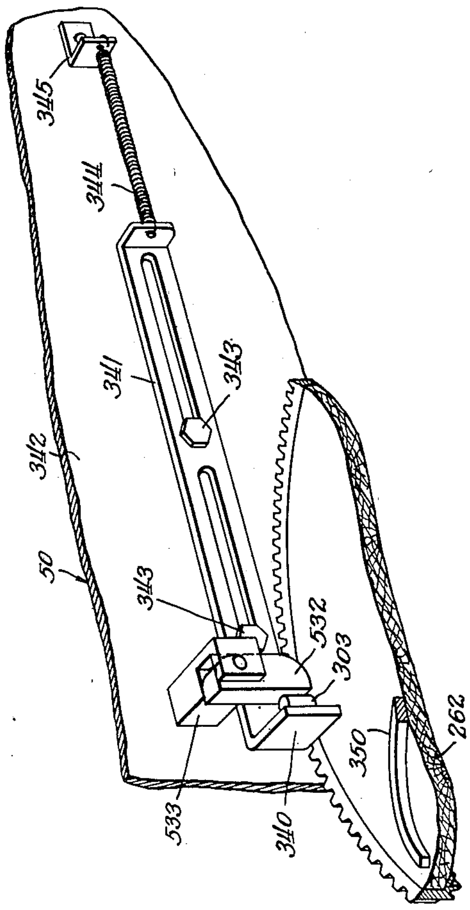
Figure 21 is an isometric detail view of the means for returning the rotatable pin receiving table to pin receiving position and holding it in such postion, on an enlarged scale, with the table shown fragmentarily and in section.

At about the same time that plunger 515 is engaged by the bill of hook 334, the outer one 303 of the two plungers connected to the center pin retainer or bucket, contacts an inwardly extending bill 340 of an elongated plate 341 (Figure 21) slidably mounted for horizontal movement on a frame member 342 at the back of frame 50. Plate 341 has therein two lengthwise slots, each of which receives a headed pin 343 secured in frame member 342. Pins 343 are effective for guiding plate 341 and for limiting outward or rearward movement thereof by a tension spring 344, connecting the outer or rearward end of plate 341 to an anchor tab 345 secured to the frame structure. A gravity pawl 532, pivoted in a block 533 mounted on frame member 342, has free inward movement and is stopped by block 533 from outward movement beyond vertical position. As the table 262 continues its rotation, due to inertia, the projected plunger 303 contacts bill 340, after displacing and passing beyond pawl 532, and moves plate 341 lengthwise in opposition to tension spring 344. The increasing tension of spring 344 stops rotation of table 262, after which spring 344 contracts and turns the table in a reverse or clockwise direction, into a desired predetermined angular position, in which it is then held by the pawl 532 and bill 340 in cooperation with the plunger 303 disposed therebetween, so long as the plunger remains in its raised or projected position. The table 262 is also provided, on its upper face, with three cam strips 350 (Figure 8) secured thereto in predetermined relation to the plungers associated with the pin retainers or buckets and cooperating therewith and with certain members carried by the distributor 230, to assure proper delivery of pins from the distributor to the buckets. Preferably, the distributor 230 is provided with a protecting housing 351 over the mechanisms thereof and projecting beyond the inner end of the distributor, as shown in Figure 8. The housing 351 carries at its inner end supporting rollers 352 which travel upon the lower flange 353 of a channel support 354 (Figures 8 and 14), suitably mounted in frame 50 concentric with the pivot 231 about which distributor 230 swings. That provides means for supporting the inner or unpivoted end of distributor 230 so as to prevent sag and possible binding thereof, as will be understood, which is conducive to ease and accuracy in operation.

The distributor 230 (Figures 3, 4, 4A, 4B, 10 and 11) comprises a base plate 360 having a reduced neck 361 provided at its outer end with a depending sleeve $361^a$ receiving the pivot pin 231 passing through arms $361^b$ of a bracket $361^c$ bolted or otherwise suitably secured to frame 50, pin 231 also passing through neck 361. Conveniently, pin 231 is threaded at its lower end portion, for reception of a retaining nut $361^d$ screwing thereon below the lower arm $361^b$ of bracket $361^c$, with an intervening washer $361^e$. The pin 231 may be retained in position in any other suitable manner. A torsion spring $361^f$ is disposed about sleeve $361^a$, with its upper end hooked over neck 361 of distributor 230, and its lower end hooked over lower arm $361^b$ of bracket $361^c$. Spring $361^f$ urges distributor 230 in counter-clockwise direction, as viewed in Figure 8, into position adjacent the front of frame 50, in overlying and substantially parallel relation to track 130, and is effective for returning it to that position upon release of the distributor after delivery thereby of a pin to the pin receiving table 262. Plate 360 of distributor 230 is provided with a slot 362 (Figure 3) extending from its outer end and for nearly the full length thereof. At spaced intervals along slot 362, plate 360 is provided with opposed arcuate recesses 363 opening into slot 362 at opposite sides thereof, there being three pairs of such recesses. An upper holding plate 364 is slideably mounted on the upper face of plate 360 and normally is held in its inner or forward position relative thereto, by means of a tension spring 365, anchored at its outer end to a tab 366 extending upward from reduced neck 367 of plate 364. The inner end of spring 365 is anchored to a stud 368 fixed to base plate 360 and extending therefrom through slot 370 in neck 367. Plate 364 is further guided by studs 371 fixed to plate 360 and projecting through slots 372 in plate 364, and by studs 373 fixed to plate 360 and extending through slots 374 in plate 364. The stud 368 and the studs 371 and 373 have associated therewith nuts and washers for spacing plate 364 a slight distance above base plate 360 and restraining it against relative upward movement, as will readily be understood. Inward movement of plate 364 relative to plate 360, under the influence of tension spring 365, is limited by the studs just referred to, as will be obvious. Plate 364 is of materially less width than plate 360 and is provided with a lengthwise slot 376 extending from its inner end, of substantially the same length as slot 362 of plate 360 and disposed to register therewith. Plate 364 is also provided with pairs of opposed arcuate recesses 377 spaced therealong, corresponding to the recesses 363 of plate 360 but disposed inward relative thereto and out of register therewith, when plate 364 is held in its normal inward position by tension spring 365. By moving plate 364, relative to plate 360, outward a proper distance the recesses 377 are brought into register with the recsses 363 of plate 360 so as to define therewith an opening of a size to accommodate passage of the upper end or head portion of a pin. Plate 364 is moved to its outer position, in which it is latched, when the distributor is moved rearward into its position to deliver a pin to the rotating table 262, as will be explained more fully later.

Figures 3, 4, 4A, 4B:
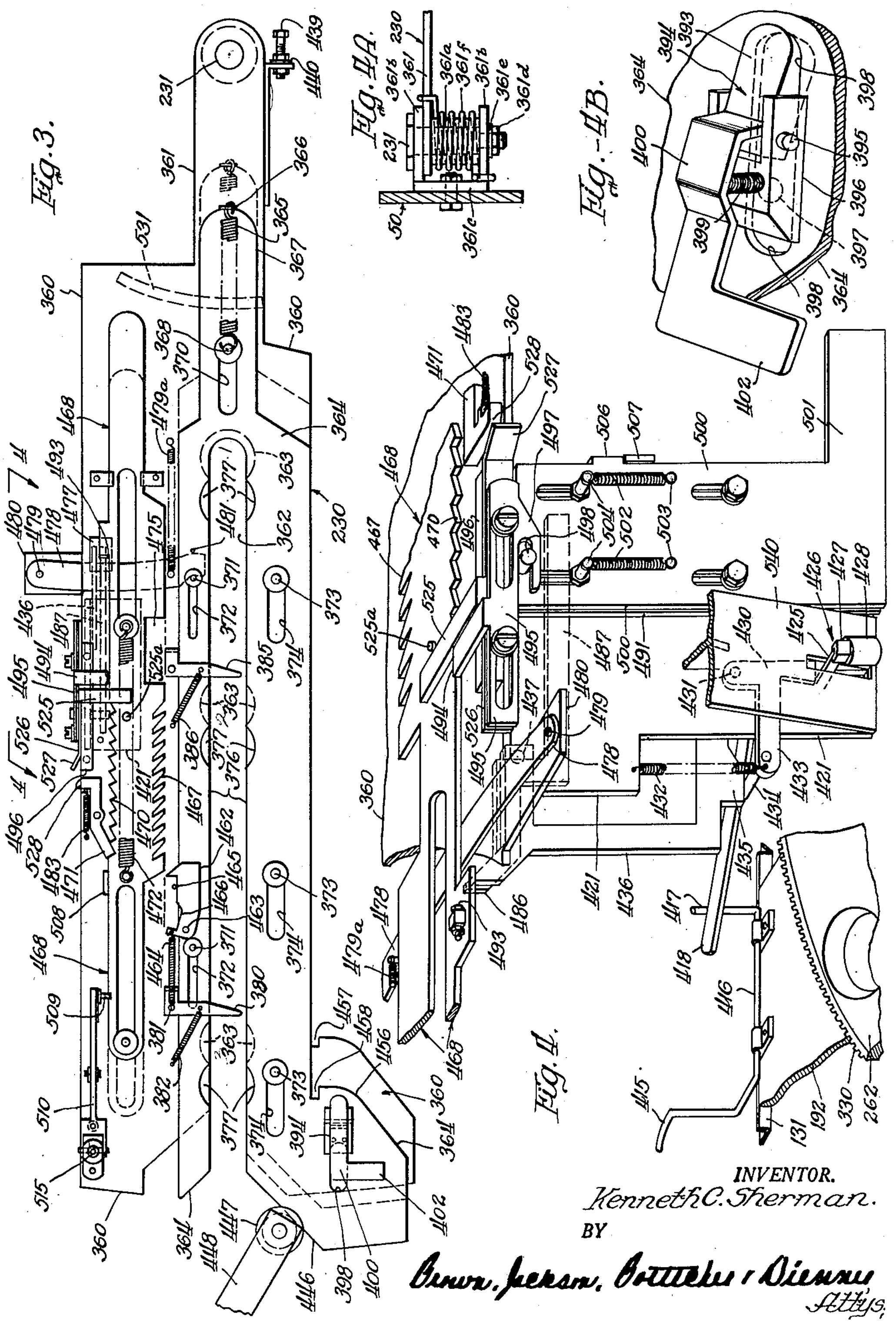
Figure 3 is a plan view of the distributor for placing the pins in the rotating table; with the housing removed.
Figure 4 is a fragmentary side view of the distributor, as seen from in back, this view also showing fragmentarily the rotatable pin receiving table and associated parts, taken substantially on line 4—4 of Figure 3.
Figure 4A is a detail view, from in back, of the distributor mounting means and the associated torsion spring, certain parts being broken away and the machine frame being shown fragmentarily and in section.
Figure 4B is an isometric detail view, on an enlarged scale, of the latch for the movable plate of the pin distributor and associated parts, the plate being shown fragmentarily and in part in section.

The three pairs of opposed recesses 363 of plate 360 constitute stations or positions on the distributor 230, which may be defined as the first, second and third positions, starting with the position nearest neck 361. When the carriage 132, with a pin therein, is moved across frame 50 of the machine, from left to right, the neck of the pin enters the inner ends of the slots 362 and 376. In the first part of the travel of carriage 132 toward the right, plate 364 of the distributor 230 is released and moved to its inner position and held there, by tension spring 365. In the continued travel of the carriage, the pin displaces a first pawl 380 pivoted at 381 on base plate 360, on a pin fixed to the base plate 360 (Figure 11) and urged in clockwise direction, as viewed in Figure 3, by a tension spring 382 anchored to this pawl and to plate 360. Movement of pawl 380 in clockwise direction beyond its position shown in Figure 3 is prevented by contact of this pawl with the adjacent edge of plate 364. When the pin passes beyond pawl 380, the latter is returned to its normal position by tension spring 382, as will be understood. In its continued travel lengthwise of distributor 230, in the carriage 132, the pin displaces a second pawl 385 pivoted on plate 360 and urged in clockwise direction, as viewed in Figure 3, by a tension spring 386 anchored to this pawl and to plate 360. Movement of pawl 385 in clockwise direction beyond its position shown in Figure 3 is prevented by contact of this pawl with the adjacent edge of plate 364. When the pin passes beyond pawl 385, the latter is returned to its normal position by tension spring 386, as will be understood.

In the continued travel to the right of the carriage 132 along track 130, the pin reaches the outer end of slot 376 and is then pulled out of the carriage, the jaws 137 of the latter opening for that purpose. That leaves the pin suspended by its neck in the distributor 230, at the outermost or first position therein. Immediately thereafter, the roller 164 (Figures 14 and 15) contacts a trip lever 387 (Figure 18) pivoted at its upper end on strip 113. The lever 387 has clevis and rod connections 388 to a lock detent 389 pivoted at its upper end, at 390, in a bracket 391 mounted on frame 50 adjacent the left hand side thereof. Detent 389 locks the distributor 230 in its pin receiving position, as will be explained more fully later.

Figure 18:
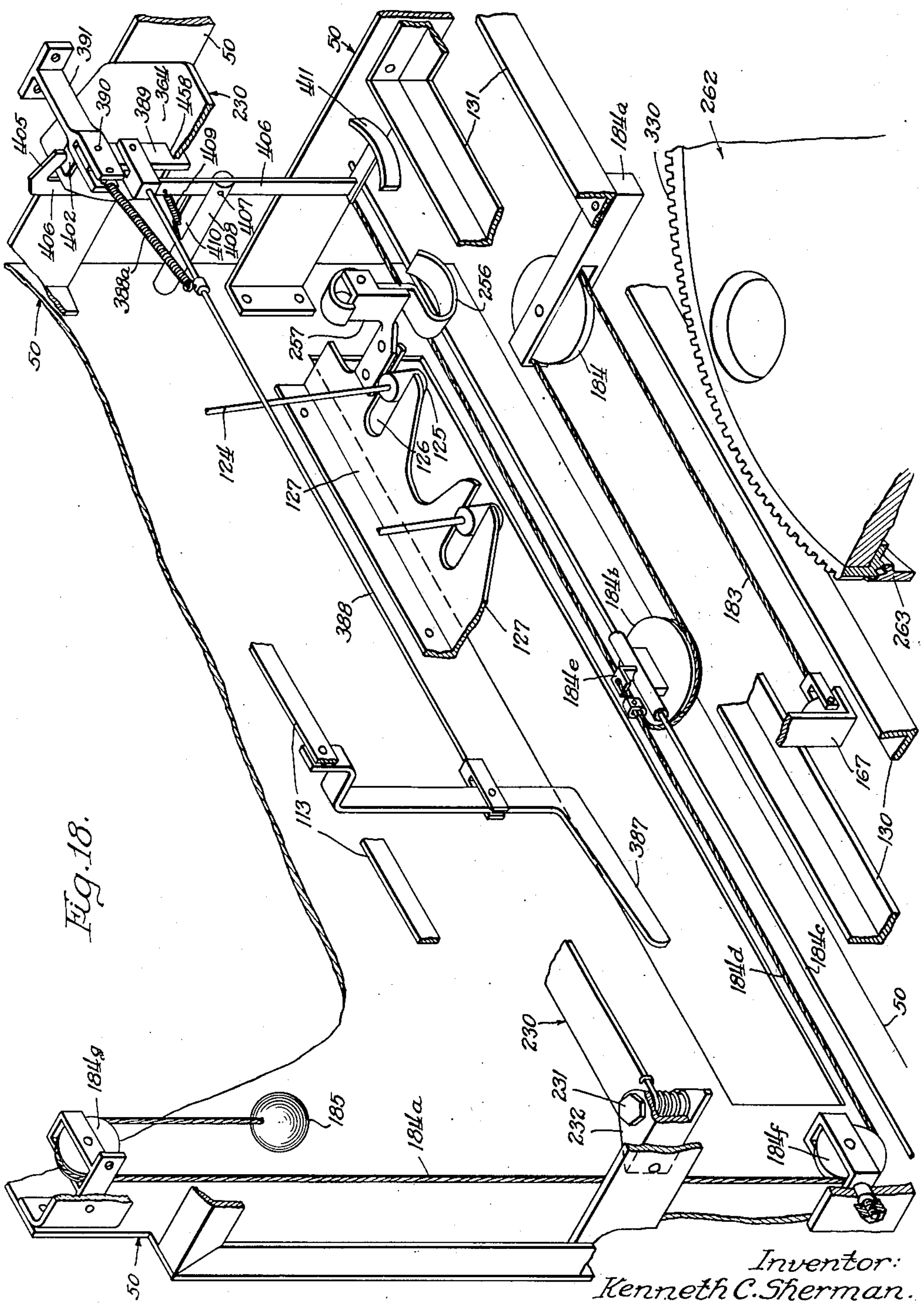
Figure 18 is an isometric view, looking toward the front of the machine, of the means for returning the pin carriage to the left hand side of the frame, and associated parts, the frame being shown fragmentarily with certain parts thereof broken away.

A latch member 394 (Figures 3 and 4B) is pivoted at 395 in a bracket 396 mounted on a stud 397 fixed in base plate 360 and projecting upward through a slot 398 in plate 364. Latch member 394 is urged in latching direction about pin 395, by a compression spring 399 confined between bracket 396 and the inner arm 400 of member 394. Arm 393 of latch member 394 is of rounded contour at its outer end and of proper size to engage in the outer end portion of slot 398, when the plate 364 has been moved a predetermined distance outward relative to plate 360, for lacthing plate 364 in its outer position, for a purpose which will be explained later. The latch member 394 is released, by means to be described, in the first part of the travel of carriage 132 to the right, thereby releasing plate 364 for inward movement, as stated above. As the carriage 132 approaches the right end of track 130, roller 164 (Figures 14 and 15) contacts the lower arm of trip lever 387 and swings it in clockwise direction, as viewed in Figure 18. Such clockwise movement of lever 387 swings the detent 389 into inoperative position, thereby releasing the distributor 230 for movement in clockwise direction, as viewed in Figure 8, about the pivot 231. Arm 400 of latch member 394 (Figures 3 and 4B) is provided with a trip finger 402 of considerable length extending forward therefrom, when the distributor 230 is in pin receiving position. At that time, finger 402 is disposed beneath bill 405 (Figure 18) of a trip lever 406 pivoted at 407 in post 408 mounted on frame 50. A tension spring 409 urges lever 406 toward its normal inoperative position, this spring being anchored to the lever and to a rib 410 on post 408. The inner or rearward end of rib 410 is disposed to be contacted by the forward edge of lever 406 when the later is in its normal position, as shown in Figure 18, and is effective for limiting movement of lever 406 in counterclockwise direction. At its lower end lever 406 carries a curved cam member 411 disposed for contact by extension 165 of plate 145 (Figure 15) of carriage 132, in the first part of the travel of carriage 132 from the left end of track 130 toward the right end thereof, as viewed in Figure 8, for delivering a pin to distributor 230, then latched in its normal forward position. When that occurs, the lever 406 is swung in such direction as to cause bill 405 to contact finger 402 so as to release plate 364, for inward movement relative to plate 360.

After the roller 164 has actuated the trip lever 387, as and for the purpose above described, the carriage 132 continues its travel toward the right of frame 50, as viewed in Figure 8, and contacts one arm 415 of a multiple crank trip lever 416 (Figure 4) rockably mounted on plate 192. The plate 192 is fixedly mounted in main frame 50, as previously noted, and lever 416 is disposed adjacent the rearward angle rail 131 of track 130 and adjacent the right hand end of track 130, as viewed from in front—adjacent the left hand end of track 130 in Figure 4, it being remembered that this figure is a view from in back of the distributor and looking toward the front of the machine. The lever 416 is provided with a finger 417 disposed to contact the forward edge of a lever 418 pivoted on a vertical axis, at 419 (Figure 10), on a sub-bracket 420 secured on a main angle bracket 421 secured to and depending from plate 360 at the rearward edge thereof—when the distributor is in pin receiving position. Lever 418 is urged toward its holding position by a compression spring 422, movement of this lever into that position being limited by a stop 423.

Figures 10, 11:
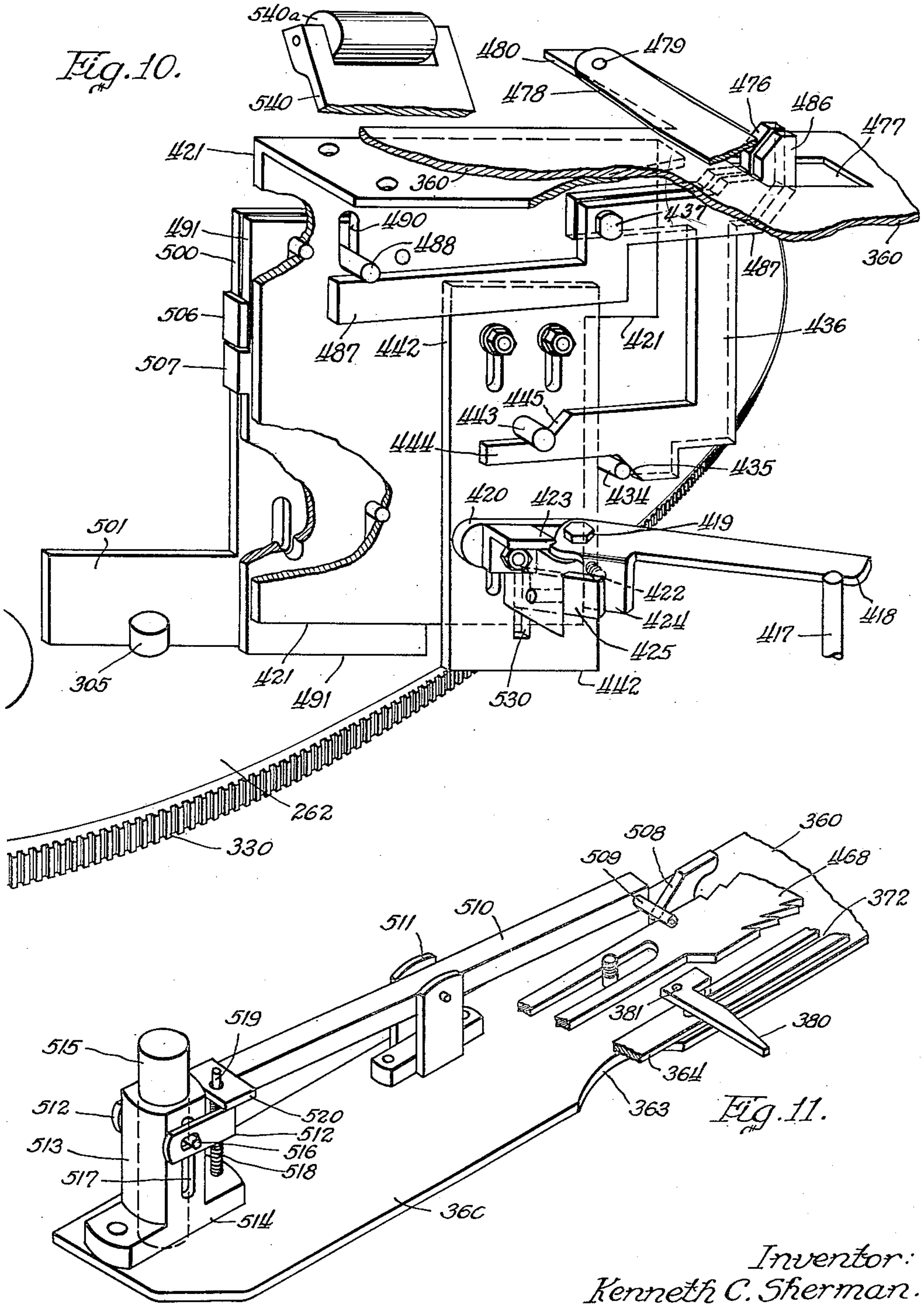
Figure 10 is an isometric back view of the shift plates of the pin distributor and associated parts, on an enlarged scale, certain parts being shown in section and the rotatable pin receiving table being shown fragmentarily.
Figure 11 is an isometric front view, on an enlarged scale, of the inner end portion of the distributor, showing the tenth pin holding plunger and associated parts.

When the lever 418 is in its holding position, a depending flange 424 thereof is disposed in overlying relation to the upper arm 425 of an angle lever 426 pivoted in the lower portion of bracket 420 (Figure 10). Arm 425 extends through the angle bracket 421 and the downwardly extending inner or rearward arm 427 of lever 426 carries a roller 428 at its lower portion (Figure 4). A locking pawl 430 is pivoted at its upper end, at 431, on the outer side of angle bracket 421, and is disposed, when in operative position, to lock arm 425 in position with its forward portion depressed or lowered. The pawl 430 is urged in holding direction, by a tension spring 432 attached to bracket 421 and to arm 433 of pawl 430. Stud 434, fixed to and projecting forward from arm 433, contacts a cam element 435 (Figure 10) of a U-shaped cam and shift lever 436 pivoted at 437 on angle bracket 421, when the locking pawl 430 is in its holding position. Pawl 430 is then effective for locking the angle lever 426 in its depressed or operative position, to which it is moved by gravity upon actuation of the multiple crank tripping shaft 416 by the carriage 132.

The outer or forward arm of lever 426 extends through a slot 530 (Figure 10) in a first pick-up plate 442, to be described more fully presently, slidably mounted for vertical movement on the forward face of bracket 421. Movement of plate 364 of distributor 230 to its outer position is effective for swinging the locking pawl 430 to the right, as viewed in Figure 4, clear of the inner arm of angle lever 426, and then raising the pick-up plate 442 into inoperative position, thereby raising the inner arm of angle lever 426 and depressing the outer arm thereof. The pawl 430 is then in inoperative position, in contact with the right side, as viewed in Figure 4, of angle lever 425, and lever 418 is then turned by compression spring 422 into operative position, with flange 424 thereof overlying arm 425 of angle lever 426. Lever 418 is then effective for holding the inner arm of angle lever 426 in raised position, thereby holding the pick-up plate 442 also in raised position, and for maintaining plate 442 and the inner or rearward arm of angle lever 426 raised when plate 364 of distributor 230 is released from plate 360 and moved to its inner position. In the continued travel of carriage 132 toward the right, after roller 164 has actuated trip lever 387, the carriage 132 actuates trip lever 416 thereby turning the holding lever 418 into its releasing or inoperative position. That releases the outer arm of angle lever 426. The pick-up plate 442 then drops down into operative position, and the rearward arm of angle lever 426 also drops down into operative position, in which it is latched by pawl 430 as above described. Roller 428, at the rearward end of angle lever 426, and pick-up plate 442 are then held in lowered position, and flange 424 of the holding lever 418 is held in contact with the right side, as viewed in Figure 10, of arm 425 of angle lever 426, when lever 418 passes out of contact with finger 417 of lever 416, as the distributor swings rearward over the revolving table 262. The roller 428, when in lowered position, extends downward beyond pick-up plate 442, the lower edge of which, when in lowered position, is disposed to clear the cams 350 on table 262.

After arm 425 has been released by the carriage in the manner stated, the carriage continues its travel to the right, the drum 189 is declutched from stub shaft 190, and the carriage 132 is then held in its position at the right of frame 50 by the latch member 225; as previously described. The torsion spring $361^f$ urges the distributor 230 in counter-clockwise direction about its pivot 231, as viewed in Figure 8, in the manner previously described. In the rotation of table 262, one of the cams 350 thereof engages the roller 428 and swings the distributor 230 rearward toward table 262. In the first part of the movement of the distributor in that direction, an abutment 439 (Figures 3 and 14), carried by plate 360, passes out of contact with arm 223 of latch 219, which is then turned by compression spring 222 into position with its bill engaging the detent element 217 of arm 214, so as to retain this arm in its position holding the clutch shift lever 211 (Figure 17) raised, as and for the purpose previously described. Shortly thereafter a second abutment 440, carried by plate 360, contacts cam element 229 (Figure 14) of latch member 225, disengaging this member from bracket 161, after which the carriage 132 is returned to the left side of frame 50 in the manner previously described. During the travel of the carriage to the left of the frame it receives another pin delivered thereto from one of the pin boxes 98, as has been described above.

As the distributor 230 swings rearward toward table 262, it displaces the stop arm 250, as indicated by the dot and dash lines in Figure 8, until the distributor passes the end of arm 250, which then snaps into position in front of the distributor restraining it against movement in counter-clockwise direction, at which time the cam 350 passes out of contact with roller 428. Immediately thereafter, the plunger 322 of one of the three outer pin buckets of table 262 contacts a first pick-up plate 442 (Figure 10) slideably mounted for vertical movement, by pin and slot means, on the front face of bracket 421 and then held by gravity in projected position extending downward a material distance beyond the lower edge of bracket 421. Plate 442 carries an inwardly protecting stud 443 which overlies reduced element 444 of member 436, a short distance from a cam shoulder 445 formed on the latter member. In the continued rotation of table 262, the plunger 322 in contact with plate 442 swings the distributor 230 a further distance in clockwise direction, bringing an inclined camming edge 446 (Figures 3, 8 and 14), at the inner end of plate 364, into contact with a tripping roller 447. This roller 447 is mounted on an arm 448 adjustably secured, in any suitable known manner, to the inner end of an arm 449. This arm 449 is mounted on a headed pin or bolt 450 (Figure 14) passing through a sleeve 451 suitably secured to track 354, the bolt 450 also passing through an angle brace 452 extending from frame 50. A torsion spring 453, mounted about sleeve 451, urges arms 449 and 448 in counter-clockwise direction as viewed from above, about bolt 450, movement of the arms in such direction being limited by an upwardly extending flange 454 of brace 452, constituting a stop element. In the continued swing of distributor 230 in clockwise direction, plate 364 (Figure 3) is forced outward along plate 360, by contact of the camming edge 446 of plate 364 with roller 447, in opposition to tension spring 365, until the recesses 377 of the first station or position of plate 364 are brought into register with the corresponding recesses 363 of the underlying plate 360. That occurs when the pin carried by the distributor 230 is vertically aligned with one of the three outer pin buckets of table 262, the operation of the parts being appropriately timed to that end. In that connection, it will be noted that the distributor 230 swings about a fixed axis with the several stations fixed distances from that axis, and is swung rearward over the rotating table 262 by a plunger carried by that table. By properly positioning the roller 447 assurance is had that a pin carried by the distributor 230, at any one of the stations thereof, is vertically aligned with a pin bucket of the corresponding series of buckets of table 262, or with the central pin bucket of table 262, as the case may be, when plate 364 is moved outward into pin releasing position by roller 447. In that manner the pin is released from the distributor 230 and is deposited in one of the buckets of table 262, causing lowering of the plunger 322 corresponding to that bucket into position clear of plate 442. Since, as previously noted, cam 350 has passed out of contact wth roller 428 and is now out of the path of movement thereof forward with distributor 230, the lowering of plunger 322 releases the first pick-up plate 442 and the distributor 230 is then returned, by torsion spring $361^f$, to position in contact with the rearward end of stop arm 250, if that arm is then in its normal operative position. Usually, however, the carriage 132 will, at that time, be at the left end of its track 130, holding the stop arm 250 in its outer or inoperative position, so that distributor 230 will continue its movement in counter-clockwise direction until it is returned to receiving position. It should be noted that when plate 364 is moved outward along plate 360 into pin releasing position, it is locked in that position by the latch member 394 (Figure 4B). As the distributor 230 approaches its receiving position, cam surface 456 of plate 364 (Figures 3 and 18), which is then latched in its outer position displaces detent 389, in opposition to tension spring $388^a$, and when distributor 230 reaches its full outer or receiving position detent 389 snaps into aligned notches 457 and 458 in plates 360 and 364, respectively, thereby locking the distributor in its receiving position, with finger 402 of latch member 394 (Figures 3 and 4B) underlying bill 405 of the trip lever 406.

As the distributor reaches that position, the adjustable abutment 439 thereon contacts arm 223 of latch member 219 (Figure 14) releasing detent 217 of arm 214, which is then moved by tension spring 216 into position to lower clutch lever 211, thus clutching the drum 189 to stub shaft 190. The second abutment 440 on distributor 230, disposed for contact with cam element 229 of latch member 225, when the distributor 230 swings rearward, as and for the purpose above described, is then clear of cam element 229 of latch member 225.

It will be remembered that in the rearward swinging of distributor 230, into position for delivering the pin to the bucket of table 262, the carriage 132 is released and is returned to the left end, as viewed from in front, of the track 130, receiving a pin during its travel in that direction. Accordingly, carriage 132, with a pin in it, is now disposed at the left end of track 130, as viewed from in front—the right end in Figure 18—with the forwardly tapered extension 165 of plate 145 (Figure 15) a short distance to the right, as viewed in Figure 18, of cam member 411. Upon clutching of drum 189 to stub shaft 190, the carriage 132 travels along track 130 toward the right of frame 50, as viewed from in front, toward the left as viewed in Figure 18. During the first part of the travel of this carriage, the leading edge of the forwardly tapered extension 165 of plate 145 (Figure 15), then held lowered by the pin in the carriage, contacts the arcuate cam member 411 (Figure 18) of lever 406, thus actuating the latch member 394 so as to release plate 364, the latter being then returned to its normal position by tension spring 365 (Figure 3). If for any reason the carriage is empty, due to a pin not having been delivered thereto, the extension 165 of plate 145 will be disposed above cam member 411 so as to clear the latter, plate 364 then remaining latched to plate 360, in its outer position relative thereto. In such a case, in the continued travel of the carriage to the right the distributor 230 will be released and swung inward or rearward toward the rotating table 262, as before, but no pin will be delivered to that table and the plate 364, being latched in its outer position, will not be moved relative to plate 360, and thereafter the distributor will be returned to its receiving position as before. If there is a pin in the carriage, this pin will be delivered by the carriage to the distributor and deposited by the latter in a bucket of the table 262, in the manner above described.

An actuating pawl 462 is pivoted at 463 (Figure 3) on plate 364 adjacent the inner side of slot 376 thereof. This pawl 462 is urged in counter-clockwise direction, as viewed in Figure 3, by a tension spring 464 anchored thereto and to the pivot 381 of pawl 380. Movement of pawl 462 in such direction is limited by a post 465 carried by plate 360, and pawl 462 is provided with a portion 466 of reduced width. This pawl 462 cooperates with a series of adjusting teeth 467 along one side of a rack bar 468 slideably mounted on plate 360 for limited movement in either direction lengthwise thereof, by bolt and slot means. Rack bar 468 is provided at its other side with a series of holding teeth 470 engaged by a spring pressed holding pawl 471 pivoted on plate 360. Pawl 471 is urged in holding direction by a tension spring 483 anchored thereto and to plate 360. A tension spring 472, anchored at one end to bar 468, and at its other end to a stud fixed in plate 360 and extending through one of the slots in bar 468, urges the latter toward the outer end of plate 360. In the initial position of rack bar 468, pawl 380 is disposed inward beyond the toothed area of the rack bar 468, and the pawl 385 is disposed in substantial alignment with a notch 475 in bar 468, a short distance outward thereof beyond teeth 467.

The upper end portion of cam member 436 (Figures 3, 4 and 10) is formed to provide a cam element 476 which extends through a slot 477 in base plate 360 of the distributor 230. A cam arm 478 is pivoted at its rearward end, at 479, to a rearwardly extending finger 480 of plate 360. This arm 478 extends between rack bar 468 and plate 360 and between the latter plate and the inner or rearward side portion of plate 364. Arm 478 is held in contact with a pin 481 secured in and carried by plate 364, by a tension spring 479a anchored to plate 360 and to arm 478. When plate 364 is in its outer position, cam arm 478 extends across a slot 477 in plate 360, through which slot extend cam element 476 of the cam and shift lever 436 and cam element 486 of a shift lever 487, to be referred to more fully presently. The cam arm 478 is then in its outer position, in overlying relation to the cam elements 476 and 486, effective for holding them depressed. Movement of plate 364 to its inner position shown in Figure 3 moves rack bar 468 inward the distance of one tooth and also swings cam arm 478 clockwise into its inner position, clear of the cam elements 476 and 486. That releases cam element 476 for upward movement, but cam element 486 is still held down by the rack bar 468, until the latter has been moved inward a distance of four teeth, as will be explained more fully presently.

When the plate 364 is moved outward relative to plate 360, the narrower portion 466 of pawl 462 is brought opposite post 465, and this pawl is then moved into engagement with one of the teeth 467 of the rack bar 468. The rack bar 468 is initially in its outermost position shown in Figure 3, effective for holding cam element 486 depressed, as previously stated. Upon release of plate 364, by actuation of the latch member 394 in the manner previously described, the rack bar 468 is moved inward along plate 360, by pawl 462, a distance of one tooth, in which position it is retained by the holding pawl 471. When the third pin has been delivered to the outside buckets of rotating table 262 and the distributor 230 has been returned to and latched in its forward position, with plate 364 in its outer position and latched to plate 360, the rack bar 468 is in such a position that the bill of pawl 385 is disposed for contact with the edge of rack bar 468 at the area thereof outward beyond notch 475.

When the next or fourth pin is delivered by the carriage 132 to the distributor, it contacts stop pawl 385, which is now held by rack bar 468 against turning in counterclockwise direction, as viewed in Figure 3. In the continued travel of the carriage 132 toward the right the pin is pulled therefrom so as to be suspended at the second position or station of the distributor. Also, in the first part of the travel of carriage 132 toward the right, for delivering the fourth pin to distributor 230, plate 364 is released from plate 360 and moved inward relative thereto. That moves the rack bar 468 inward a further distance of one tooth 470 thereof, into such position that it is clear of cam element 486 of lever 487, cam arm 478 being then also clear of cam element 486, as previously explained. Cam element 486 extends upward from one arm of a shift lever 487 (Figure 10) pivoted on bracket 421 on the same pin 437 on which the U-shaped shift lever 436 is pivoted. The other arm of lever 487 underlies a stud 488, extending through a slot 490 in bracket 421 and fixed to a second position shift plate 491 (Figures 4 and 10) slideably mounted for vertical movement on the outer face of bracket 421 at the opposite side thereof from plate 442. Upon release of shift lever 487, plate 491 is moved downward by gravity, into position to be contacted by the plungers 322 of the intermediate set or group of six buckets of the rotating table 262. The lower edge of pick-up plate 491, when in its lowered position, is disposed to clear the cams 350 on the rotating pin receiving table 262. As the table rotates the plungers thereof successively pick up plate 491, it being noted that the first position pick up plate 442, which is also in its lowered position, is out of the path of travel of the last mentioned plungers. The pins are delivered successively from the distributor 230 to the six buckets of the intermeditae group, in the same manner in which the pins were delivered to the three buckets of the outer group. The rack bar 468 is advanced inward a distance of one tooth for each pin delivered, as before.

When the plate 364 is released from plate 360, in the first part of the travel of carriage 132 to the right, for delivering the tenth pin to the distributor 230, after delivery by the distributor of the ninth pin to table 262 and return of distributor 230 to its normal forward position, several things occur. An adjustable abutment 493 carried by rack bar 468 (Figures 3 and 4) contacts a finger 494 of a latch member 495 slideably mounted on a block 496 fixed to plate 360, adjacent the inner or rearward edge thereof. The latch member 495 is provided with a depending hook bill 497, which normally engages beneath a stud 498 secured to a third pick-up or shift plate 500 slideably mounted at the inner or rearward face of plate 491 and having, at its lower end, an arm 501 projecting inwardly toward the inner end of the distributor. Preferably, suitable means, conveniently two tension springs 502, anchored to studs 503 secured to plate 500 and studs 504 secured to bracket 421, is provided to counteract, to a certain extent, the weight of plate 500, to assist in raising thereof. When the abutment 493 contacts finger 494, latch member 495 is moved inward with rack bar 468, withdrawing the bill 497 from beneath stud 498, permitting movement of pick up plate 500 to its lower position, in which a finger 506 (Figure 10) secured to this plate 500 rests upon a similar finger 507 secured to the second position pick-up or shift plate 491, also in lowered position at this time. When plate 500 is in lowered position, its lower edge is disposed to clear the cam strips 350 on the pin receiving table 262. Also, a cam 508 (Figures 3 and 11) carried by the rack bar 468 contacts a roller 509 mounted at the outer end of and projecting laterally from a lever 510 pivoted in a bracket 511 mounted on plate 360. Lever 510 is provided, at its inner end, with a fork 512 which straddles the sleeve 513 of a bracket 514 mounted on plate 360 adjacent the inner end thereof. Plunger 515 is slideably mounted in sleeve 513 and has secured thereto pins 516 projecting through slots 517 in sleeve 513 and extending through slots in the arms of fork 512. A compression spring 518 is mounted about a pin 519 secured in bracket 514 and extending through a flange 520 secured to lever 510. This spring 518 is confined between the bracket and flange 520 and urges the inner end of lever 510 upward, so as normally to hold plunger 515 in retracted or raised position.

When the cam 508 contacts roller 509, it forces the outer end of lever 510 upward, thus projecting plunger 515 below plate 360. That occurs when plate 364 of the distributor 230 is released and moved inward, in the first part of the travel of carriage 132 to the right, for delivering the tenth pin to the distributor 230. When the latch member 495 is moved into position releasing plate 500, finger 494 (Figures 3 and 4) thereof is brought into position in contact, or substantially so, with the outer edge of a finger 525 of a cam member 526 slideably mounted on block 496, between the latter and latch member 495. This cam member 526 is provided, at its inner end, with an inclined cam element 527 disposed to contact the rearward or inner arm 528 of the holding pawl 471. Also, when the rack bar 468 is in the position which it occupies when the distributor is conditioned for reception of the tenth pin, the portion of the rack bar contiguous to the inner end of the series of teeth 467 is disposed for contact by the inner or rearward arm of pawl 380, thus locking this pawl against turning movement.

As the carriage 132 moves along track 130, toward the distributor 230, the neck of the pin enters the distributor slot and contacts stop pawl 380, after which the carriage continues its travel and the pin is removed therefrom and suspended in the distributor at the third position thereof. It will be understood that in the first part of its travel the carriage causes actuation of the latch member 394 so as to release plate 364 for forward or inward movement, as previously explained, the parts then occupying their positions just stated, and that as the carriage approaches the end of its travel toward the right, the roller 428 is moved into its lowered position. This roller is then picked up by one of the cams 350, so as to swing the distributor 230 inward or rearward toward the rotating table 262. The distributor is then held in position by the stop arm 250, as previously described, it being understood that at this time the plungers of the three outside and the six intermediate buckets of table 262 are all in depressed or lowered position.

As the table 262 continues to rotate, a suitably disposed post 529 fixed thereon picks up arm 501 of plate 500 and swings the distributor 230 into its full line position shown in Figure 8. As the distributor reaches that position, cam surface 446 (Figure 3) of plate 364 contacts roller 447 (Figures 8 and 14) and the plate is displaced outward thereby, whereby the pin is released and delivered to the center bucket of table 262. In the outward movement of plate 364, arm 478 swings in counter-clockwise direction (Figure 3), depressing the cam elements 476 and 486 (Figure 10). Depressing cam element 476 swings the cam and trip lever 436 clockwise, as viewed in Figure 10, and cam 435 moves stud 434 downward, thereby swinging pawl 430 to the right, as viewed in Figure 4, clear of arm 425 of angle lever 426. That releases the arm 425, the inner or rearward portion of which may then be raised in the continued clockwise movement of the cam and trip lever 436. That raises all of the shift or pick-up plates into their inoperative positions, and also raises roller 428 into its inoperative position. In that connection, it will be noted (Figure 10) that arm 425 passes through a vertical slot 530 in plate 442, of such extent that arm 425 is raised by plate 442. When arm 425 has thus been raised, lever 418 is returned by compression spring 422 to its holding position, with flange 424 overlying arm 425 latching it in raised position. The shift or pick-up plates 442, 491 and 500 are then also held raised by arm 478 and the associated cam members and pins and the fingers 506 and 507 of plates 500 and 491, respectively. In that manner, all of the shift or pick-up plates and the roller 428 are returned to their raised or inoperative positions, and retained in such positions, incident to release of the tenth pin from the distributor. But the plunger 515 remains in its downward projected position, since the rack bar 468 is still locked by the holding pawl 471 (Figure 3) in its inner position.

Entry of the pin into the center bucket releases latches 270 (Figure 19) and raises the plungers 303 and 305, in the manner previously described. Since, as noted, all of the pick-up plates are now raised, the plunger 305 is of a length to project above the table 262 to a greater extent than plunger 303, sufficient to contact the arm 501 of plate 500 (Figure 10). In the continued rotation of table 262, the distributor is swung in clockwise direction about its pivot 231, from its full line position of Figure 8 to its position indicated by dot and dash lines. In this movement of the distributor, plunger 515 contacts the inclined surface of bill 333 of hook member 334 swinging the latter in counter-clockwise direction in opposition to its associated torsion spring 336, after which the bill of hook 334 snaps into position in front of plunger 515 thus locking the distributor 230 in its inoperative position referred to, indicated by the dot and dash lines. As the distributor is moved into this position, a suitably disposed cam flange 531 (Figures 3 and 17) secured to and depending from plate 360, contacts roller 206 and declutches pinion 196 from shaft 69 in the manner previously described. It should be noted that at the time the hook 334 engages plunger 515, the plunger 305 passes out of contact with arm 501 of plate 500.

When the pinion 196 is declutched from shaft 69, the table continues to rotate due to inertia. The plunger 303 (Figure 21) raises gravity pawl 532 pivoted in block 533, mounted on plate 342 above the hook member 341. The pawl 532 then drops into position in back of plunger 303, movement of pawl 532 in reverse direction being positively limited by block 533. The plunger 303 then contacts bill 340 of hook member 341 and moves the latter member in forward direction, in opposition to the tension spring 344. This spring retards and then stops rotation of table 262 and then contracts so as to draw the plunger 303 into position in contact with pawl 532, the plunger being then confined between the pawl 532 and bill 340 of member 341, holding table 262 in desired predetermined angular position, as previously described. That completes the operation of delivering the ten pins to the table 262, the distributor 230 remaining in its position indicated by dot and dash lines in Figure 8, in which it is held by the hook 334.

During the referred to movement of the distributor in delivering the tenth pin to the table 262, the carriage 132, with a pin therein, has been returned to position at the left of the machine. The pins are removed from the buckets of table 262 by setting up means, mounted for vertical movement in frame 50, which will be described later. A disk 535 (Figure 22) is suspended by rods 536 from table 262, downward movement of this disk relative to table 262 being limited by abutments 537 on the rods. This disk 535 has openings therein which accommodate the pin buckets and their appurtenances, the areas of the disk between such openings being disposed to contact adjustable abutment members 538 secured in the lower ends of the plungers 322. The pin setting means, above referred to, in its upward travel into position to remove the pins from the buckets, carries with it the disk 535. This disk contacts abutment members 538, returning the plungers 322 to their raised positions. Disk 535 also contacts two angle arms 539 (Figures 19 and 22) projecting substantially radially from ring 266, thus raising the ring 266 into its upper position, in which it is again held between latch members 270, while also moving the plungers 303 and 305 to their lowered positions. After the pin setting means has removed the pins from the buckets of table 262, it moves downward and, at a predetermined point in its downward travel, actuates the holding hook 334 so as to move it into its releasing position, above referred to, so as to be disengaged from the plunger 515. When that occurs, the distributor 230 is returned to its pin receiving position at the front of the frame, the carriage 132 being then at the left of frame 50, holding stop arm 250 in position to clear the distributor, as previously described. The distributor is locked in its pin receiving position, as before, preparatory to delivering a second set of pins successively to the buckets of the table 262 in the manner above explained.

During the first part of the return movement of the distributor to its pin receiving position, the cam flange 531 is moved out of contact with roller 206, so that the pinion 196 is again clutched to shaft 69 for rotating the table 262, in order that the proper movements may be imparted to the distributor for delivery of pins thereby to the buckets of the table. It will be noted that the bracket 421 of distributor 230 (Figures 4, 8, 10 and 14) has secured thereto an upwardly extending arm 540 carrying a roller $540^a$ which travels against the underface of an arcuate track 541 mounted in frame 50, and in conjunction with track 354 and rollers 352, holds the distributor at its inner end against side twist and sag in a manner to prevent objectionable binding of parts.

When the distributor 230 is returned to its normal forward position, after delivery thereby of the tenth pin to the center bucket of table 262, rack bar 468 is in its inner position, above mentioned, in which plunger 515 is held in its downwardly projected position by cam 508 and cam member 526 is disposed with cam element 527 thereof in proximity to inner arm 528 of holding pawl 471, plate 364 of distributor 230 is latched in its outer position, all of the pick-up plates are held in raised position by the cam arm 478, the pawl 430 is in inoperative or releasing position, the inner arm of angle lever 426 is raised, and the flange 424 of holding lever 418 is engaged over the outer portion or arm 425 of angle lever 426 holding it in depressed position. During the first part of the travel of the carriage 132 along the track 130, toward the right, for delivering the first pin of a succeeding set to distributor 230, plate 364 is unlatched from plate 360. Plate 364 is then moved inward by tension spring 365, as has been explained. When plate 364 moves inward, the rack bar 468 is moved inward a further distance of one tooth 470 thereof, by pawl 462, as explained above. In such further inward movement of rack bar 468, cam element 527 of cam member 526 turns the holding pawl 471 (Figure 3) into releasing position. That releases the rack bar 468 which is then returned to its outer position, by tension spring 472. In the return movement of rack bar 468 to its outer position, a stud 525ª carried thereby picks up finger 525 of cam member 526, and finger 525 picks up finger 494 of latch member 495. The cam member 526 is then returned to its normal position, releasing holding pawl 471 for engagement with teeth 470 of rack bar 468, and the latch member 495 is returned to latching position with hook bill 497 thereof engaged under stud 498 secured to the third pick-up plate 500. In that connection, when plate 364 of distributor 230 moves inward, the angle lever 426 is held in position with its inner arm raised, by holding lever 418, and holds the first pick-up plate 442 in its raised position. The second and third pick-up plates 491 and 500 drop when plate 364 of the distributor 230 moves inward. However, when the rack bar 468 moves outward, it depresses cam element 486 (Figure 10) thereby raising pick-up plate 491 and with it, by means of the fingers 507 and 506, pick-up plate 500. The rack bar 468 is of proper extent lengthwise, at its body portion, to assure that the third pick-up plate 500 will be in fully raised position before latch member 495 starts to move in latching direction, so that hook bill 497 of latch member 495 will certainly pass beneath stud 498, thereby latching plate 500 in raised position. Thereafter, in the continued travel of the carriage 132 to the right, the first pin of the succeeding set is delivered to the distributor 230, and the latter is released and delivers the pin to a bucket of the pin receiving table 262, in the manner previously described. From what has been said, it will be understood that when each pin is delivered by distributor 230 to table 262, all of the pick-up plates which may then be in lowered position are raised and held raised by cam arm 478, incident to outward movement of plate 364 incident to delivery of the pin therefrom. Also, when the plates are raised, pawl 430 (Figure 4) is swung to releasing position preliminary to raising of the first pick-up plate 442, and flange 424 of holding lever 418 holds the inner arm of angle lever 426, and with it plate 442, raised when plate 364 of distributor 230 moves inward and until lever 418 is moved into releasing position, by carriage 132 in the travel thereof to the right along track 130, as above explained.

The setting up means, previously referred to, comprises a rectangular plate or table 542 (Figures 9 and 23) mounted on tracks 543 for movement toward and away from the front of main frame 50 of the machine. Plate 542 is carried by a frame, including the tracks 543 and connecting cross angle members 544. Guide rods 545, anchored at their lower ends to the table frame, comprising tracks 543 and members 544, at the corners thereof, extend upward into tubular shafts 546 (Figure 6) slideable in sleeves 547 fixed to frame 50 at the corners thereof, shafts 546 having collars 548 secured on their upper ends limiting their downward movement through sleeves 547.

The plate or table 542 normally is held in its rearward position in its frame 543 by a forwardly projecting arm 550 secured thereto, contacting at its forward end an angle latch bar 551 normally disposed with its lower portion interposed between arm 550 and the angle member 544 at the front of the table frame. The latch bar 551 is pivoted intermediate its ends on angle member 544 by a pivot pin 552, and is suitably attached at its other end to the movable core 554 of a solenoid 555 suitably mounted on the front angle bar 544 of the table frame. Core 554 is urged upward by a compression spring 554ª mounted thereabout. Energization of the solenoid 555 is controlled by a suitably located switch (not shown), conveniently mounted on or adjacent the post at the forward end of the alley. Tension springs 556, anchored to the front angle bar 544 of the table frame and to the table 542, urge the latter in forward direction. When the solenoid 555 is energized, the latch bar 551 is moved into releasing position, permitting table 542 to move into its forward position, as limited by the forward angle frame member 544. In that position of the table 542, the pin receiving and gripping mechanisms thereof, to be described presently, are disposed in suitable vertical alignment with the respective pin buckets of the rotatable table 262.

The table 542 is provided with ten openings 557 (Figure 9) therethrough, arranged correspondingly to the arrangement of the pins on the alley. The central point of each opening, when table 542 is in its forward position is coincident with the vertical axis of the corresponding bucket of the overlying rotatable table 262, except as to the two openings 557ª corresponding to the No. 10 and No. 7 pins, the center points of the two latter openings being to one side of the vertical axes of the corresponding buckets, due to the fact that No. 10 and No. 7 pins are located near the gutters. The openings 557 measure approximately 8⅜" x 8½", and the openings 557ª each measure 8⅜" x 7¼". That provides adequate allowance for displacement of any pin from its spot on the alley, since if a pin were displaced to a greater extent than provided for by the openings, it would be knocked down or off of the alley and would become deadwood. Due to the considerable area of the openings in the table 542, ample allowance is made adequately to take care of any off spot pins. Each of the openings 557 and 557ª of the setting up table 542 has associated therewith a gripping and clamping unit 560 for raising from the alley any off spot pins, assuring that such pins will be returned to the precise locations from which they are raised, and for removing pins from the buckets of the rotatable table and accurately placing them in their proper spot positions on the alley, as will be explained later.

Four pairs of parallel cross threaded shafts 558 (Figure 9) are rotatably mounted above table 542, in suitable brackets 559 secured thereto. The shafts 558 carry pairs of opposed gripping and clamping members 560ª and 560ᵇ, one pair for each opening in table 542, the members of each pair travelling toward and away from each other in the rotation of the shafts 558. Each of the shafts 558 has a worm wheel 561 secured thereon, meshing with a worm 562 (Figure 9) secured on a countershaft 563 rotatably mounted in bearing brackets 564 secured to table 542. A bevel gear 565, secured on one end of shaft 563, meshes with a bevel pinion 566 secured on one end of a drive shaft 567 rotatably mounted in bearing brackets 568 secured to table 542. At its other end drive shaft 567 has driving connection, through a speed reducer 897, as will appear more fully later, to an electric motor 572 mounted on table 542. It will be seen that when motor 572 is in operation, the shafts 558 are rotated and the pin gripping and clamping members $560^a$ and $560^b$ may be caused to travel in proper directions along the shafts 558 for effecting their intended operations, in a manner to be explained presently. In order to cause travel of the gripping and clamping members 560 in proper directions, the direction of drive of the motor 572 is reversed at appropriate times, by means which will be described later.

Figures 27, 28:
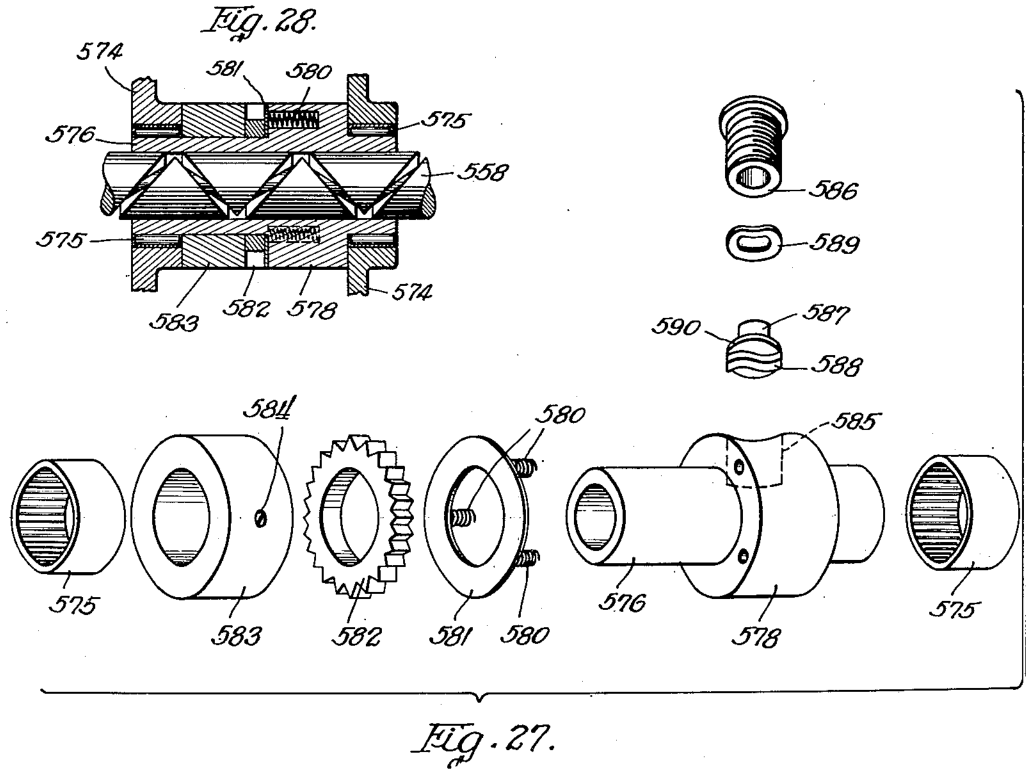
Figure 27 is an isometric disassembled or exploded view of one of the slippage clutch mechanisms for establishing driving connection between the pin gripping members and their associated cross threaded shafts.
Figure 28 is a lengthwise sectional view of the mechanism of Figure 27 mounted on a cooperating cross threaded shaft, the latter being shown fragmentarily and in elevation.

Each of the members $560^a$ and $560^b$ comprises a frame 573 (Figure 24) having, at its lower portion, spaced apart frame members 574. These frame members 574 carry needle bearing structures 575 (Figures 27 and 28) which rotatably support a sleeve 576 which receives one of the shafts 558. Sleeve 576 is provided with a relatively thick collar 578 having bores extending from one end parallel with sleeve 576. Each of these bores receives a compression spring 580 the outer ends of which bear against a friction ring 581, of bronze or other suitable material, mounted about sleeve 576. The friction ring 581 bears against one face of a ratchet wheel 582 mounted on sleeve 576 and free therefrom, the other face of ratchet wheel 582 bearing against a stop collar 583 fixed by a set screw 584, or in any other suitable manner, on sleeve 576. Collar 578 is also provided with a threaded radial bore 585 receiving a cap nut 586 fitting about shank 587 of a suitably formed dog 588 engaging the thread of shaft 558. A spring washer 589, confined between the inner end of cap nut 586 and a shoulder 590 on dog 588, urges the latter inward so as to retain it in engagement with the thread of shaft 558.

If the ratchet wheel 582 is held against rotation, the slippage connection between that wheel and the collar 578 offers sufficient resistance to rotation of sleeve 576 to cause travel of the latter along shaft 558, so long as such travel of the sleeve is not positively stopped. In the latter case, however, the sleeve 576 will rotate with shaft 558 in contact with the stop, so long as the shaft is rotated in a direction tending to move the sleeve toward the stop. When the ratchet wheel 582 is not restrained against turning movement, the sleeve 576 is free to rotate as a unit with the ratchet wheel 582 and with shaft 558, rotation of this shaft then not imparting movement to sleeve 576 lengthwise thereof. Referring to Figure 9, the bearing brackets 559 spaced along the shaft 558, and the bearing brackets $559^a$ at the ends of the shafts, constitute stops for positively limiting movement apart of the pin gripping and clamping members $560^a$ and $560^b$ of the respective pairs thereof or units 560.

Figure 24:
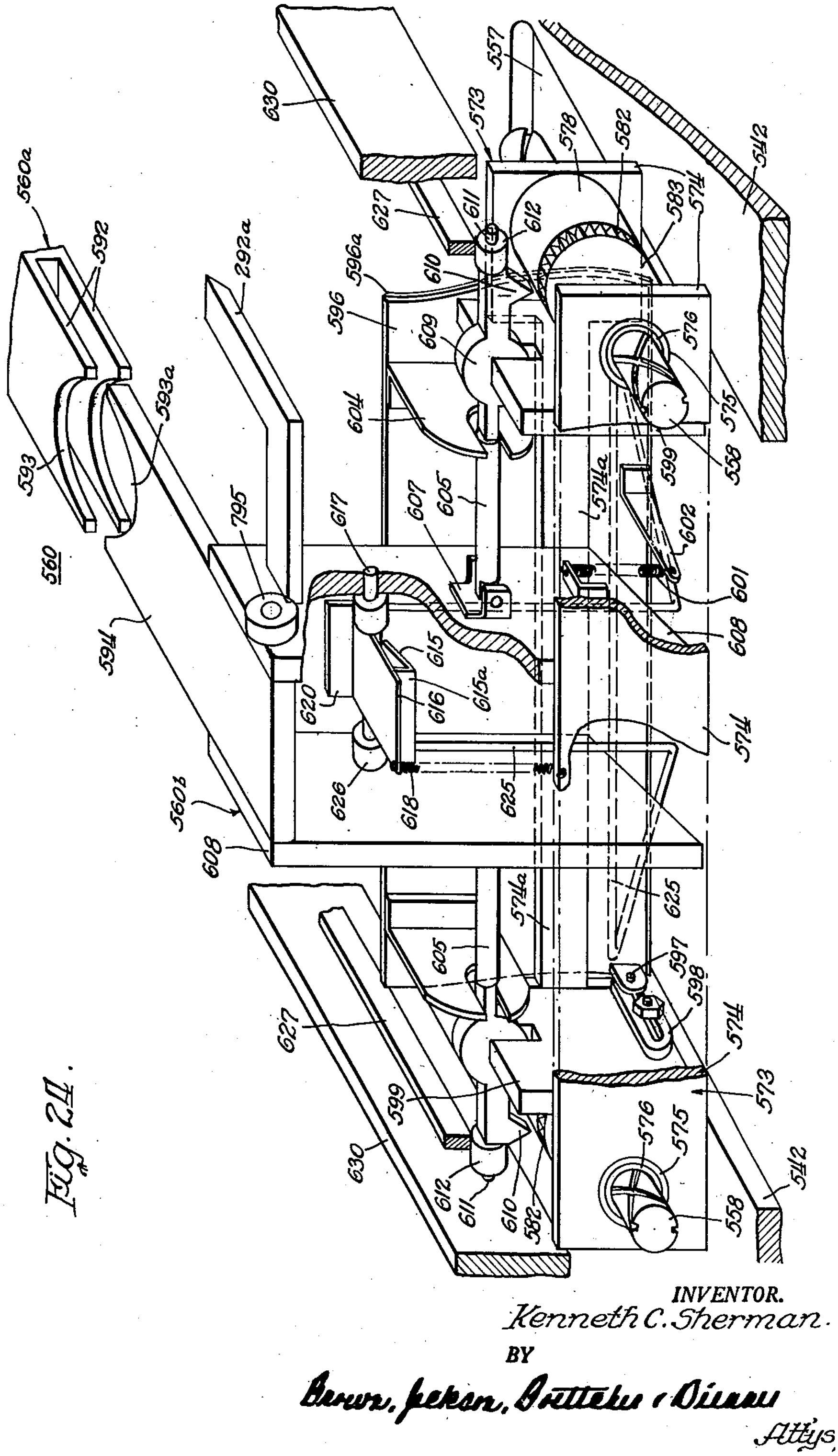
Figure 24 is an isometric view of one of the pin gripping members and associated parts, with certain parts broken away and in section.
Figure 25:
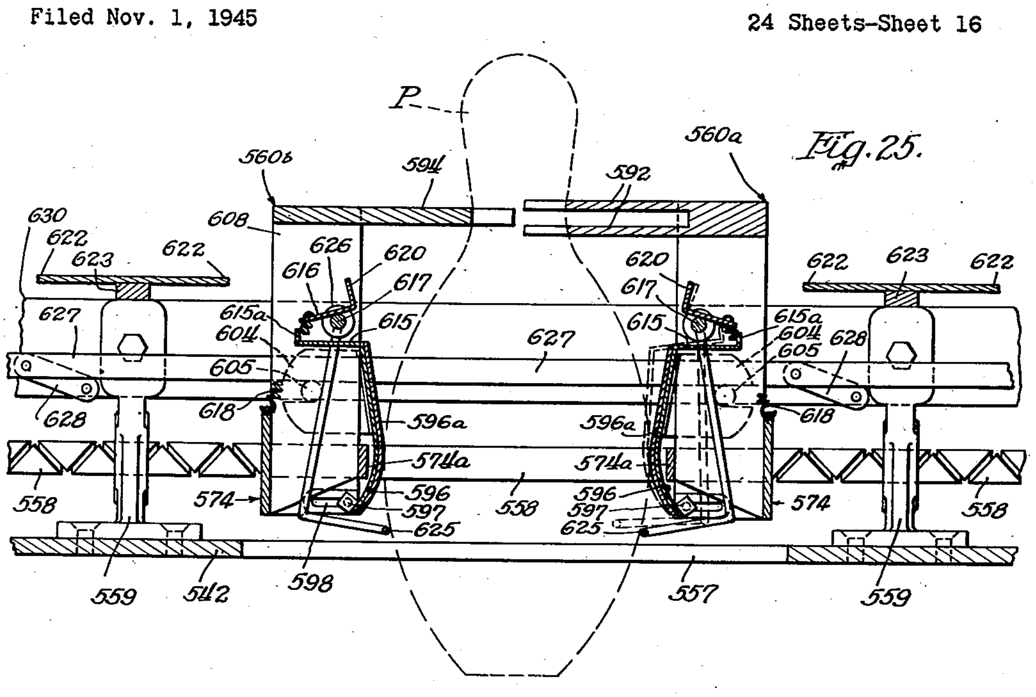
Figure 25 is a vertical sectional view of a pair of pin gripping members and associated parts, with the gripping members in position for gripping a pin preparatory to a resetting or setting up operation.

One of the pin gripping and clamping members, indicated in its entirety by the reference number $560^a$ (Figure 24), is provided, at the top thereof, with two spaced apart gripping jaws 592 each having an arcuate recess 593 in its inner end adapted to fit about the neck of a pin P at one side thereof (Figure 25). The other pin gripping and clamping member, indicated in its entirety by reference number $560^b$, is provided, at the top thereof, with a clamping jaw 594 having in its inner end an arcuate recess $593^a$ adapted to fit about the neck of pin P at the other side thereof. Jaw 594 is disposed to enter between the two spaced jaws 592 of member $560^a$ (Figure 26), in order that these two members may approach each other more closely than is required for setting pins, for the purpose of removing pins from the alley and returning them to the alley in precisely the same positions thereon which they occupied at the time of their removal, as will be explained later.

The members $560^a$ and $560^b$ are of the same construction except as to the provision of the two clamping jaws 592 of member $560^a$, and a description of one thereof will suffice. The inner frame member 574 (Figure 24) of clamping member $560^b$ is materially reduced in vertical extent, at $574^a$, for the major portion of its length. A gripping plate 596, of a cross sectional contour conforming substantially to the shoulder and neck area of a pin, is pivoted adjacent its lower edge, at 597, to slotted brackets 598 adjustably mounted on the transverse end walls 599 of frame 573 of unit $560^b$. Plate 596 preferably is provided, at its inner or gripping face, with a covering $596^a$ of rubber or other suitable friction material. A tension spring 601, anchored to the outer frame member 574 and to the outer end of a finger 602 fixed to plate 596, urges the latter in clockwise direction as viewed in Figure 24. Two slotted brackets 604, secured to the outer face of plate 596, receive arms 605 pivoted at their inner ends in brackets 607 mounted on uprights 608 of frame 573, these uprights carrying the clamping jaw 594 previously mentioned. Each of the arms 605 is provided with a flattened portion 609 operating in a corresponding slot in end wall 599 of the frame, so as to be guided thereby in an obvious manner. Adjacent its other end, each of the arms 605 has a downwardly directed detent 610 which overlies the corresponding ratchet wheel 582 and, when arm 605 is depressed, has engagement therewith and prevents rotation thereof. Outward beyond the detent 610, arm 605 is reduced to provide a stud 611 on which is mounted a roller 612. Plate 596 has fixed thereto, at the mid-length of its upper edge, an outwardly extending angle finger 615 disposed for engagement, under certain conditions, with a latch plate 616 fixed to a shaft 617 rockably mounted in uprights 608. Plate 616 is urged downward about the axis of shaft 617 by a tension spring 618, so as to engage the inner face of an upwardly extending flange $615^a$ of finger 615, when plate 596 is moved to its retracted position, for the purpose of locking plate 596 in its retracted position at certain times. Normally, plate 596 occupies its position shown in Figure 24, at which time flange $615^a$ underlies the latch plate 616, with the latter bearing on the upper edge of flange $615^a$. In that position of plate 596, the arms 605 are held raised, with the detents 610 out of engagement with the ratchet wheels 582, so that the sleeves 576 and associated parts are then free to rotate with the shafts 558 and unit $560^b$ does not travel along these shafts.

Latch plate 616 is provided with an inner upwardly extending flange 620 disposed to contact a trip finger 622 (Figure 25) fixed to a cross bar 623 carried by the bearing brackets for the shafts 558. During the outward or opening movement of the units $560^a$ and $560^b$, the gripping plates 596 thereof are in retracted position, as will be explained more fully later, and the latch plates 616 are then depressed so as to contact the inner faces of flanges $615^a$ of fingers 615. As the unit $560^b$ reaches its outermost position, in contact, or substantially so, with the bearing brackets 559 providing stops therefor, or alternatively with the cross bar 623 functioning as a stop, flange 620 of latch plate 616 contacts finger 622. In the slight continued outward travel of unit $560^b$ latch plate 616 is turned clockwise, as viewed in Figures 24 and 25, into position clear of flange $615^a$ of angle finger 615. A suitably shaped feeler 625, conveniently formed of wire bent to shape, depends from two collars 626 fixed on shaft 617 adjacent the sides of latch plate 616. When the plate 616 is turned clockwise, as above, the feeler 625 is moved outward to retracted position, adjacent the lower edge of gripping plate 596. During the outward movement of member $560^b$, the arms 605 are held depressed by camming rails 627, with the detents 610 engaging the ratchet wheels 582, and remain depressed when unit $560^b$ reaches its outermost position, as will be explained more fully presently. On the succeeding inward or closing movement of member $560^b$, flange 620 of latch plate 616 is moved out of contact with trip finger 622. The latch plate 616 is then swung downward, by tension spring 618, into position to engage the inner face of flange $615^a$ of angle finger 615. That projects the feeler 625 inward a substantial distance beyond gripping plate 596. Thereafter, in the continued inward travel of member $560^b$, the camming rails 627 are raised, as will appear more clearly presently, releasing the arms 605. But at that time the gripping plate 596 is latched in its retracted or outer position, by latch plate 616, effective for maintaining arms 605 depressed with detents 610 thereof in engagement with ratchet wheels 582.

Figure 29:
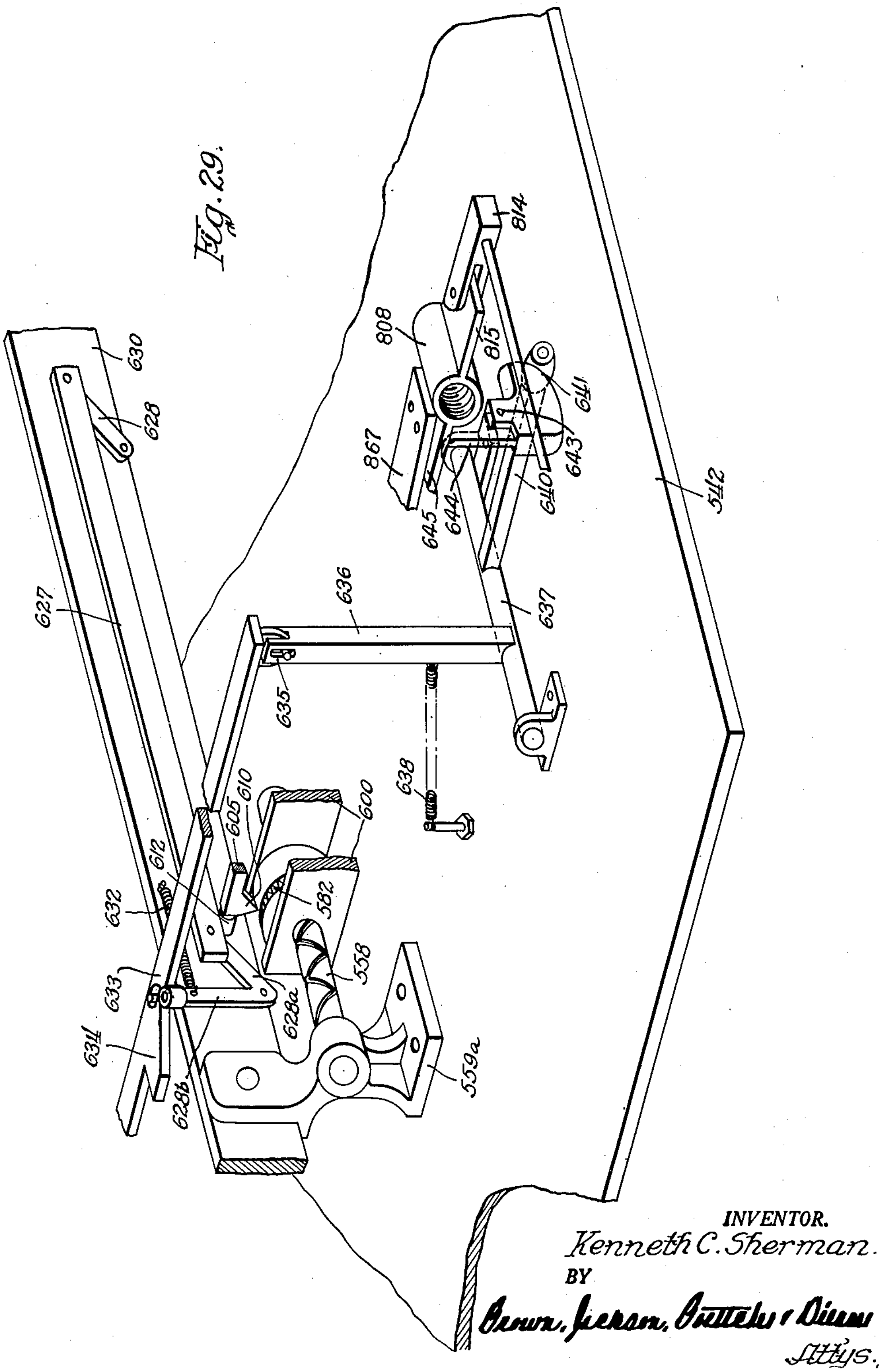
Figure 29 is an isometric view of the setting up table and one of the camming rails and associated parts for controlling operation of the pin gripping members, certain parts being shown fragmentarily and in section.

A pair of camming rails 627 (Figures 24 and 29) is supported in overlying relation to the rollers 612 of the respective clamping and gripping units associated with the corresponding screw shafts 558. Each of the rails 627 is supported by a plurality of links 628 and $628^a$ pivoted on a reinforcing strip, or strongback 630 mounted on the bearing brackets for shafts 558 for imparting rigidity to table 542, there being a strongback adjacent each of the shafts 558 or between each pair thereof. Tension springs 632, anchored to arm $628^b$ of the respective links $628^a$ and to strongback 630, urge the camming rails 627 toward lowered position for holding the detents 610 in engagement with ratchet wheels 582. A camming bar 633 is slidably mounted on the strongbacks 630 and is provided with cam elements 634—one for each camming rail 627—disposed to contact the upper end portion of arms $628^b$ of the respective links $628^a$. The camming bar 633 is guided by pin and slot connections to the strongbacks and is connected at one end, by pin and slot means 635, to the upper end of an arm 636 secured at its lower end to a shaft 637 rockably mounted on table 542. A tension spring 638, anchored at one end to arm 636 and at the other end to table 542, urges arm 636 in a direction to move the cam elements 634 out of contact with and to one side of the upper end portions of the associated arms $628^b$. Shaft 637 has secured thereto a second arm 640, carrying a roller 641 disposed to be contacted by a gravity pawl 642 pivoted at 643 on a finger 644 depending from a plate 645 movable in opposite directions under control of timing means to be later described. The pawl 642 is positively held against turning movement when the plate 645 is travelling in proper direction for depressing arm 640, and turns about its pivot 643 so as to clear the roller 641 during travel of plate 645 in the opposite direction.

When the members $560^a$ and $560^b$ are in their outermost positions, finger 622 is in contact with the upwardly extending inner flange 620 of latch plate 616, of the respective members $560^a$ and $560^b$. That holds the feeler 625 in its retracted position, outward adjacent the gripping plate 596, thereby shielding it against injury from being struck by the pins. Also, at this time, the camming rails 627 are held in lowered position by the springs 632 and associated parts, pawl 642 being then in the position shown in Figure 29.

It will be understood that the members $560^a$ and $560^b$ of some of the clamping and gripping units 560 will reach the limit of their out travel before those of some of the other units. In order to assure that all of the members of the respective units are moved to their outermost positions, rotation of the screw shafts 558 continues for an appropriate length of time after the first one of the members $560^a$ and $560^b$ has reached its outermost position. Since the detents of the gripping and clamping members which have reached their outermost positions are in engagement with the corresponding ratchet wheels 582, the ratchet wheels of such members cannot turn, but the slippage means previously described permits rotation of the sleeves 576 with the shafts 558, with the associated clamping and gripping members remaining in their outer positions. In the continued rotation of screw shafts 558, after one of the members $560^a$ and $560^b$ has reached its outermost position, the slippage means referred to of the respective other members $560^a$ and $560^b$, which have not reached that position, provides a desirable drag which resists rotation of sleeve 576 sufficiently to cause movement of such other members along the screw shafts 558 to their outermost positions, where they also are stopped and the feelers 625 thereof are moved to retracted position.

Figure 26:
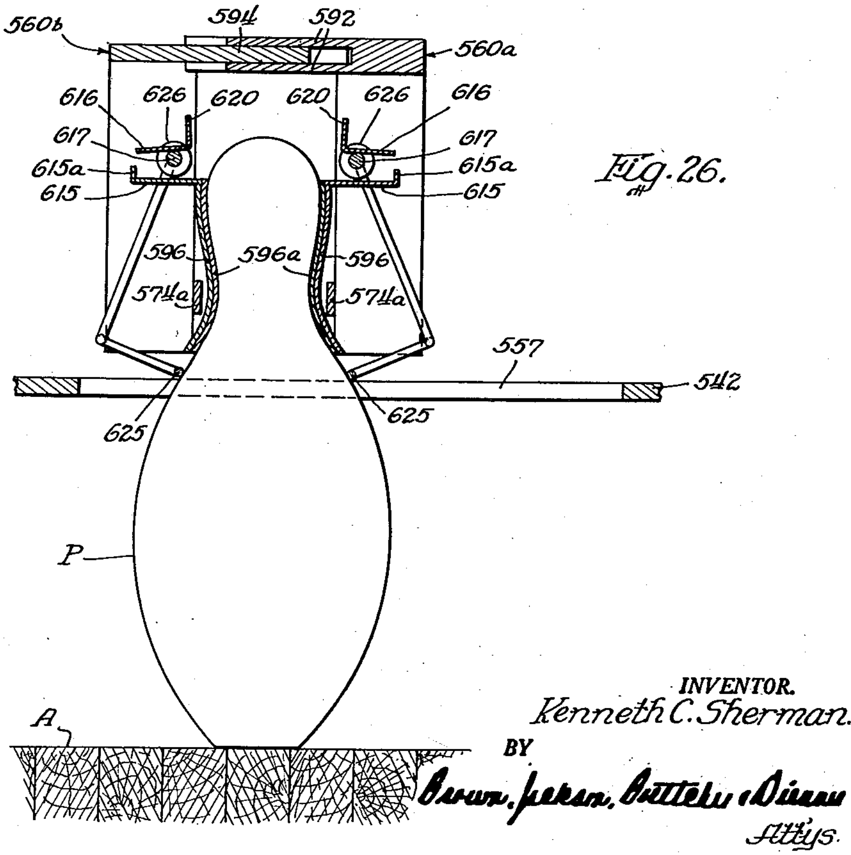
Figure 26 is a vertical sectional view of the gripping plates and associated parts of a pair of pin gripping members with a pin gripped therebetween preparatory to a deadwood or replacing operation.

In the dead wood operation, assuming all of the clamping and gripping members $560^a$ and $560^b$ being in their outermost positions, the table 542 is lowered, by means to be described, to its position of Figure 26, disposing the respective pairs of members $560^a$ and $560^b$ for gripping pins standing on the alley. When the table 542 reaches this position, the direction of drive of the motor 572 has been reversed, as explained later, so that the screw shafts 558 are now driven in directions to cause movement of the members $560^a$ and $560^b$ of the respective units 560 toward each other. During this movement of the members $560^a$ and $560^b$, the camming rails 627 remain in their lowered positions, locking the ratchet wheels 582 against rotation so that sleeves 576, and with them the associated members $560^a$ and $560^b$, are caused to move along the shafts 558 toward each other. When these members have moved in that direction a short distance, the latch plate 616 of the respective members is moved clear of the corresponding trip finger 622, thus releasing the feeler 625, which is then moved into its inner or projected position by the tension spring 618. At that time, the camming rails 627 are still in their lowered positions, holding the arms 605 depressed and the upper portions of the gripping plates 596 in their outer or retracted positions. The gripping plates 596 are then in approximately their positions shown in Figure 25, with flanges $615^a$ of angle fingers 615 disposed a slight distance outward beyond the outer edges of the respective latch plates 616. In the movement of the feeler 625 to projected position the latch plate 616 is swung downward into such position that its lower arm or flange engages the upwardly extending flange $615^a$ of the angle finger 615 of gripping plate 596, so as to latch this plate in its outer or retracted position. As soon as that occurs, the pivoted pawl 642 (Figure 29) is advanced by the timing means into contact with roller 641 and depresses arm 640, so as to move the cam bar 633 into position in which the cam elements 634 displace the associated arms $628^b$, the camming rails 627 being thus raised into inoperative or releasing position.

The arms 605 are now held in their lower position by the gripping plate 596 and associated parts, so that the ratchet wheels 582 are still locked against rotation and the members $560^a$ and $560^b$ continue their travel toward each other along the shafts 558. Assuming that there is a pin, either off spot or on spot, on the alley A between the two approaching members $560^a$ and $560^b$, the feeler 625 of one of such members will contact the pin at the shoulder area thereof so as to be deflected thereby in a downward direction. That is of importance, since the pressure exerted by the feeler is converted in large portion to downward pressure tending to hold the pin in its position upon the alley. It is to be noted that such pressure, in any event, is not of any considerable magnitude, the tension spring 618 being rather light and the feeler 625 being of light weight. Further travel of the clamping and gripping member toward the pin results in outward movement of the feeler 625, relative to that member, to a sufficient extent to release the angle finger 615 of the gripping plate 596. This releases the plate 596 which raises the arms 605 and releases the ratchet wheels 582 for rotation, thus stopping travel of the clamping and gripping member toward the pin. Likewise, the opposed clamping and gripping member is stopped by contact of its feeler with the pin. The gripping plates 596, of the opposed members $560^a$ and $560^b$, each of which plates preferably is provided with a covering $596^a$ of rubber or like friction material, are then disposed in proximity to and equidistant from the pin at opposite sides thereof.

Since there may be a plurality of pins standing on the alley, and the positions of such pins relative to the openings 557 in the table 542 will differ, rotation of the shafts 558 continues for a sufficient length of time to assure that the members $560^a$ and $560^b$ of the respective units 560 will be properly positioned with respect to the standing pins, either off spot or on spot. At the end of that time, the pawl 642 (Figure 29) passes out of contact with roller 641 and the cam bar 633 is shifted in the other direction toward the left as viewed in Figure 29 releasing the camming rails 627, which are then moved downward so as again to lock the ratchet wheels 582 against rotation. When that occurs the members $560^a$ and $560^b$ are driven toward each other and the pin is gripped firmly between the plates 596, as shown in Figure 26, continued rotation of the shafts 558 being permitted by the slippage means previously referred to while the plates 596 maintain their grip on the pin. The rotation of the screw shafts 558 continues for a sufficient period of time to assure that all standing pins have thus been gripped, after which the motor 572 is stopped by suitable control means. The table 542 is then raised and the alley, including the gutters, is then swept, by means to be described, so that all down pins or dead wood and all balls on the alley or in the gutters are swept into the pit. After completion of the sweeping operation and return of the sweep to its normal inoperative position, the table 542 is lowered into position such that the pins held thereby seat upon the alley, and the motor 572 is again energized, the starting field windings of this motor having in the meantime been reversed by means to be described. The screw shafts 558 are then driven in such directions as to cause movement of the members $560^a$ and $560^b$ away from each other, releasing the pins, such movement of members $560^a$ and $560^b$ continuing until they reach their outermost positions, at which they are stopped in the manner previously described with the camming rails 627 remaining in lowered position. In that manner, pins standing on the alley, either on spot or off spot, are raised therefrom and, upon completion of the sweeping operation, are returned to the alley in precisely the same positions which they occupied when they were raised therefrom.

In the resetting operation at the end of a frame, or in setting up the pins to start a game, the setting up table 542, which normally is in its rearward position, is released by energizing the solenoid 555 (Figure 23) and is then moved into its forward position by the tension springs 556, in the manner previously described. The table 542 is then moved upward so as to raise the center ring 266 of the rotatable table 262 and move the plungers associated with that ring downward through table 262, as described above. The gripping jaws 592 and 594 of the members $560^a$ and $560^b$, respectively, of the respective clamping and gripping units 560, are then in position alined with the slots in the buckets. The motor 572 is then set into operation so that the members $560^a$ and $560^b$ are moved toward each other, are stopped at opposite sides of and equisdistant from the pin, as will be explained later, and are then again moved toward each other until the jaws thereof grip the pin firmly about its neck, as indicated in Figure 25, after which travel of members $560^a$ and $560^b$ is stopped in the manner previously described, and the motor 572 is also stopped. As the members $560^a$ and $560^b$ reach their pin clamping positions, L-shaped releasing fingers $292^a$ carried thereby (Figure 24) contact the cam elements 292 (Figures 19 and 20) of latch members 283 of the respective pin buckets and swing the latter members into position in which the flanges 282 thereof clear the fingers 281 of hinge leaves 280. That releases the doors 277 thereby permitting the pins to be pulled downward out of the buckets, when the table 542 starts its downward movement. The setting up table 542 is then moved downward, pulling the pins from the buckets and fully opening the doors 277. When the doors 277 have been opened slightly, each of the fingers 281 is so disposed that a side edge thereof will be contacted by flange 282 of latch 283. That assures that the latch members will be held in inoperative position when releasing fingers $292^a$ move downward out of contact with cam elements 292, and until the pins have been completely withdrawn from the buckets. The flanges 282 at the lower ends of latch members 283, and the fingers 281 are, of course, appropriately proportioned, as to length and breadth, respectively, to assure that result.

Figure 6:
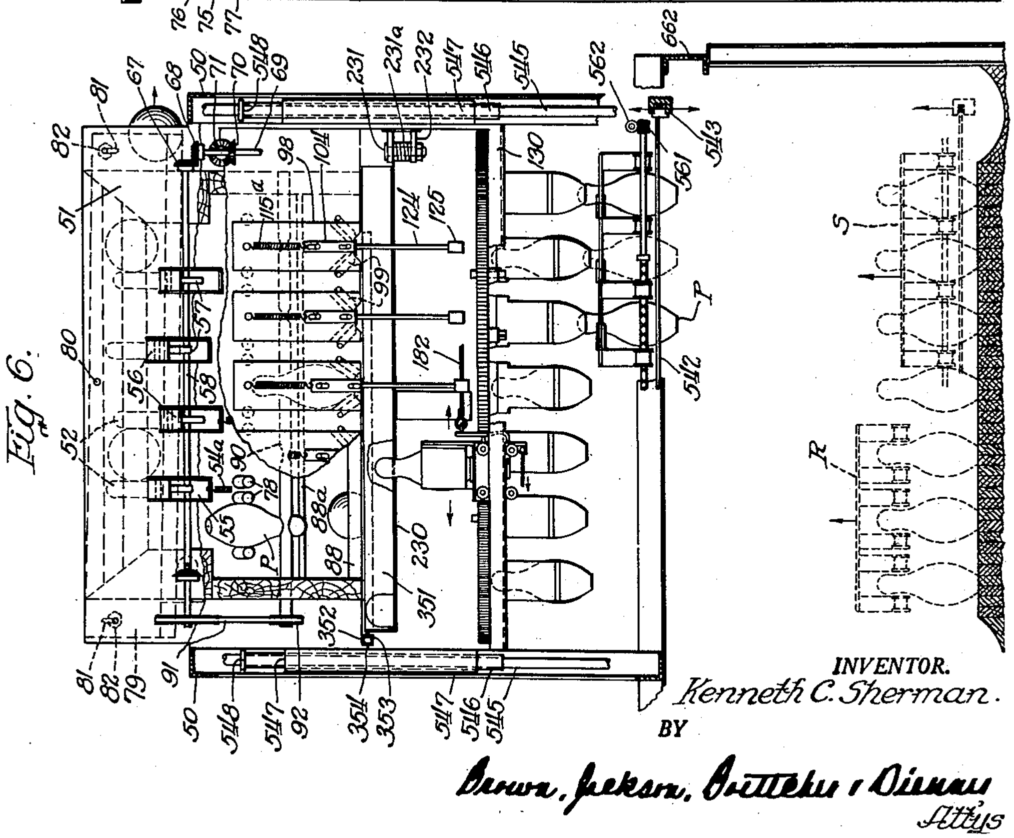
Figure 6 is a sectional view, on an enlarged scale, taken substantially on line 6—6 of Figure 2, certain parts being shown in elevation and certain other parts being broken away, certain other parts being omitted for clearness of illustration.

After the pins have been completely withdrawn from the buckets, the bucket doors 277 are closed by the tension springs 287. Flanges 282 of latch members 283 then pass inside of fingers 281, again latching doors 277 closed and conditioning the buckets for reception of another set of pins. The setting up table 542 is then moved downward in frame 50 and also moved into its rearward position therein by means to be explained later, so that the pins carried thereby are in vertical alignment with the pin spots on the alley. Thereafter, the table 542 moves downward until the frame 543 thereof seats upon the alley, at which time the bases of the pins will be seated upon the spots on the alley. If desired, the table 542, or its frame, may be provided with adjustable depending legs providing stops assuring that the pins will be in position seating on the alley, or substantially so, when the table 542 is in its lowermost position. When setting up pins to start a game or a frame, the table 542 moves downward to a position somewhat lower than that to which it moves in the dead wood operation when replacing pins, on spot and/or off-spot, on the alley. The difference in downward travel of table 542 is due to the fact that in setting up pins, the pins extend below table 542 a distance appreciably less than when replacing pins on the alley, as will be clear from a comparison of Figures 25 and 26. It will also be noted that the pin P is at the center of the corresponding opening 557 of setting up table 542, when gripped by the jaws 592 and 594 of the setting up members $560^a$ and $560^b$ preparatory to the setting up operation, as in Figure 25. When the pin is gripped by the plates 596, in the dead wood or replacing operation, it may be considerably off center relative to the corresponding opening 557, as in Figure 26. In Figures 5 and 6, the position of table 542 when setting up pins is indicated at S and its position when replacing pins on the alley is indicated at R.

When the table 542 has been lowered into proper position for setting up the pins, the motor 572 is again energized, the starting field windings thereof having in the meantime been reversed, and drives the screw shafts 558 in proper directions to move the members $560^a$ and $560^b$ of the respective units 560 apart, leaving the pins standing upon the alley, accurately spotted thereon. It should be noted that during its downward travel the setting up table 542 is stopped in its intermediate position, to assure that the sweep has been moved beyond the area of this table, suitable interlock means, to be described, being provided for that purpose. After the pins have thus been set upon the alley, the setting up table 542 is returned to its intermediate position, where it is stopped, and the motor 572 is stopped, pending further use of the setting up table.

The sweep, indicated in its entirety by the reference number 650 (Figures 1, 2 and 30) comprises a suitably braced frame 651 having fixed to each side thereof an arcuate plate 652. A head 654, of proper width and form to extend across the alley and into the gutters, in proximity thereto, is pivotably mounted in frame 651 by means of a pivot rod 655. Each of the plates 652 has therein an arcuate slot 656 concentric with the pivot rod 655. A stud shaft 657, secured to the head supporting frame 658, at each side thereof, operates in slot 656 of the adjacent plate 652 and carries a roller 659. Two rollers 660 are carried by each of the plates 652 at the upper portion thereof. The rollers 660 travel in channel members 662 extending along the sides of the frame 50 and along the alley A at the sides of the latter. In Figure 1, the sweep is shown in the position which it occupies at the start of the sweeping operation. It is moved rearward along the alley, from that position into a position at the rearward end of the alley, by means to be described, sweeping from the alley and the gutters thereof the pins and balls, which are deposited in a pit elevator 665 normally in lowered position within the pit B.

During the rearward travel of the sweep, the rollers 659 thereof contact latch members 666 (Figure 1) pivoted to angle members 667 secured to and extending downward from the channel members 662. The latch members 666 are movable upward by the rollers 659 and are held against downward movement beyond their full line positions shown in Figure 1, by the angle members 667, in a known manner. When the rollers 659 pass beyond the latch members 666, the latter drop by gravity into their normal positions and, with the angle members 667, form upwardly and forwardly inclined tracks leading to the channel members 662. Each of the channel members 662 is provided with an opening through its lower flange, at the upper end of the angle member 667, and has pivoted thereto an upwardly opening and downwardly closing gate member 668. It will be seen that on the return movement of the sweep forwardly of the alley, after a sweeping operation, the head frame 658 is swung upward and rearward into substantially horizontal position, the rollers 659 then passing into the channel members 662 and, in cooperation therewith, holding the frame 658 and the sweeping head 654 carried thereby in inoperative position a considerable distance above the alley A. When the sweep is in its inoperative position, it is disposed adjacent the gates 669 of channel members 662, as indicated by the dot and dash line position shown in Figure 1. In order to release the sweep from the channel members 662, for downward movement thereof into operative position, it is moved, by means to be described, from its normal position forwardly along the channel members 662 into position adjacent the forward ends thereof.

As the sweep approaches the forward ends of the channel members 662 it contacts a vertical arm 675 of a gate plate 676 (Figure 31) slidable on the upper face of a plate 677 fixed to channel member 662 and defining with the lower flange 679 thereof an opening 678 through such flange. The plate 676 has its rearward end shouldered to interfit with the shouldered forward end of lower flange 679 of channel member 662. A tension spring 680, anchored to a pin $676^a$ secured in plate 676 and extending through a slot in the plate 677 and to a pin $677^a$ fixed to plate 677, urges plate 676 rearward so as normally to hold its shouldered rearward end in contact with the shouldered forward end of flange 679. When the sweep is moved forward from its normal inoperative position above referred to, the forward rollers 660 strike the arm 675 of plate 676 and move the latter forward in opposition to the tension spring 680. That uncovers the openings 678 and when the rollers 659 reach such openings they pass downward therethrough, the head frame and head of the sweep swinging downward by gravity into the vertical operative position shown in full lines in Figures 1 and 30.

The sweep is moved in forward direction along the channel members 662 by means of cables 681 (Figure 30) attached to the forward ends of plates 652 and passing therefrom over pulleys 682 mounted at the forward ends of rail members 662, thence rearward to winding drums 683 fixed on a cross shaft 684 rotatably mounted on frame 50 and extending across the front thereof (Figure 1). Spur pinions 685, fixed on shaft 684, adjacent the inner faces of drums 683, mesh with spur gears 686 rotatably mounted on stub shafts 687 mounted on frame 50. Each of the gears 686 has secured thereto a winding drum 688 receiving a cable 689 secured, at one end, to drum 688 and, at its other end, to one end of a tension spring 690, of considerable length, anchored at its other end to frame 50. It will be seen that when the sweep is moved rearward of the alley, during the sweeping operation, the cables 681 are unwound from the drums 683 and the cables 689 are wound on to the drums 688, extending the springs 690 and placing them under tension. When the sweep is released for forward movement, after completion of the sweeping operation, the tension springs 690 contract and drive the drums 683 in cable winding direction, returning the sweep to its normal raised inoperative position at about the mid-length of the channel members 662.

Two cables 691, passing forward along the channel members 662, are attached to plates 652 at the rearward ends thereof, and move the sweep rearward along the channel members during the sweeping operation. The cables 691 pass upward about pulleys 692 mounted on channel members 662, adjacent the rearward ends thereof, and thence over suitably disposed guide pulleys 693, mounted on frame 50, to a double winding drum 694 loose on a shaft 695 rotatably mounted across the back of frame 50 above the rotating table 262. Shaft 695 is driven from shaft 75, by means of a vertical countershaft 696 carrying at its upper end a bevel gear 697 meshing with a bevel gear 698 keyed on shaft 75 and, at its lower end, a bevel gear 698ª meshing with a bevel gear 699 keyed on shaft 695. A clutch 700, of known type, actuated by a shift lever 701, is provided for clutching and declutching drum 694 to and from shaft 695.

Referring further to the sweep operation, as the sweep returns to its neutral position after completion of a sweeping operation, the rollers 660 contact hooks 705 (Figure 32) the bills of which extend downward through slots in the top flanges of channel members 662. Each of these hooks is pivoted in a clevis 706 fixed to the forward end of a rod 707 slidable through a block 708 fixed on the upper flange of channel member 662. A compression spring 709 is mounted about rod 707 and confined between block 708 and a double hook structure 710 pivoted on a pin 711 extending through rod 707, and a sleeve 712 extending over the rearward end portion of rod 707. The hook structure 710 normally engages a pin 713 secured through the forward end of a second rod 714 and slidable in elongated slots 715 in sleeve 712. The hook structure 710 is provided with a trip arm 716 extending therefrom and projecting inward of the alley from rail member 662, for a purpose which will be explained presently. A stop collar 717, fixed on rod 714, abuts the forward end of a relatively long sleeve 718 slidable on rod 714. Sleeve 718 carries two inwardly projecting arms 719 rigid therewith, each provided, at its inner end portion, with an upwardly and forwardly inclined camming surface 720. The rod 714 extends rearward beyond sleeve 718 and receives a compression spring 721, confined between a flange 722, at the rearward end of sleeve 718, and a flanged bushing 723 fixed on rod 714, in spaced relation to the bearing bracket 724 (Figure 32A) secured to the top flange of channel member 662 and slidably supporting rod 714. A second compression spring 725 is mounted about rod 714 and confined between bearing bracket 724 and a flanged bushing 726 fixed on rod 714 a short distance in advance of a U-shaped bracket 727 secured to the top flange of channel member 662. A latch bolt 728 is pivoted, remote from its rearward end, on a pivot pin 729 in the bracket 727. The forward end of bolt 728 normally engages in a notch 730 in the upper end of a latch finger 731 at the rearward end of rod 714, conveniently integral therewith. The upper end of finger 731 is inclined upward and forward at 732, for ready passage rearward along the under face of latch bolt 728, when rod 714 is returned to its normal rearward position.

Figure 23:
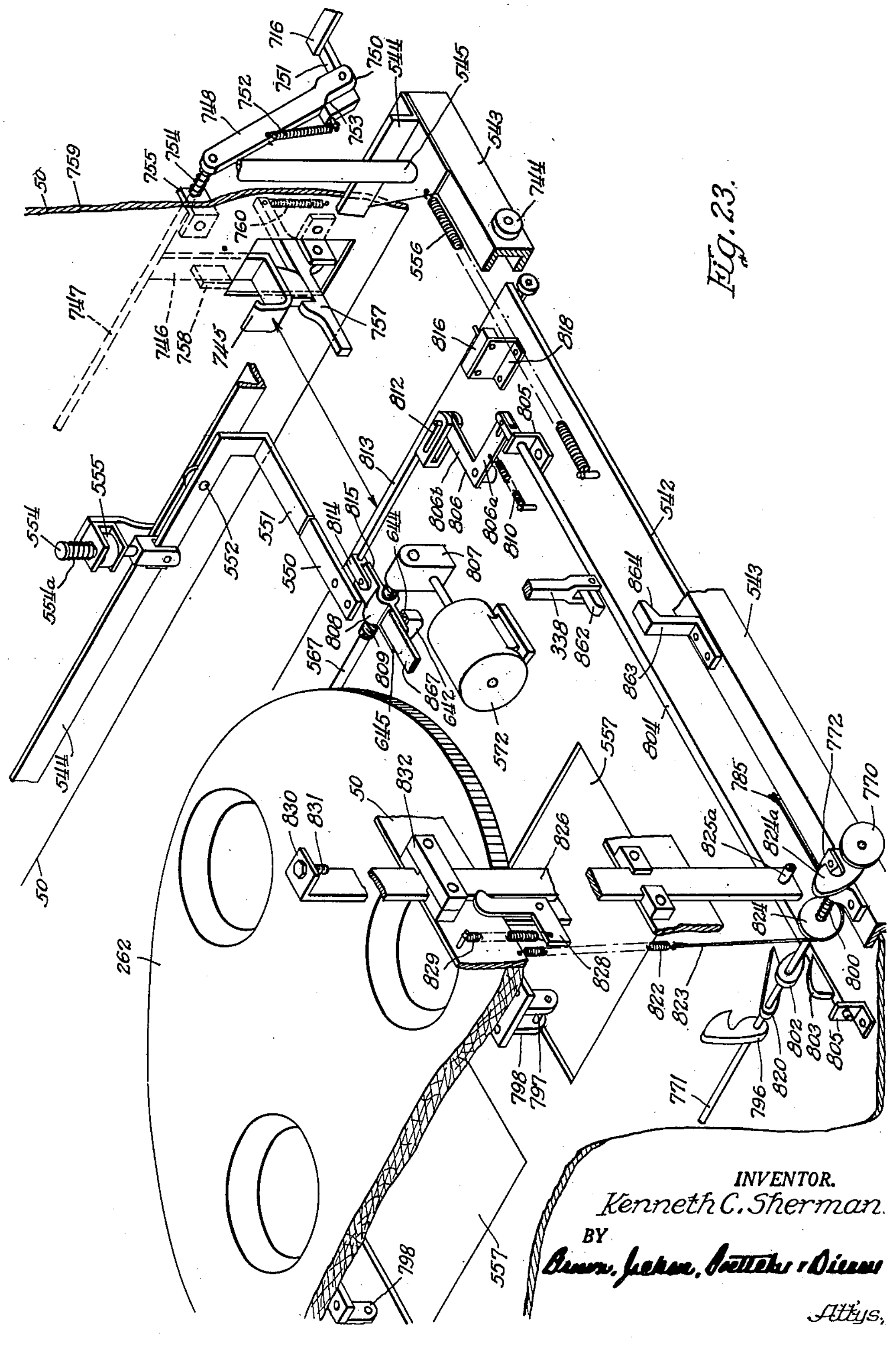
Figure 23 is an isometric view of the setting up table and certain of the controls and associated parts, the rotatable pin receiving table being shown fragmentarily and in section, the pin gripping mechanisms and certain other parts being omitted for clearness of illustration.
Figure 32:
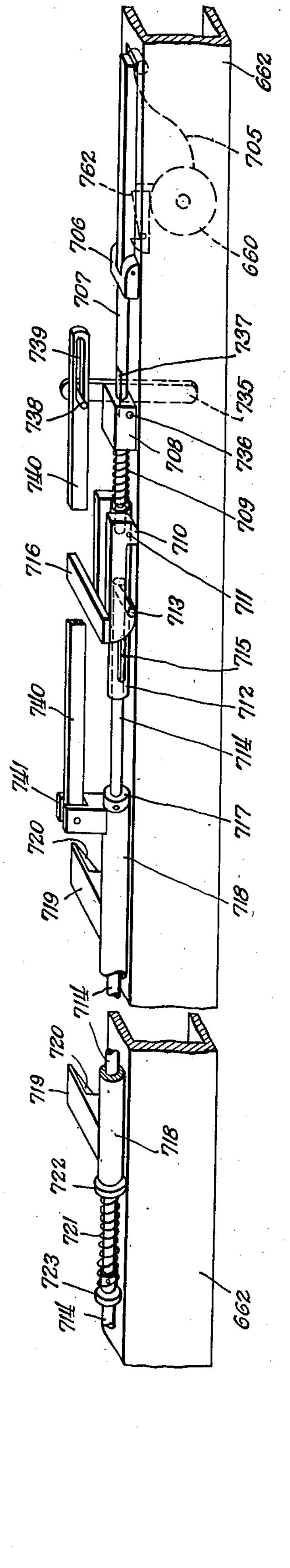
Figure 32 is an isometric view of one of the sweep supporting channel members and the associated trip and setting up table supporting arms, the channel member being broken away and shown in section.
Figure 33:
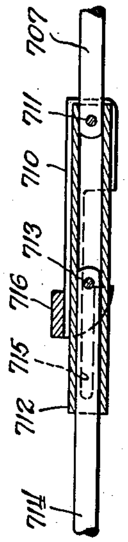
Figure 33 is a lengthwise sectional view, on an enlarged scale, of the release hook and pin and slot telescoping connections between the sweep operated rod and the rod for operating the setting up table supporting arms, of Figure 32.
Figure 32A:
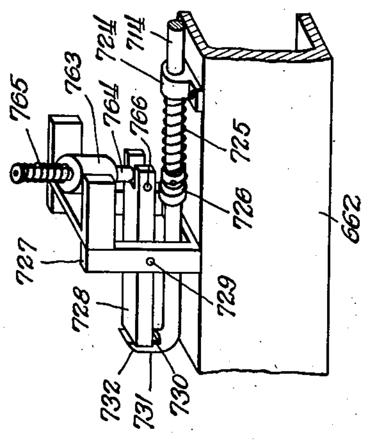
Figure 32A is an isometric detail view, partly in section, of the latch means for releasing the setting up table and initiating operation of the sweep, in the dead wood operation.

A substantially vertical trip arm 735 (Figure 32) is pivoted on a pin 736, which is secured in block 708 below rod 707, this arm extending downward through a notch 737 in the top flange of channel member 662. Arm 735 carries at its upper end a pin 738 operating in a slot 739 in the forward end of a link 740 pivoted at its rearward end in the upper end of a bracket 741 fixed to the forward end of sleeve 718. During the sweeping operation, the setting up table 542 is stopped in its downward movement and held against further downward travel until after the sweeping operation has been completed, by the arms 719 engaging under rollers 744, one of which is shown in Figure 23, carried by the frame 543 of the setting up table 542. After completion of the sweeping operation, the sweep is returned to its inoperative position referred to and the rollers 660 thereof contact the hooks 705 (Figure 32).

In order to initiate the setting up operation, the table 542, which normally is in its intermediate or neutral position vertically and in its rearward position in its frame, is released for forward movement, by energizing the release solenoid 555 (Figure 23) therefor. The table 542 is then moved forward and, in its forward travel, contacts a cam latch member 745 carried by a bracket 746 rigid with a cross shaft 747 rockably mounted at the front of frame 50. An arm 748 is fixed on shaft 747 at each end thereof extending downward and forward therefrom. Arm 748 is provided at its lower end with a fork 750 in which is pivoted a lift finger 751 urged downward by a tension spring 752 and limited in such direction by a stop element 753. Lift finger 751 normally extends forward into proximity to arm 716 of the hook structure 710, and is located below arm 716 (Figures 23 and 32). A torsion spring 754 is mounted about each end portion of shaft 747 and engages an adjacent mounting bracket 755 for the shaft and arm 748, urging the latter in downward direction. That serves normally to hold shaft 747 in predetermined angular position with a stop finger 758 carried by bracket 746 in contact with a plate 759 at the front of frame 50 constituting part thereof. When the cam latch member 745 has been moved forward by table 542, the latching pawl 757 is then in position with its outer or forward arm urged downward by a tension spring 760 and its inner or rearward arm in engagement with cam latch member 745, holding the latter in its forward position.

When the setting up table 542 moves forward, it carries with it the cam latch element 745, moving the latter into engagement with the latching pawl 757. The resultant turning movement of shaft 747, moves lift finger 751 into position extending beneath arm 716, and then moves lift finger 751 upward raising arm 716 and thereby raising the hook structure 710 (Figure 32), finger 751 then passing out of contact with and above arm 716. That frees hook 710 from pin 713 and permits sleeve 712, and with it rod 707, to move forward along the channel member 662, under the pressure exerted on hook 705 by roller 660, the springs 690 (Figures 1 and 30) for moving the sweep forward being still under considerable tension. The hooks 705 are then raised upward by camming action between the forward face of hook 705 and a roller at the forward end of the slot through which hook 705 extends. That frees the sweep for movement thereof to the forward ends of the channel members 662, where it is lowered into operative position in the manner above stated. In the forward movement of the rods 707, with the hooks 705, the springs 709 are compressed. A gravity pawl 762 is pivoted in channel member 662, adjacent the outer side of hook 705, with its bill directed upward. The weighted arm of pawl 762 normally is held raised by roller 660. In the forward travel of hook 705, clevis 706 is moved into position over the bill of pawl 762 at about the same time that roller 660 passes from beneath the forward weighted arm of pawl 762. In the slight further forward travel of hook 705, and with it the clevis 706, the clevis 706 passes forward beyond the bill of pawl 762, the bill of which is then raised into projected or holding position in back of clevis 706. The sweep continues its forward travel and the rearward roller 660 thereof trips gravity pawl 762 releasing the clevis 706. The compression spring 709 then expands, returning sleeve 712, and with it hook structure 710 to its initial position, in which the bills of hook structure 710 are again engaged over the pin 713. In the return movement of sleeve 712, the rod 707 and associated parts are also returned to their positions shown in Figure 32.

The sweep 650 is lowered into operative position, at the forward end of the rails 662 and is then moved rearward along the alley and returned to its raised neutral position, as above stated. During the sweeping operation, the table 542 is moved to its full raised position, removes the pins from the pin receiving table 262, and is then released for downward movement, as will be explained more fully presently. In the downward travel of the setting up table 542, it contacts the inner or rearward arm of the latching pawl 757 (Figure 23) releasing member 745, which is then returned to its rearward position incident to turning of shaft 747 by the torsion springs 754. Rollers 744 then contact arms 719, which hold table 542 in its intermediate position until completion of the sweeping operation. As the sweep 650 approaches its neutral position, the forward rollers 660 thereof actuate trip arm 735 and move sleeve 718 rearward, moving arms 719 from under rollers 744. The setting up table 542 then continues its downward travel, during which it is returned to its rearward position, as will be explained later. When table 542 reaches the limit of its down travel, it is disposed so as to position the pins upon the spots on the alley, after which the clamping and gripping units 560 are opened so as to release the pins in the manner previously described. That completes a sweeping and setting up operation. Upon completion of the setting up operation, the setting up table 542 is then raised to its intermediate or neutral position, by means to be described. As the setting up table approaches its neutral position, the rollers 744 thereon (Figure 23), contact the upwardly and forwardly inclined cam surfaces 720 (Figure 32) of the arms 719, shifting sleeve 718 rearward along rod 714, as permitted by slot 739 in shift bar 740, placing spring 721 under compression. When the rollers 744 pass out of contact with the cam surfaces 720, the sleeve 718 is moved forward along rod 714, by compression spring 721, so that the arms 719 are then disposed beneath the rollers 744 and hold the setting up table in its intermediate or neutral position as before.

The operation just described refers to a setting up operation, in which a set of pins is spotted upon the alley after completion of a frame, and not to what may be termed the dead wood operation, in which standing pins or live wood, both on and off spot, are raised from the alley, the dead wood is swept from the alley, and the live wood is returned to the alley.

Figures 30, 31:
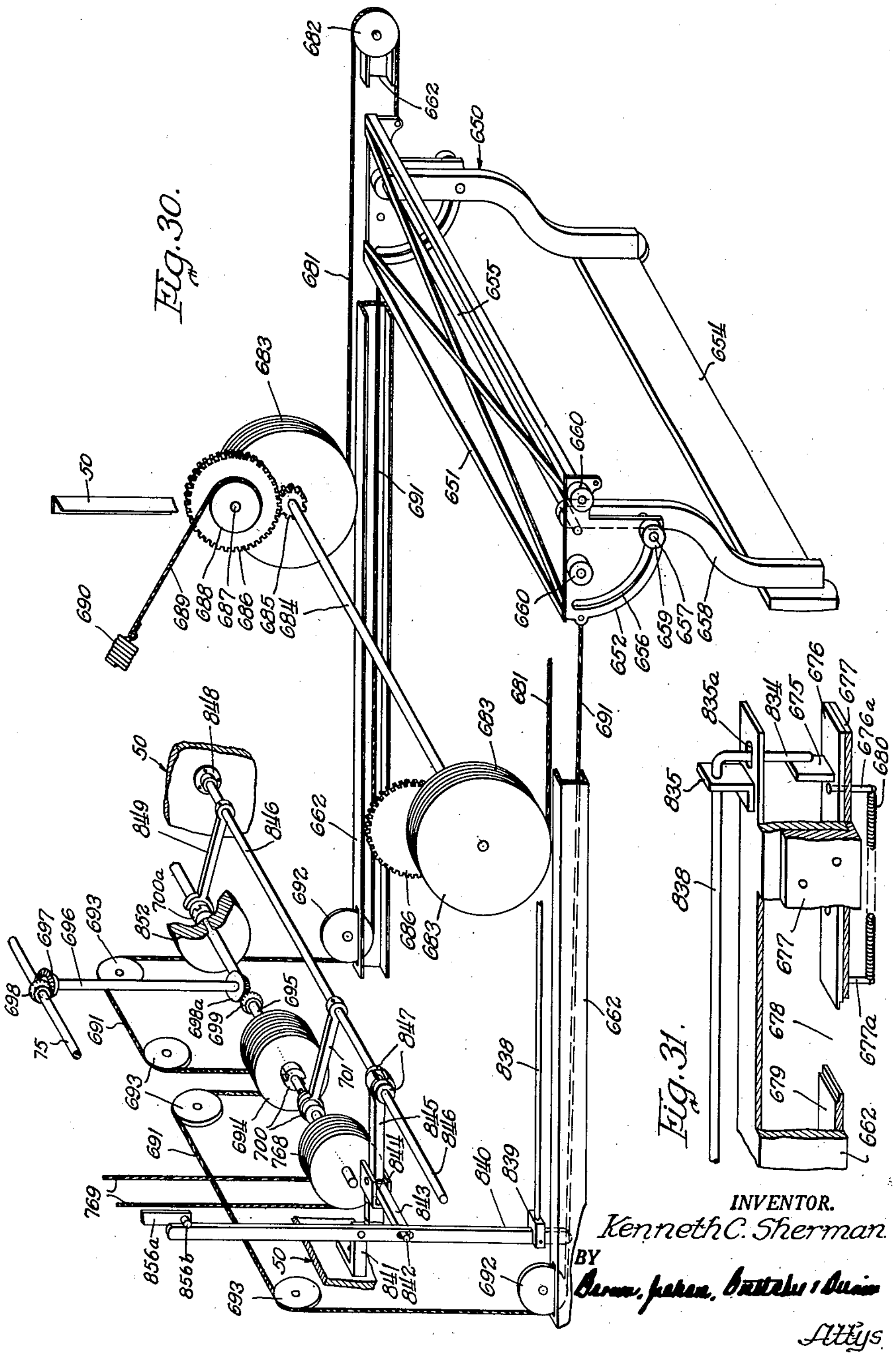
Figure 30 is an isometric view of the sweep and the supporting and operating means therefor and associated parts, certain parts being broken away and shown in section.
Figure 31 is an isometric detail view, of the sweep releasing plate and clutch control shift rod and associated parts, certain parts being broken away and shown in section.

The dead wood operation, just referred to, is initiated by the player or operator closing a switch at the forward end of the alley, preferably located adjacent the foul line so as to be readily distinguished from the resetting switch, which conveniently may be located on the post. Closing of the dead wood switch energizes a solenoid 763 (Figure 32A) of any suitable known type, mounted on the upper portion of bracket 727. This solenoid 763 has a plunger 764, normally held raised by a compression spring 765 and pivoted at its lower end, at 766, to the forward end of latch bolt 728. The solenoid 763, when energized, forces plunger 764 downward thereby swinging the latch bolt 728 upward into its releasing position. When that occurs, the hook 705, rod 707, rod 714 (Figure 32) and all of the parts carried thereby move together as a unit forward along channel member 662, under the influence of the sweep urged in that direction by its associated tension springs 690 (Figures 1 and 30). The hook 705, is cammed upward into releasing position, in which it is held temporarily by the gravity pawl 762, as before.

At the time that solenoid 763 is energized, the setting up table 542 is in its intermediate or neutral position with arms 719 underlying the rollers 744 on the frame of table 542 and restraining it against downward movement. Upon forward movement of rods 707 and 714 and the associated parts, as just described, arms 719 are withdrawn from beneath the rollers of the frame of table 542, which then moves downward by gravity. The setting up table 542 continues its downward travel, picks up the live wood or standing pins, in the manner previously described, and is then raised into its intermediate or neutral position. The rate of the downward travel of the setting up table may be controlled in a suitable manner, such as by means of a centrifugal governor of known type, similar to the governor 246 above referred to for controlling the rate of rotation of the drum 189, if desired.

The sweep is released from the channel members and, when the setting up table, with the pins carried thereby, has been raised a proper distance above the alley, sweeps the dead wood into the pit, after which the sweep is returned to its neutral or inoperative position in the manner above described. When the gravity pawl 762 releases clevis 706 (Figure 32), compression springs 725 return the rod 714 to its normal rearward position, in which it is again locked by latch bolt 728, it being understood that the solenoid 763 is energized but temporarily. As the setting up table approaches its neutral position, the rollers 744 on the frame thereof contact cam surfaces 720 of arms 719 so as to displace the latter rearward, these arms then moving under the rollers and supporting the setting up table in its neutral position as before. That occurs shortly prior to the return of the sweep to its neutral position. Shortly thereafter, each of the forward rollers 660 of the sweep, travelling along channel member 662, actuates the corresponding trip arm 735 and, through bar 740, shifts sleeve 718 rearward, moving the arms 719 from under the rollers 744 and again permitting downward movement of the setting up table 542. On this second downward travel of the setting up table, it sets the pins upon the alley, in precisely the same positions from which they were removed, in the manner previously described.

Figures 34, 35:
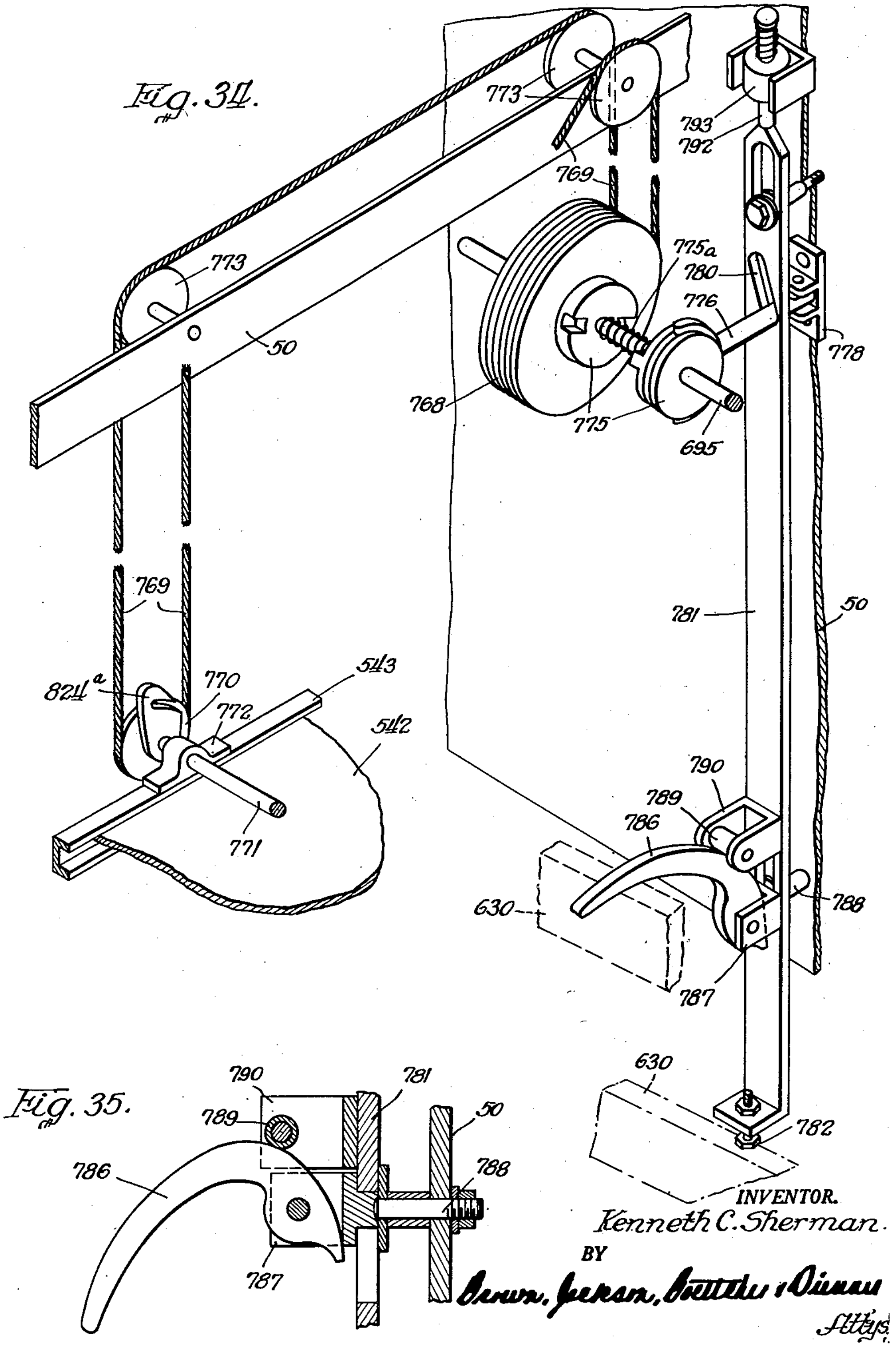
Figure 34 is an isometric view of the cables and drums and the clutch control means therefor of the mechanism for raising the setting up table, and associated parts, the table and its frame being shown fragmentarily and in section.
Figure 35 is a sectional view, on an enlarged scale, of the clutch control arm and associated parts of the mechanism of Figure 34, certain parts being shown in elevation.

The setting up table 542, including its frame 543, is raised by suitably controlled drum and cable means. A double winding drum 768 (Figure 30), loose on shaft 695, receives two cables 769 wound thereon, each of these cables passing about a pulley 770 (Figures 23 and 34) loose on a shaft 771 extending transversely of table 542 and rotatably mounted in journal boxes 772 secured to table frame 543 (Figure 34). This shaft 771 preferably is disposed above and parallel to two adjacent strongbacks 630 (Figures 24 and 29—not shown in Figure 23) secured to the table 542 by suitable brackets, as previously described. Each of the cables 769 is appropriately anchored at its other end to the frame 50 and is passed over a series of suitably arranged pulleys 773 (Figure 34) mounted thereon. It will be seen that when the cables are wound onto the drum 768, the setting up table 542 is raised, and when the drum 768 is freed from shaft 695, as will be explained presently, the setting up table may move downward by gravity.

Drum 768 has associated therewith a clutch 775 of known type. This clutch is operated by a shift lever 776 pivoted on a bracket 778 mounted on frame 50. Lever 776 passes through an inclined cam slot 780 in a vertically movable rail 781 mounted, by slot and bolt means, on frame 50 for limited movement in either direction. At its lower end, rail 781 is provided with an adjustable abutment 782 disposed for contact by the rearmost strongback 630 carried by table 542, as the latter reaches its neutral or intermediate position, on its upward travel, the table being then in its rearward position in its frame. The table then raises rail 781, which normally is in its lowered position with the clutch 775 engaged, thus declutching the drum 768 from shaft 695. The table 542 is then conditioned for downward movement by gravity, as permitted by the control means previously referred to, comprising the arms underlying the rollers carried by the table frame.

When the table 542 is in its forward position, to which it is moved by the tension springs 556, for effecting a resetting operation, the rearmost strongback is disposed forward of the abutment 782 a distance of approximately nine inches. The table then moves into its uppermost position, at which the strongback contacts the forward end of a curved camming lever 786 (Figure 34) pivoted in a bracket 787 carried by a post 788 fixed to the frame 50. The upper rearward portion of lever 786 contacts a roller 789 mounted in a bracket 790 fixed to rail 781. It will be seen that as the arm 786 is swung upward in the upward travel of setting up table 542, rail 781 is cammed upward from its normally lowered position into its upper position, declutching drum 786 from shaft 695, as before. That permits downward travel of the setting up table 542, with the pins carried thereby, which have been removed from the buckets of the rotatable table 262, the pins being set accurately upon the spots on the alley and released from the pin gripping and clamping members, at the end of the downward travel of the table 542, in the manner previously described.

Referring further to the operation of the clutch 775, upward movement of the rail 781 declutches the drum 768 from shaft 695, and downward movement of rail 781 clutches the drum 768 to shaft 695. The compression spring 775$^a$ places the movable clutch member under desirable pressure, creating sufficient contact pressure between shift lever 776 and the wall of the cam slot 780 to hold the shift rail 781 raised against gravity. At its upper end the shift rail 781 is provided with a reduced extension 792 constituting a core for a solenoid 793 mounted on the frame 50 above rail 781. The solenoid 793 is energized, at an appropriate time, by means of a suitable time-switch mechanism, as will be explained presently. Upon energization of solenoid 793 extension 792 is pulled downward by the solenoid, thus moving the shift rail 781 downward and clutching drum 768 to shaft 695, the upward travel of the resetting table 542 controlling declutching of the drum 768 from shaft 695 in the manner previously described. Each of the members 560$^a$ and 560$^b$ of the pin clamping and gripping units 560 has a roller 795 (Figure 24) mounted thereon and disposed thereabove, for contact with the disc 535 (Figure 22) previously referred to, moved upward by the setting up table for restoring the center ring 266 of the rotatable table 262 to its raised position and restoring the plungers of the buckets to their raised positions.

Shaft 771 has two hooks 796, one of which is shown in Figure 23, secured thereon, disposed to engage pins 797 mounted in brackets 798 secured to and depending from the rotating table 262 adjacent the circumference thereof. When this table 262 is in its stopped position, in which it is accurately held as previously described, the hooks 796 are in vertical alignment with the pins 797. As the setting up table 542, when in its forward position, approaches its uppermost position, the curved bills of hooks 796 contact the pins 797 so that the shaft 771 is turned by the hooks, in opposition to torsion springs 800 mounted about shaft 771 adjacent each end thereof, with one end secured to shaft 771 and the other end engaged with the adjacent journal box 772. The bills of the hooks 796 then pass above pins 797 and the hooks snap forward over these pins. In that manner the setting up table 542 is suspended from the rotatable table 262, and it remains so suspended until the units 560 have gripped the pins firmly about the necks thereof, as above described.

A cam 802, fixed on shaft 771, is disposed for cooperation with a cam 803 carried by a rod 804 slidable in guide brackets 805 fixed to table 542. At its forward end rod 804 is pivoted to one arm 806$^a$ of a bell crank 806 suitably mounted for movement about a vertical axis adjacent a speed reducer 807 of known type associated with a timer comprising the nut 808 travelling on the threaded sleeve 809 secured on shaft 567 driven by motor 572, through the speed reducer 807. A tension spring 810 urges arm 806$^a$ of bell crank lever 806 rearward of the setting up table 542, normally holding the cam 803 in such position as to permit engagement of hooks 796 over pins 797, as above described. The other arm 806$^b$ of bell crank 806 has pin and slot connection 812 to one end of a pull rod 813 secured at 814 to arm 815 of nut 808, the other arm or plate 645 of which carries the gravity pawl 642 previously mentioned. A push-button switch 816, of known type, mounted on a bracket 818 secured to setting up table 542, adjacent the front thereof, is disposed for operation by the front angle bar of the setting up table frame. As has been previously described, when the setting up table is used for a resetting operation, it is moved into its forward position by the tension springs 556, and the normally projected button of switch 816 is then moved inward and closes the circuit of solenoid 793, which this switch controls. That causes drum 768 to be driven so as to raise the table 542 into its uppermost position, in which the hooks 796 engage over pins 797, as just described. As the table 542 reaches that position, strong back 630 contacts the camming lever 786 (Figure 34) thereby raising rail 781 and declutching drum 768 from shaft 695. After the pins have all been gripped by the units 560, the nut 808, in its travel along the shaft or sleeve 809, moves the rod 804 in forward direction, causing cam 803, in cooperation with cam 802, to turn shaft 771 and thereby disengage the hooks 796 from pins 797, releasing table 542 for downward movement. Turning of shaft 771 in the manner stated also disengages hooks $824^a$ from pins $825^a$. Also, this travel of nut 808 moves the camming bar 633 (Figure 29), by means of pawl 642, so as to permit of lowering of the camming rails 627 as and for the purpose above stated. When cam 803 is disposed rearward of cam 802, the hooks 796 are held in position for engagement with pins 797, turning of the shaft 771 in clockwise direction (Figure 23) being limited by a stop finger 820 secured thereon which contacts the plate of setting up table 542. In Figure 23 the setting up table 542 is shown in its intermediate raised position, in which it is supported in the manner previously described, and in its rearward position in its frame, but, in the operation just described, the plate of that table is moved into its forward position, which it occupies when performing a resetting operation.

The setting up table, with the pins carried by the units 560, continues its downward movement from its intermediate position, when released from the arms 719, as has been described. During the downward travel of the setting up table 542, two tension springs 822 (Figure 23) anchored at their upper ends to frame 50, and at their lower ends to cables 823 passing about pulleys 824 loose on shaft 771, and anchored at 785 to the plate of table 542, are placed under increasing tension and pull the plate rearward in opposition to the tension springs 556. When the plate of table 542 reaches its rearward position, in which it is locked by the arm 550 and the latch bar 551 (Figure 23) as previously described, the pins carried by this table are accurately aligned with the spots on the alley. Thereafter the table 542 moves into its lowermost position, sitting on the alley, and the pins are released under control of the timing means. That completes the setting up operation.

The setting up table 542 is released and moved downward from its intermediate position, for effecting the dead wood operation, as above described. In this dead wood operation, the downward travel of the table should be less than its downward travel in performing the resetting operation. In order to accomplish that result, shaft 771 is provided (Figure 23) at each end with a hook $824^a$, fixed thereon and disposed to engage over a roller stud $825^a$ carried by a rail 826 slidably mounted on the frame 50. Since the setting up table including the plate or platform 542, normally is in its intermediate raised position, the hooks $824^a$ normally will be engaged over the stud rollers $825^a$. Each of the rails 826 normally is held against downward movement by a round nosed angle latch 828 mounted on frame 50 and held in engagement with a rounded notch or recess in rail 826, by tension spring 829. At its upper end, each rail 826 is provided with an outwardly directed finger 830 carrying an adjustable abutment, conveniently a bolt 831, disposed for contact with a block 832 fixed on frame 50 and underlying finger 830. When the setting up table 542 is released for downward movement, in performing the dead wood operation, the rails 826 move downward a predetermined distance, as limited by abutments 831 and blocks 832, stopping down travel of the table 542 in a position thereof appreciably higher than that in which this table is stopped in the resetting operation, since the plates 596 are disposed considerably below the gripping jaws 592 and 594.

Referring further to the sweeping operation, when the front roller 660 (Figure 32) contacts the finger or block 675 (Figure 31) of the slidable plate 676, the latter moves forward along channel member 662, in opposition to the tension spring 680, and the finger or block 675 contacts the lower end portion of an arm 834 extending downward through a slot $835^a$ in the upper flange of channel member 662. Arm 834 is fixed to the forward end of a pull rod 838 slidable through a bracket 835 fixed to the top flange of channel member 662. Rod 838 is pivoted at its rearward end (Figure 30) by a clevis 839, to a lever 840 pivoted on a bracket 841 fixed to main frame 50 of the machine. The lever 840 is connected, below its fulcrum, by pin and slot means 842, to one arm of a bell crank 843, pivoted in a bracket 844 mounted on the main frame 50 of the machine, the other arm 845 of this bell crank being slotted and straddling a shift rod 846, between two collars 847 fixed thereon. The shift rod 846 is slidably mounted in brackets 848 mounted on the main frame of the machine adjacent the back thereof, and has fixed thereto two rearwardly extending shift arms 849 and 701. The shift arm 701 operates the clutch 700 for clutching and declutching the double winding drum 694 to and from shaft 695. It will thus be seen that when the sweep is moved forward along the channel members 662, by the tension springs 690, it actuates suitable mechanism whereby drum 694 is clutched to shaft 695 and the sweep is then moved rearward along the alley so as to perform the sweeping operation. As the sweep approaches the rear of the alley, sufficiently to complete the sweeping operation, a part of the sweep head frame strikes the lower end of lever 840, swinging this lever rearward and thus declutching drum 694 from the shaft 695, permitting return of the sweep to its normal inoperative position in the manner previously described.

The movement of shift rod 846 in the direction for declutching the winding drum 694 from shaft 695, moves shift arm 849 in such direction as to clutch a third double winding drum 852, loose on shaft 695, to this shaft, by means of a clutch $700^a$, similar to clutch 700, having a movable member operated by the shift arm 849. The drum 852 has attached thereto two cables 853 (Figure 36) windable onto and off of this drum. These cables 853 are led from the drum 852 over suitably arranged pulleys 854 and $854^a$ mounted on frame 50 and are attached at their other ends to a pit elevator 665 suitably mounted and guided, of substantially shallow box-like formation, which normally rests in the pit B of the alley. All of the pins and the balls swept from the alley are deposited in the elevator 665 and, upon completion of the sweeping operation, the elevator is raised into proper position for dumping the pins and the balls into the hopper 51. Pulleys 854a are carried by arms 856 pivoted at 857 on frame 50 for swinging movement and limited as to downward movement by stops 855 secured to frame 50. As the elevator basket 665 reaches the top of frame 50, it contacts the arms 856 and swings the latter upward and forward about their pivots 857. The basket 665 is then tipped downward and forward and the pins and balls are dumped therefrom into the hopper 51. The front of the basket 665 is open for discharge of the pins and balls therefrom, and may be provided with a normally closed door having latch means associated therewith for releasing the door when the basket is in its discharging position. Also, as the basket 665 reaches its discharging position, and the arms 856 are swung upward thereby, lever 840 is moved in counter-clockwise direction, by contact therewith of a pin 856b carried by a finger 856a extending downward from one of the arms 856, a proper distance to declutch drum 852 from shaft 695, the movement of lever 840 being such that the clutch 700 is not reengaged and the two shift arms 849 and 701 are then in their neutral positions with both of the clutches 700 and 700a disengaged. The declutching of drum 852 from shaft 695 does not occur until after the pins and the balls have been discharged from the pit elevator basket 665, which is then returned by gravity to its normal lowered position.

Finger 338 of the hook member 334 (Figure 17) contacts a member 860 of frame 50 for limiting turning movement of hook member 334 by the torsion spring 336 associated therewith. Finger 338 extends downward beyond member 860 and has pivoted in its lower end (Figure 23) a bypass gravity pawl 862. This pawl is disposed for contact by a cam finger 863 fixed to the frame 543 of the setting up table 542. In the upward movement of frame 543, from its normal intermediate or neutral position, preparatory to a setting up operation, finger 863 raises and passes by pawl 862. After the units 560 have gripped the pins, the table 542 moves downward pulling them out of the buckets of the rotatable table 262, as previously explained. As the table 542 moves downward the inclined camming surface 864 of finger 863 contacts pawl 862 and displaces hook member 334 in forward direction, to its dotted line position indicated in Figure 8 thus releasing plunger 515 of the distributor 230, which is then returned to its normal pin receiving position at the front of frame 50, in which it is locked, as and for the purpose above described.

The other arm 645 of the nut 808 (Figures 23, 29 and 37) also has secured thereto one end of a rigid strip 867 of suitable electrical insulating material (Figure 37) to the other end of which is fixed a bracket 868 carrying a vertical post 869. This post 869 passes through a bore 870 of relatively large diameter, in a head 871 at one end of a control arm 872 pivoted at 873 on bracket 868. A slotted finger 877 is pivoted adjacent its lower end, at 874, on arm 872. The outer end portion of arm 872 is disposed between and in the plane of two pushbutton switches 875 and 876 mounted on the setting up table 542. When the setting up table 542 is in its intermediate or neutral position, with the units 560 fully opened, the nut 808 is in its neutral position and arm 872 then holds the button of switch 875 in its inner position, in which this switch is open so that the motor 572, in the circuit of which the switch 875 is included, is stopped. Also, when nut 808 is in its neutral position, two contact blades 878, secured to and depending from strip 867, are disposed between pairs of contact jaws 879 mounted on an insulating strip 880 supported on the table 542. The contact blades 878 enter between the contact jaws 879 shortly before the nut 808 reaches its neutral position, thereby reversing the starting field windings of the motor 572.

Assuming that it is desired to perform a resetting operation, the setting up table 542 is moved forward and then raised from its intermediate or neutral position to its upper position, in the manner previously described. As the table 542 approaches the limit of its up travel, the upper end of finger 877 contacts a stop 882 mounted on the underface of the rotating table 262. That causes depression of arm 872, releasing the button of switch 875, thus closing the circuit of motor 572, which is then set into operation. The motor 572 operates the units 560 in the manner previously described for gripping the pins in the buckets of the rotatable table 262. Shortly after that occurs, the upper end of finger 877 passes out of contact with stop 882 and the arm 872 is returned to raised position, by a lower compression spring 884 mounted about the lower portion of pin 869, an upper compression spring 885 mounted about the upper portion of this pin cushioning the upward or raising movement of arm 872. At that time arm 872 has been moved to the right, as viewed in Figure 37, a sufficient distance to be clear of the button of switch 875, which remains closed. Thereafter, nut 808 continues its travel to the right so that the contact blades 878 are caused to enter between pairs of contact jaws 886, similar to the jaws 879, serving in cooperation therewith to reverse the starting field windings of the motor 572. Immediately thereafter, arm 872 contacts the button of switch 876 moving it inward and opening the motor circuit, thus again stopping motor 572, with the pins then gripped by the units 560. As will be understood, the contact blades 878 and the pairs of contact jaws 879 and 886 constitute, in effect, a reversing switch controlling the direction of the drive of the motor 572, and the switches 875 and 876, in conjunction with the control arm 872, provide means for starting and stopping the motor 572 at appropriate times relative to the operation of the parts driven by that motor.

Two normally open bushbutton switches 888 and 889, of suitable known type, are disposed at opposite sides of a foot 890 at the lower end of finger 877. As the upper end of finger 877 passes out of contact with stop 882, in the travel of nut 808, it contacts a curved cam arm 891 fixed to the under face of stop 882. That swings finger 877 about its pivot pin 874, in opposition to a tension spring 877a, in such direction and to such extent that the foot 890 thereof is disposed to clear the pushbutton of the switch 888. Accordingly, when arm 872 reaches its position opening switch 876, the switch 888 remains open. It will be recalled that during the operation of gripping the pins, by the units 560, the setting up table 542 is held in raised position by the hooks 796 (Figure 23) which engage the pins 797 shortly after the upper end of finger 877 has contacted the stop 882. Also, as the table 542 reaches its uppermost position, the strongback 630 thereon contacts the camming lever 786 (Figure 34) lifting the rail 781 and declutching the drum 768 from shaft 695, thereby stopping upward travel of the table.

At about the same time that the switch 876 is opened, with the nut 808 in its corresponding position, the hooks 796 are disengaged from the pins 797, in the manner previously described, and the table 542 starts on its downward trip, being halted at the intermediate point by the arms 719 as and for the reason previously described. Thereafter the sweeping operation is completed and the table resumes its downward travel, at the end of which it sets the pins upon the spots on the alley. As the setting up table 542 approaches the alley, an adjustable abutment member 895 (Figure 37), in the lower end of a plunger 896 slidable through the plate of table 542, contacts the alley and forces the plunger upward so that head 897 thereof, over which the arm 872 is now positioned, contacts arm 872 and swings it upward thereby releasing the pushbutton of switch 876 and closing the circuit of the motor 572. The units 560 are then opened so as to release the pins, as previously described, and the nut 808 is returned to its original position, with the contact blades 878 engaging between the pairs of jaws 879, again reversing the starting field windings of the motor 572. Also, when nut 808 is returned to its normal position, foot 890 of finger 877 contacts the button of switch 889 thereby closing this switch and energizing the solenoid 793 so that the rail 781 is moved downward, the clutch 775 is thrown in and the setting up table 542 is returned to its normal or intermediate position. As table 542 moves upward to and a short distance above that position, the strong back 630 (Figure 34) contacts abutment 732, table 542 being then in its rearward position, thereby raising rail 781 and declutching drum 768 from shaft 695. Table 542 then moves downward to its intermediate position, with rollers 744 (Figure 9) resting upon the upper faces of arms 719 (Figure 32), and the rail 781 remains in its declutching or raised position. That completes the setting up operation.

As previously explained, when the setting up table 542 is in its normal or intermediate position, the hooks 824ᵃ (Figure 23) are engaged over the roller studs 825ᵃ, and upon release of the table 542 for movement downward in the dead wood operation, contact of adjustable stops 831 with the blocks 832 limits such downward travel of setting up table 542. As the setting up table 542 approaches the limit of its downward travel, arm 900 of a multiple crank lever 901 (Figure 38), rockably mounted in bearing blocks 902 secured to the plate of the resetting table 542, contacts an angularly disposed finger 903 at the lower end of a rail 904 slidably mounted in brackets 905 mounted on the main frame 50 of the machine. An adjustable abutment 906 carried by an angularly disposed finger 907 at the upper end of rail 904, is disposed for contact with block 908 mounted on the upper bracket 905, for positively limiting downward travel of rail 904, the latter being urged upward by a tension spring 909 anchored thereto and to block 908. Arm 900 of lever 901 is urged downward by a tension spring 910 anchored thereto and to the plate of table 542. At its other end lever 901 is provided with an arm 911 on which is pivoted, at 912, an arm 913ᵃ having trip fingers 913 of suitable form to overlie the free end portion of arm 872 (Figure 37) in either of its extreme positions. Fingers 913 are urged in upward direction by a tension spring 914 connecting arms 911 and 913ᵃ, movement of the fingers 913 in such direction being limited by a stop 915 on arm 911 underlying arm 913ᵃ.

When arm 900 contacts finger 903, as table 542 moves downward, the rail 904 moves downward until stopped by the block 908 and, thereafter, in the continued downward movement of table 542, the lever 901 is rocked in such direction that one of the fingers 913, then overlying arm 872, depresses the latter. That releases the pushbutton of switch 875 and closes the circuit of motor 572, which then drives the members 560ᵃ and 560ᵇ of the units 560 so as to grip the standing pins between the plates 596 thereof. When that occurs, that is when the pins have been gripped between the plates 596, the arm 872 opens switch 876 stopping motor 572. At about the same time, foot 890 of finger 877, now in vertical position, closes switch 888 thereby energizing solenoid 793, which causes the setting up table 542, with the pins gripped therein, to be raised to its intermediate or normal position, as above explained, in which position it is then supported by the arms 719, as has been explained. The sweeping operation is then performed, after which the table 542 is released and again moves downward into position for setting the pins on the alley. At this time the arm 872 is in underlying relation to the other one of the trip fingers 913 and, as the table reaches its lowermost position, the then overlying trip finger 913 actuates arm 872, as above explained, thus causing closing of the switch 876, with resultant operation of the motor 572 and release of the pins, which are then left standing upon the alley. During this latter operation, that is the release of the pins from the clamping units 560, the nut 808 is travelling along the shaft 567, by means of the threaded element 809 thereof, toward the switches 875 and 889. Since the finger 877 is now still in its normal vertical position, foot 890 thereof contacts the pushbutton of the normally open switch 889, closing the circuit of the solenoid 793 and causing the setting up table 542 to be returned to its normal or intermediate position as before. That completes the dead wood operation. From what has been said, it will be understood that the switches 888 and 889 are closed but briefly and then opened, when the push buttons thereof are moved inward, and remain open when their push buttons are released and returned to their normal projected positions.

A brief review of the dead wood operation and of the setting up operation may be helpful. At the start of the dead wood operation, the nut 808 and pawl 642 are in the position shown in Figure 29, with contact blades 878 (Figure 37) in engagement with contact jaws 879, motor switch 875 is held open by arm 872, motor 572 (Figure 23) is stopped, pin gripping members 560ᵃ and 560ᵇ (Figure 24) of the respective units 560 are in their full open or outer positions, cam rails 627 are held down by springs 632, holding detents 610 engaged with ratchet wheels 582, and setting up table 542 is in its rearward position and in its intermediate raised position. Table 542 is lowered into operative relation to the alley and arm 872 is depressed, as will be explained more fully later, permitting closing of switch 875 and resultant operation of motor 572. The opposed gripping members 560ᵃ and 560ᵇ then move inward toward each other and nut 808 travels toward the right rearward as viewed in Figure 37, i. e., in a direction from contact jaws 879 toward contact jaws 886. When the respective gripping members have moved inward a short distance, latch plate 616 is released from trip finger 622 (Figure 25) and latches plate 596 (Figure 24) in its outer position effective for holding arms 605 depressed, and the feeler 625 is projected inward beyond plate 596. Pawl 642, in its continued travel to the right, then contacts roller 641 (Figure 29) and depresses arm 640 thereby raising the cam rails 627 in opposition to the springs 632. In the continued inward travel of the members 560ª and 560ᵇ, the feelers 625 contact the pin therebetween, at opposite sides thereof, thereby stopping such members equidistant from the pin as will appear more fully later. Rotation of all of the shafts 558 then continues for a sufficient time to assure that the members 560ª and 560ᵇ of all of the units 560 having a pin between the members thereof are stopped in proper relation to the respective pins. At the end of such time, pawl 642, in its further continued travel to the right, passes out of contact with roller 641. The cam rails 627 are then moved downward by springs 632, reengaging detents 610 (Figure 24) with ratchet wheels 582, and the members 560ª and 560ᵇ of the respective units are advanced into tight gripping engagement with the pin therebetween. Thereafter rotation of shafts 558 continues for a sufficient time to assure that all of the pins have been properly gripped. Thereafter, in the continued travel of nut 808, and with it pawl 642, to the right, contact blades 878 enter between the respective pairs of jaws 886, and arm 872 then opens switch 876 thereby stopping motor 572 before nut 808 has travelled to the right a sufficient distance to move the rod 804 forward. Accordingly, hooks 824ª remain engaged over pins 825ª throughout the dead wood operation, for limiting downward movement of the table 542 in the manner above described and as will be understood from what has been said. That terminates the pin gripping phase of the dead wood operation.

After the pins have been gripped, as above explained, table 542 is returned to its intermediate raised position, the alley is swept, and table 542 is lowered by gravity, as will be described in detail later, into position with the pins carried thereby seating upon the alley. As table 542 reaches that position, arm 872 is depressed, closing switch 876 and setting motor 572 in operation. The cam rails 627 are still held down by springs 632 and the shafts 558 are now rotated in directions to move the gripping members 560ª and 560ᵇ of the respective units 560 apart, the starting field of the motor having been reversed by entry of contact blades 878 between the respective pairs of jaws 886. That releases the pins, which remain standing on the alley. Since the motor 572 has been reversed, nut 808, and with it pawl 642, now travels to the left, i. e., toward the contact jaws 879. When pawl 642 contacts roller 641, it swings upward about its pivot 643 and passes over roller 641 without affecting arm 640, and the cam rails 627 remain held down by springs 632. Thereafter shafts 558 continue to rotate until all of the members 560ª and 560ᵇ have been returned to their full open or outer positions, at which time nut 808 approaches the limit of its leftward travel, with contact blades 878 engaged between the respective pairs of jaws 879. Shortly thereafter, arm 872 opens switch 875 stopping motor 572. That terminates the pin releasing phase of the dead wood operation. It will be noted that the various parts involved in the pin gripping and releasing phases are returned to their original positions upon completion of the releasing phase, and that the cam rails 627 then remain in lowered position, the units 560ª and 560ᵇ and the associated operating and control means being then disposed and conditioned for a succeeding pin gripping phase of the dead wood operation or for a setting up operation.

The setting up operation is quite similar to the dead wood operation, with respect to gripping and releasing the pins, and a brief description thereof will suffice. When table 542 is raised into operative relation to the pin receiving table, by means to be described fully later, arm 872 is moved downward sufficiently to clear the button of switch 875, which then closes and starts the motor 572. The pin gripping members 560ª and 560ᵇ are moved toward each other, the cam rails 627 still being in their lowered positions, and the gripping plates 596 are latched in their outer or retracted positions. In the travel of nut 808 to the right, pawl 642 depresses arm 640 thereby raising the cam rails 627 and shortly thereafter feelers 625 contact the body portions of the respective pins, as indicated in Figure 25, so that the gripping members 560ª and 560ᵇ are stopped at opposite sides of and equidistant from the pin. The pawl 642 then passes out of contact with roller 641, the cam rails 627 are lowered and members 560ª and 560ᵇ are moved a further distance toward each other so as to grip the pin firmly about the neck thereof, between the gripping elements or jaws 592 and 594. Thereafter rotation of shafts 558 continues for a sufficient time to assure that all of the pins are properly gripped, table 542 is released from table 262, contact blades 878 enter between the respective pairs of contact jaws 886, reversing the starting field windings of motor 572, and switch 876 is opened stopping the motor, nut 808 and pawl 642 being then disposed to the right of arm 640. That completes the pin gripping phase of the resetting operation.

After the pins have been gripped, as above explained, the alley is swept, the sweep is returned to inoperative position, and table 542 is lowered into position seating on the alley. Since table 542 is now in its rearward position, arm 900 (Figure 38) clears finger 903 of rail 904, and arm 911 is held in its raised position, with the fingers 913 of arm 913ª spaced above arm 872. As table 542 approaches its lowermost position, abutment 895 of plunger 896, head 897 of which then underlies arm 872, contacts the alley so as to raise the plunger. The plunger 896 raises arm 872 clear of the button of switch 876, starting the motor 572. The gripping members 560ª and 560ᵇ are moved away from each other, releasing the pins, which are left standing upon the alley, and are returned to their original positions, the rails 627 remaining down, as before. In the releasing operation, the nut 808, and with it pawl 642, is returned to its position at the left, i. e., adjacent contact jaws 879 and switch 875 is opened by arm 872. The members 560ª and 560ᵇ, and associated parts are then in their original positions, with the cam rails 627 remaining down, the parts being then positioned and conditioned for again gripping the pins, either for a dead wood operation, or for a resetting operation. After release of the pins, the table 542 is returned to its normal intermediate raised position and is then also in its normal rearward position in its frame, as has previously been explained.

While the various mechanisms of the machine have been described in detail, and the setting up operation and the dead wood operation have been described generally, a detailed description of the two latter operations, and of the means for delivering the pins to the receiving table, will be conducive to a clearer understanding of the machine as a whole. I shall, therefore, describe in detail, first, the setting up operation, second, the pin delivery means, and, thirdly, the dead wood operation.

It will be assumed that the machine has completed a resetting operation, a frame has been played, and a succeeding resetting operation is to be performed. At that time the pin setting table 542 is in its intermediate position, with rollers 744 thereof (Figure 9) resting upon arms 719 (Figure 32) of sleeves 718 of the sweep mechanism, rod 714 is held in its rearward position by latch bolt 728 (Figure 32A), and the sweep 650 (Figures 1 and 30) is in its raised neutral position adjacent the gate members 668, with its forward rollers 660 (Figure 32) in contact with the cam hooks 705. The table 542 is also in its rearward position (Figure 23), in which it is then held by latch bar 551 and arm 550. The pin gripping members 560ᵃ and 560ᵇ of the units 560 (Figures 24 to 26) are in full open position, latch plates 616 are held raised by fingers 622, camming rails 627 are down, detents 610 are in engagement with ratchet wheels 582, and the gripping plates 596 and the feelers 625 are in their outer or retracted positions. The arm 872 (Figure 37) is then in contact with the button of switch 875, holding it open, and foot 890 of finger 877 is in contact with the button of switch 889, now open, briefly closed and then opened by inward movement of its push button. The pin carriage 132 (Figures 14 to 16) is at the left hand end of track 130—the right hand end in Figure 18—with the leading edge of extension 165 of plate 145 a short distance to the right, as viewed in Figure 18, of cam 411, plate 145 being then moved to lowered position by a pin in the carriage and held in that position by latch member 152. The distributor 230 (Figures 3 to 4B and 8) is held in its rearmost position, indicated in dot and dash lines in Figure 8, by hook 334, with cam member 531 in contact with roller 206 (Figure 17) of shift lever 203 declutching pinion 196 from shaft 69. The pin receiving table 262 with a complete set of ten pins in it, is then stopped and is held in predetermined angular position by plunger 303 (Figure 21) in cooperation with bill 340 of plate 341 and gravity pawl 532. Plate 364 (Figures 3 to 4B, 10 and 11) of distributor 230 is latched in its outer position, with cam arm 478 holding down both of the cam elements 476 and 486, thereby holding all of the pick-up plates of the distributor raised, and holding arm 418 is disposed with its flange 424 overlying the outer arm 425 of angle lever 426, holding the outer or forward portion of arm 425 depressed. The rack bar 468 is then at an inner position, with cam 508 beneath roller 509, holding plunger 515 projected downward, and cam element 527 of cam member 526 is in proximity to arm 528 of holding pawl 471, then engaged with the outermost one of the teeth 470 of rack bar 468.

The resetting operation is initiated by pressing a push button reset switch at the post of the alley. That energizes solenoid 555 (Figure 23) thereby moving latch bar 551 to releasing position. The table 542 is moved forward by tension springs 556 and the button of switch 816 is pushed in by contact with a part of frame 543. The switch 816 is of known type and closes but briefly and then opens, in the inward movement of its button, and does not close in the outward movement thereof. Closing of switch 816 energizes solenoid 793, which moves rail 781 (Figure 34) downward, thereby clutching drum 768 to shaft 695. The cables 769 are then wound onto drum 768, raising table 542. As table 542 approaches its top position, rollers 795 (Figure 24) of the pin clamping and gripping members 560ᵃ and 560ᵇ lift plate 535 (Figures 19 to 22). In the continued up travel of table 542, plate 535 contacts arms 539 of ring 266 and moves it and the center bucket of table 262 to its raised position, thereby retracting the plungers 303 and 305 downward through table 262 and projecting the other plungers 322 above the table 262. The latches 270 are then engaged beneath ring 266, holding it and the center bucket in raised position. Also, in the upward movement of table 542 finger 877 (Figure 37) contacts stop 882 and is depressed, thereby releasing the button of switch 875, which then closes and sets the motor 572 in operation. As table 542 reaches its top position, hooks 796 snap over pins 797 and strong back 630 (Figure 34) contacts camming lever 786, thereby raising rail 781 and declutching drum 768 from shaft 695. The setting up table 542 is now suspended from the pin receiving table 262, the motor 572 is in operation, and the pin clamping and gripping members 560ᵃ and 560ᵇ are travelling toward each other along the cross threaded shafts 558 (Figures 9, 24, and 25).

In the first part of the travel of members 560ᵃ and 560ᵇ in closing direction, the flanges 620 of latch plates 616 (Figure 25) are moved out of contact with trip fingers 622. Tension spring 618 of the respective members 560ᵃ and 560ᵇ then swings latch plate 616 downward into position with its outer end in close proximity to the inner face of flange 615ᵃ of angle finger 615. At that time the camming rails 627 are still in their lowered position shown in Figure 29, holding arms 605 (Figure 24) down with detents 610 engaging ratchet wheels 582, and gripping plates 596 are held in their outer or retracted positions. The feelers are then projected inward beyond the gripping plates 596, which are latched in their outer retracted positions.

At the start of the resetting operation, the switch blades 878 (Figure 37) are in engagement with the pairs of jaws 879, and the gravity pawl 642 (Figure 29) is disposed to one side of arm 640. In the closing movement of the members 560ᵃ and 560ᵇ, the nut 808 (Figure 37) travels toward jaws 886. When nut 808 has travelled a short distance in that direction, pawl 642 contacts roller 641 (Figure 29) of arm 640, thereby raising the camming rails 627. The gripping plates 596 are then latched in retracted position by latch plates 616, holding arms 605 down, and the feelers 625 are projected inward beyond plates 596. In the continued closing of members 560ᵃ and 560ᵇ, gripping jaws 592 and 594 (Figure 24) enter the pin buckets (Figures 19 and 20) through slots 276 thereof. The feelers 625 then contact the pin in the bucket and are moved to outer or retracted position, thereby releasing the gripping plates 596. Since arm 640 (Figure 29) is still held down by pawl 642, holding the camming rails 627 raised, the gripping plates 596 swing inward, under the influence of tension springs 601 (Figure 24). When the plates 596 move inward they raise the arms 605, thereby disengaging the detents 610 from the ratchet wheels 582 and stopping the members 560a and 560b at opposite sides of and equidistant from the pin between them. The parts are then in approximately their positions shown in Figure 24, with latch plate 616 overlying flange 615a of angle finger 615. Shortly after stoppage of members 560a and 560b, as above, pawl 642 (Figure 29) passes beyond roller 641 and the camming rails 627 are returned to lowered position. Arms 605 are then held depressed, with detents 610 engaging ratchet wheels 582, and the members 560a and 560b are moved a further distance in closing direction, until the gripping jaws 592 and 594 thereof have been closed about the necks of the pins. The motor 572 (Figure 23) continues in operation for a short length of time after closing of members 560a and 560b, to assure that all of the pins will be properly gripped, that being permitted by the slippage means, previously mentioned, incorporated in the driving connections between the shafts 558 and the members 560a and 560b of the units 560.

Referring still to the resetting operation, when the setting up table 542 is in its fully raised position finger 877 (Figure 37) is moved beyond stop 882, in the travel of nut 808 toward jaws 886 in the closing movement of members 560a and 560b. That permits the arm 872 to be raised to its normal position, by compression spring 884, in which it is disposed in the plane of the button of switch 876. In the continued travel of nut 808 in the direction stated, the upper end of finger 877 is deflected to the left, by cam 891 secured to stop 882 and extending beyond one end thereof, in opposition to tension spring 877a. That disposes foot 890, at the lower end of finger 877, so as to clear the push button of switch 883, which is not actuated in the resetting operation. In the closing of the members 560a and 560b, the switch blades 878 enter between the pairs of jaws 886 thereby reversing the starting field of motor 572 preparatory to opening of members 560a and 560b, as will appear more fully later. After the members 560a and 560b have been fully closed the motor 572 continues in operation, for a short time, as and for the purpose above stated. During such continued operation of motor 572, the nut 808 moves a further distance toward jaws 886 and arm 872 contacts the button of switch 876 and moves it in, thereby opening that switch and stopping motor 572. Also, as the members 560a and 560b are closed, the releasing fingers 292a (Figure 24) thereof contact the cam elements 292 (Figure 19) of latch members 283 of the respective pin buckets. The latch members 283 are then swung into position with the flanges 282 thereof clear of the fingers 281 of the lower hinge leaves 280 of hinges 278. That releases the doors 277, so that the pins may be pulled from the buckets in the downward movement of table 542. After the doors 277 have been opened, and shortly before arm 872 (Figure 37) opens switch 876, rod 804 (Figure 23) is pulled forward by bell crank lever 806, in the continued travel of nut 808 toward the left, as viewed in Figure 23. In this forward movement of rod 804 cam 803 contacts cam 802 and turns shaft 771 counter-clockwise, thereby disengaging hooks 796 from pins 797 and also disengaging hooks 824a from the stud rollers or pins 825a. The table 542 then moves downward by gravity and pulls the pins from the buckets, the doors 277 (Figure 19) of which swing apart in the withdrawal of the pins. At that time, as explained above, the latch members 283 are held in releasing position, with flanges 282 thereof clear of fingers 281. As the pins are pulled out of the buckets, the doors 277 swing toward each other and latch members 283 swing toward latching position, under the influence of tension springs 287. In the closing movement of doors 277, flanges 282 of latch members 283 contact the edges of fingers 281, the parts being, of course, properly proportioned to that end, and when the doors 277 reach fully closed position the latch members snap into latching position with flanges 282 thereof inside of the fingers 281. Movement of latch members 283 in latching direction is limited by the stops 290, as previously explained. The pin clamping and gripping members 560a and 560b are now fully closed with the pins gripped between them, the motor 572 is stopped, with its starting field windings reversed, and table 542 has been released and is starting downward with a complete set—ten—of pins therein. While the table 542 is being raised and the members 560a and 560b are being closed, as explained above, the alley is being swept, and I shall now describe the sweeping operation, which constitutes part of the resetting or setting up operation.

It will be remembered that the resetting operation is initiated by energizing solenoid 555 (Figure 23), thereby releasing table 542, which is then moved into its forward position by tension springs 556. When the table 542 moves forward, it contacts cam latch member 745 and turns shaft 747 in counter-clockwise direction, in opposition to torsion springs 754. That moves lift finger 751 forward and upward into its position shown in Figure 23, in which position it is then held by the latching pawl 757 which then engages in back of a detent element of the cam latch member 745. The lift finger 751 raises arm 716 of the double hook structure 710 (Figure 32) and disengages it from pin 713. That releases hook 710 from pin 713 and frees rod 707 for forward movement along channel member 662. The sweep 650 (Figure 30) is then moved forward by tension springs 690, then under considerable tension. The cam hooks 705 (Figure 32) are moved forward, by the forward sweep rollers 660 in contact therewith, and are cammed up into releasing position. The cam hook 705 carries with it the clevis 706. When the sweep has moved forward a short distance, the forward roller 660 passes from beneath gravity pawl 762, the bill of which then underlies clevis 706. In the continued forward movement of the sweep, and with it cam hook 705, clevis 706 passes forward beyond gravity pawl 762, the bill of which then rises in back of clevis 706 latching it against rearward movement. Shortly thereafter, the rearward roller 660 of sweep 650 trips pawl 762, releasing clevis 706, and the rod 707 and the parts carried thereby are then returned to their normal rearward positions by the spring 709, which is compressed in the forward movement of rod 707. Since the double hook structure 710 is attached to sleeve 712 and rod 707, it partakes of the movements of the latter. When rod 707 has been moved forward a short distance, arm 716 of double hook 710 is pulled off of lift finger 751 (Figure 23) and double hook 710 then drops onto the upper flange of channel member 662. When that occurs, however, the bills of double hook 710 are forward of pin 713 (Figure 32) and do not engage therewith. In the return movement of the rod 707 and the parts attached thereto, double hook 710 engages pin 713 and arm 716 thereof then underlies lift finger 751. The sweep continues its forward travel, and the forward rollers thereof contact arms 675 (Figure 31) of gate plates 676, moving them to open position. Rollers 659 then pass through openings 678 and the sweep 650 swings downward into its substantially vertical operative position shown in Figure 30. As the gate plate 676 of the left rail 662 moves into open position, arm 675 thereof contacts arm 834 of pull rod 836, which then moves forward and swings lever 840 in counter-clockwise direction. Lever 840 actuates bell crank 843, thereby moving shift rod 846 to the right (Figure 30) and clutching drum 694 to shaft 695. The cables 691 are then wound upon drum 694 and the sweep 650 is moved rearward along the alley, sweeping the pins and balls from the alley and the gutters into the pit. The table 542 is supported in intermediate position, by arms 719, while the alley is being swept, as will be explained presently. At the start of the rearward travel of the sweep, the gate plates 676 are returned to closed position by the tension springs 680. During the rearward stroke of sweep 650, the cables 681 are unwound from drums 683 and the cables 689 are wound onto drums 688, thereby placing the springs 690 under increasing tension. When the sweep 650 reaches the rear of the alley, it contacts lever 840 and swings it in clockwise direction, thereby declutching drum 694 from shaft 695. The sweep 650 is then moved forward along the rails 662, by tension springs 690. In the forward travel of sweep 650 rollers 659 thereof contact latch members 666 (Figure 1) and are directed thereby, and by angle members 667, upwardly into the rails 662, thereby turning the sweep into substantially horizontal position. As the rollers 659 enter the rails 662 the gate members 668 are swung upward by rollers 659 and, in the continued forward travel of sweep 650, drop to closed position. When the sweep 650 has moved forward a short distance beyond gate members 668, the forward rollers 660 thereof contact the cam hooks 705 (Figure 32), then effective for restraining the sweep against further forward movement. That completes the sweeping operation and the sweep is then held in its normal neutral position. The sweeping operation just described is completed and the sweep is returned to its raised neutral position prior to release of the pin setting table 542 for downward movement from its fully raised position.

Figure 36:
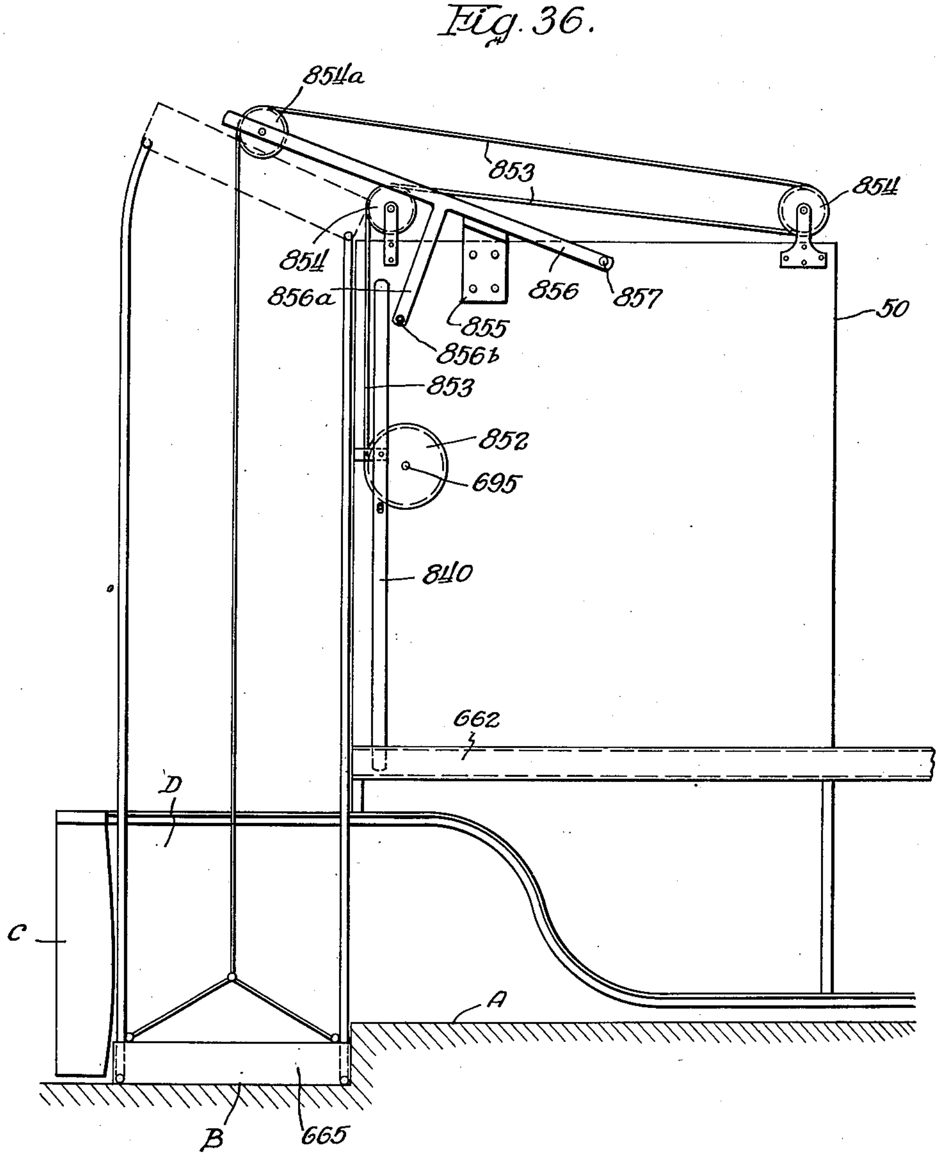
Figure 36 is a side view of the pit elevator and the operating means therefor, the alley and the pit being shown in section and the pin setting machine as a whole being shown diagrammatically.

When lever 840 (Figure 30) is swung clockwise by the sweep 650, as it reaches the pit end of the alley, shift rod 846 is moved to the left and drum 694 is declutched from shaft 695, as above described. Also, in the movement of shift rod 846 to the left, drum 852 (Figures 30 and 36) is clutched to shaft 695. The cables 853 are then wound onto drum 852 and raise the pit elevator 665, into which the pins and balls have just been swept from the alley. As the elevator basket 665 approaches its top position, it contacts arms 856 (Figure 36) and swings them upward and forward. The basket 665 is then tipped downward and forward and the pins and balls are dumped therefrom into hopper 51 of the machine. Immediately thereafter lever 840 is swung counter-clockwise, by pin 856[b] carried by finger 856[a] of one of the arms 856. That moves shift rod 846 to the right (Figure 30) to an extent effective for declutching drum 852 from shaft 695 without reengaging the clutch 700, and the elevator basket 665 returns to its lowered position by gravity, the clutch shift arms 701 and 849 being then in their inoperative or neutral positions shown in Figure 30. Also, when the pit elevator basket 665 drops, the arm 856 drops down onto the stop 855 (Figure 36). It will be seen that the pit elevator is raised and dumped and then returned to its lowered position, incident to the sweeping operation.

Figure 17:
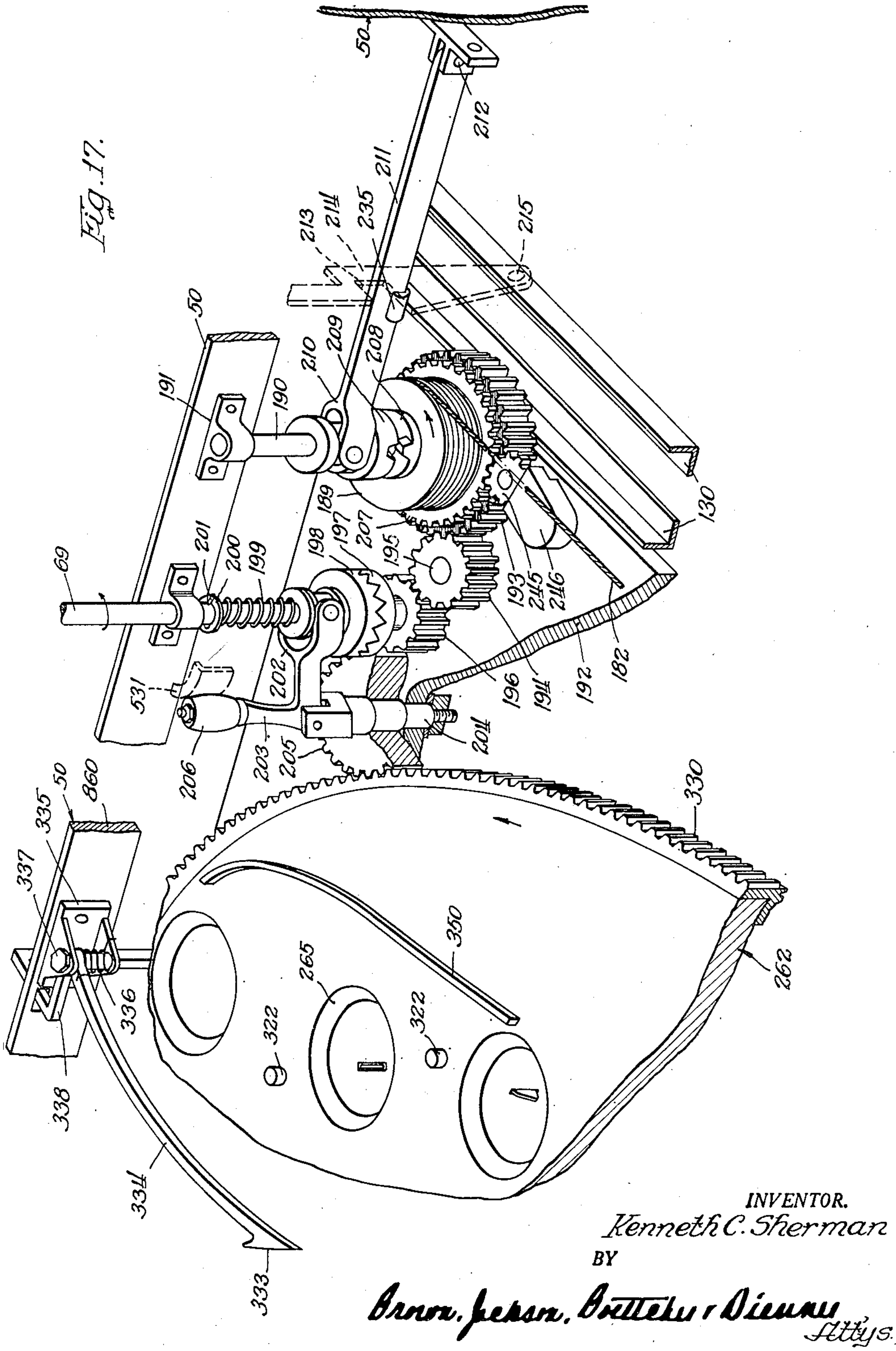
Figure 17 is an isometric view of the means for moving the pin carriage into pin receiving position and the means for rotating the pin receiving table and the controls therefor and associated parts, certain parts being broken away and shown in section.

Referring still to the resetting operation, more particularly in respect to the operation of table 542 and associated parts—it will be remembered that, during the sweeping operation, the setting up table 542 (Figure 23) has been raised, the pin clamping and gripping members 560[a] and 560[b] have been moved into fully closed position (Figure 25) and the doors 277 (Figure 19) of the pin buckets have been released for opening thereof. The nut 808 (Figure 37) of the timer means is then approaching the limit of its travel toward jaws 885, with which the blades 878 are now engaged. Upon completion of the sweeping operation, cam 803 (Figure 23) raises cam 802, thereby disengaging hooks 796 from pins 797 and releasing table 542 for downward movement, as previously explained. Immediately thereafter, switch 876 (Figure 37) is opened by arm 872, stopping motor 572. As table 542 moves downward, it depresses the latching pawl 757 (Figure 23) thereby releasing the cam latch member 745. Shaft 747 is turned clockwise by torsion spring 754, swinging arm 748 downward and rearward. At that time arm 716 of the double hook structure (Figure 32) underlies lift finger 751, as above explained. When arm 748 swings downward and rearward, lift finger 751 swings upward, as permitted by tension spring 752, until it clears arm 716, and is then returned by tension spring 752 to its normal position relative to arm 748, in which it is then below arm 716. Table 542 then passes downward out of contact with latching pawl 757, which is then held depressed by the detent of cam latch member 745, it being understood that at that time shaft 747 has been turned clockwise to the full extent permitted by stop 758. In Figure 23 the cam latch member 745 is shown latched in the position to which it is moved by table 542, at the start of the resetting operation, with lift finger 751 under arm 716 holding it raised. Also, as the table 542 moves downward, the inclined surface 864 of finger 863 contacts pawl 862 at the lower end of the downwardly extending arm 338 of hook 334 (Figures 8 and 17). That swings hook 334 counterclockwise, as viewed in Figure 8, into its releasing position indicated in dotted lines. The plunger 515 of distributor 230 is thus released from hook 334, and the distributor is returned to position at the front of frame 50, as will be explained more fully presently. The pawl 862 is disposed somewhat above the trip finger 863 when table 542 is in its intermediate position. That guards against release of the distributor 230 for forward movement thereof, during the deadwood operation, as will be explained later. Since double hook 710 (Figure 32) is released from pin 713 for setting the sweep in operation, the sleeve 718 remains in its normal position. Shortly after pawl 862 has been actuated, the rollers 744 (Figure 9) seat upon arms 719 (Figure 32) and table 542 is held thereby in its intermediate position until completion of the sweeping operation. As the sweep approaches its neutral position, the forward rollers 660 thereof swing trip arm 735 rearward, forcing sleeve 718 rearward. That moves arms 719 from beneath rollers 744, releasing table 542 for downward movement. Compression spring 721 then returns sleeve 718 to its normal forward position. In the continued downward travel of table 542, it is returned to its rearward position by tension springs 822 (Figure 23) and the associated cables 823 and pulleys 824, and is then latched in that position by the latching bar 551 and arm 550.

Table 542, when released from arms 719 as above described, continues to move downward until it reaches resetting position S, indicated in dotted lines in Figures 6, resting upon the alley with the pins held by the units 560 seating upon, or in proximity, to the alley. As table 542 approaches that position, abutment member 895 contacts the alley (Figure 37). At that time, arm 872 overlies head 897 of plunger 896. In the slight further downward travel of table 542, plunger 896 raises arm 872 clear of the button of switch 876, which then closes, setting the motor 572 into operation. Since the starting field windings of the motor were reversed by engagement of blades 878 with the pairs of jaws 883, as above explained, the cross threaded shafts 558 (Figures 6, 24 and 25) are driven in proper directions for opening the units 560. Accordingly, the members $560^a$ and $560^b$ of the respective units are travelling away from each other, and the nut 808 (Figure 37) is travelling toward the pairs of jaws 879. In the first part of the opening of the members $560^a$ and $560^b$, the pins are released and set upon the spots at the pin area or block of the alley. In the continued opening movement of members $560^a$ and $560^b$, and travel of nut 808 in the direction stated, pawl 642 (Figure 29) contacts roller 641 and then swings upward and forward to clear it, and then passes beyond roller 641 without actuating arm 640. The camming rails 627 (Figure 25) remain lowered, holding gripping plates 596 in retracted position and arms 605 in depressed position, with detents 610 in engagement with ratchet wheels 582. As the members $560^a$ and $560^b$ move away from the pin therebetween, now standing on the alley, the feelers 625 are projected by tension springs 618 and the latch plates 616 are swung down into position adjacent the inner face of flanges $615^a$ of angle fingers 615. In the continued opening of members $560^a$ and $560^b$, and the accompanying travel of nut 808 toward jaws 879 (Figure 37), blades 878 enter between the pairs of jaws 879 for reversing the starting field winding of the motor 572. Prior to that, arm 872 has been moved clear of the head 897 of plunger 896 and has been returned, by compression spring 885 to its normal position in the plane of the button of switch 875. The members $560^a$ and $560^b$ then move into their full open positions, in contact with brackets 559 (Figure 25), and flanges 620 of latch plates 616 contact trip fingers 622 and are turned into position clear of flanges $615^a$ of angle fingers 615, thereby moving feelers 625 to retracted position. The members $560^a$ and $560^b$ are then in full open position, with the camming rails 627 still down, holding arms 605 depressed with detents 610 engaging ratchet wheels 582, the gripping plates 596 are held in retracted position, and the feelers 625 are held in retracted position by contact of flanges 620 of latch plates 616 with trip fingers 622.

As the members $560^a$ and $560^b$ move in opening direction, foot 890 (Figure 37) of finger 877 contacts the button of switch 889 thereby briefly closing it, as above stated. Closing of switch 889 energizes solenoid 793 (Figure 34), which moves rail 781 downward so as to engage the clutch members 775, clutching drum 768 to shaft 695. The cables 769 are then wound onto drum 768, raising table 542. As table 542 approaches its normal intermediate position, rollers 744 (Figure 9) at the sides of the table frame 543 contact the upwardly and forwardly inclined camming surfaces 720 (Figure 32) of arms 719 of sleeves 718. The sleeves 718 are forced rearward along rods 714, in opposition to compression springs 721, until rollers 744 pass above arms 719. When that occurs, the sleeves 718 are returned to their normal forward position, with arms 719 then underlying rollers 744. At that time, strong back 630 (Figure 34) of table 542 contacts abutment 782 and raises rail 781, thereby declutching drum 768 from shaft 695. Table 542 then moves downward by gravity into its intermediate position, with rollers 744 resting upon arms 719, which normally support the table 542 in that position, and the rail 781 remains in its raised position. After switch 889 (Figure 37) has been closed, as and for the purpose stated, and the members $560^a$ and $560^b$ are in full open position, arm 872 moves the button of switch 875 inward, thereby opening that switch and stopping motor 572. During the travel of nut 808 toward jaws 879 (Figures 23 and 37) in the opening of the members $560^a$ and $560^b$, rod 804 is returned to its rearward position, by tension spring 810, with cam 803 disposed to the rear and clear of cam 802 on shaft 771. Continued travel of nut 808 in that direction is permitted by the pin and slot connection 812 between bell crank 806 and rod 813. The return of table 542 to intermediate position, and the opening of switch 875, as above conclude the resetting operation.

Downward movement of table 542 in the resetting operation sets into operation means for delivering a set of pins to the buckets of the pin receiving table 262, preparatory to a succeeding resetting operation, and it is appropriate to describe such means before proceeding with an explanation of the dead wood operation. When the tenth pin is delivered to the pin receiving table 262, the distributor 230 is latched by hook 334 in its rearmost position, indicated in dot and dash lines in Figure 8, as previously described. The positions which the various parts of the distributor 230 occupy, at the time of delivery thereby of the tenth pin to the center bucket of table 262, have been explained above in detail and the description thereof need not be repeated here. When the setting up table 542 has been released from the pin receiving table 262 in the resetting operation, and has pulled the pins from the buckets of table 262, the doors 277 of the buckets are latched closed, the ring 266 of the center bucket is held raised by latch members 270 (Figure 19), and plungers 303 and 305 of the center bucket are in lower retracted position, the plungers 322 of the other nine buckets are in upper projected position (Figure 22) extending an appreciable distance above table 262, and table 262 is released for rotation but is not then driven and remains stationary; all as previously described. In the downward travel of table 542, in the resetting operation, finger 863 (Figure 23) contacts pawl 862 and swings hook 334 to its releasing position, indicated in dotted lines in Figure 8, thereby releasing distributor 230, as has been explained.

The distributor 230 (Figures 3 to 4B, 8 and 10), when released from hook 334, is swung by torsion spring $361^f$ in counterclockwise direction, as viewed in Figure 8, into its forward position, in overlying parallel relation to track 130. As the distributor 230 reaches that position, detent 389 (Figure 18) is displaced by the camming edge 456 (Figure 3) of plate 364, then latched in its outer position. When the distributor 230 reaches its full forward position, detent 389 snaps in to the registering notches 457 and 458 in plates 360 and 364, and locks distributor 230 in its forward pin receiving position. It will be remembered that the carriage 132 (Figures 15 and 16) is then at the left end, as viewed from in front, of track 130, with a pin in it, and plate 145 is held lowered by latch member 152. The leading edge of extension 165 of plate 145 is then disposed a short distance to the left—the right in Figure 18—of cam 411. In the return movement of distributor 230 to its forward pin receiving position, cam 531 thereof (Figures 3 and 17) is moved into position clear of roller 206 of shift lever 203, and the adjustable abutment 439 (Figures 3 and 14), also carried by distributor 230, contacts arm 223 of latch member 219 and disengages the latter from detent 217 of arm 214. Tension spring 216 then swings arm 214 in counterclockwise direction (Figures 14 and 17), into such position that roller 235 of shift lever 211 enters depression 236 thereof. That lowers clutch member 209 into engagement with clutch member 208 and clutches drum 189 to shaft 190. At about the same time, shift lever 203 is released by cam 531, and compression spring 199 moves clutch member 198 downward into engagement with clutch member 197, clutching pinion 196 to shaft 69. The pin receiving table 262 is then rotated by gear 205 in counterclockwise direction, as viewed in Figures 8 and 17, and the drum 189 is rotated in like direction, with shaft 190, by gear 207 and pinion 194, pinion 196 being the primary driving element of the gear train.

The cable 182 (Figures 14 to 17) is wound onto drum 189 during rotation thereof and pulls the carriage 132 along track 130, from the left end toward the right end thereof, as viewed from in front—from the right end toward the left end in Figure 18. In the first part of the travel of carriage 132 in the direction stated, the leading edge of extension 165 of plate 145 displaces cam 411 (Figure 18) forwardly. That swings trip lever 406 clockwise and bill 405 thereof depresses finger 402 of latch member 394 (Figures 3 and 4B), thereby releasing plate 364. Tension spring 365 then moves plate 364 inward, thereby moving rack bar 468 inward a further distance of one tooth 470 thereof, by means of pawl 462. In such further inward movement of rack bar 468, cam element 527 of cam member 526 turns the holding pawl 471 to releasing position. Tension spring 472 then returns rack bar 468 to its extreme outer position. In the first part of the outward movement of rack bar 468, cam 508 (Figures 3 and 11) is withdrawn from beneath the roller 509, and the plunger 515 is returned to its normal raised position by compression spring 518. In the continued outward movement of rack bar 468, stud 525a (Figures 3 and 4) picks up finger 525 of cam member 526, and finger 525 picks up finger 494 of latch member 495. The cam member 526 is then returned to its normal position, releasing holding pawl 471 for engagement with teeth 470 of rack bar 468, and the latch member 495 is returned to latching position, with hook bill 497 thereof engaged under stud 498 secured to the third pick-up plate 500. In that connection, when plate 364 of distributor 230 is released and moves inward, the angle lever 426 is then held in position by holding lever 418, with its inner arm raised and holds the first pick-up plate 442 in its raised position. The second and the third pick-up plates 491 and 500 drop when plate 364 moves inward. However, when the rack bar 468 approaches its outermost position, it depresses cam element 486 (Figure 10) and raises the second pick-up plate 491 and, with it, by means of the fingers 506 and 507, the third pick-up plate 500. The body portion of rack bar 468 is of proper width and lengthwise extent to assure that the third pick-up plate 500 will be in its fully raised position in good time to assure that hook bill 497 of latch member 495 will certainly pass beneath stud 498 in the latter part of the outward movement of rack bar 468. It will be understood, from what has been said, that when each pin is delivered by the distributor 230 to the pin receiving table 262, the plate 364 is moved to and latched in its outer position, swinging cam arm 478 (Figures 30 and 10) to its outer position, thereby raising and holding raised all of the pick-up plates which may be in lowered position at the time plate 364 is released. Also, in the swinging movement of the cam and shift lever 436 clockwise (Figure 10) for raising the first pick-up plate 442, cam element 435 displaces stud 434 downward. That swings locking pawl 430 to the right (Figure 4) and releases the inner arm of angle lever 426. Immediately thereafter, in the continued movement of lever 436, cam element 445 thereof contacts pin or stud 443 (Figure 10) and raises plate 442 and, with it, the inner arm of angle lever 426, the outer arm of which is then held depressed by the holding lever 418, as above explained.

When the plate 364 of the distributor 230 has been released, preliminary to delivery thereto by carriage 132 of the first pin of a set of pins, the rack bar 468 is returned to its outermost position and the distributor is then conditioned for reception of that pin. In the continued travel of carriage 132 along track 130 toward the right, as viewed from in front—the left in Figure 18—plate 145, then in lowered position, passes beneath cam member 256 and the rollers 125 on the lower ends of rods 124 of the latch plates for the pin boxes 98 (Figures 12 and 13). The neck of the pin in the carriage enters the slots 362 and 376 of the plates 364 and 360 and moves therealong, in the further travel of carriage 132. The neck of the pin successively displaces and moves outward beyond pawls 380 and 385 and then contacts plate 364 at the inner end of slot 362. The pin is then pulled out of carriage 132 and is suspended by its neck in distributor 230. Soon thereafter, roller 164 (Figures 14 and 15) contacts trip lever 387 and swings it in clockwise direction, as viewed in Figure 18, moving detent 389 to releasing position, in which it is held by continued contact of roller 164 with the lower arm of trip lever 387. That releases distributor 230 for rearward swinging movement, but it is then still held in its forward position by torsion spring 361f (Figure 4A)

Shortly after roller 164 contacts trip lever 387, and in the continued travel of carriage 132, the carriage contacts arm 415 of the trip lever 416 (Figures 4 and 10). In the further travel of carriage 132 trip lever 416 is turned clockwise and finger 417 thereof swings the holding lever 418 to its inoperative or releasing position. That releases the outer portion of arm 425 of the angle lever 426, the inner portion of which drops down so that roller 428 is now in its lowered position, disposed to be picked up by one of the cam strips 350 of the pin receiving table 262. Also, when the angle lever is released, the first pick-up plate 442 drops to its lowered position, in which its lower edge is disposed to clear the cam strips 350. The table 262 is now rotating, as above explained, and one of the cam strips 350 picks up roller 428 and swings distributor 230 rearward a short distance over table 262. This rearward movement of distributor 230 moves the abutment member 439 (Figures 3 and 14) clear of arm 223 of latch 219. At that time carriage 132 reaches its extreme position to the right, as viewed in Figure 14, and stud 161ª contacts finger 237 of detent element 217 of arm 214 and swings the latter outward, in which position it is then held by latch 219. Also, as arm 214 is swung outward, bracket 161 passes over bill 228 of latch member 225, which then extends through slot 162 of bracket 161 and engages the latter, holding carriage 132 in its right hand position. The outward movement of arm 214 raises shift lever 211 (Figure 17) thereby declutching drum 189 from shaft 190. Also, as the carriage reaches its extreme right hand position (Figure 14) arm 154 of latch 152 contacts cam element 242 of finger 243 and is turned into releasing position. Plate 145 of carriage 132 is then raised and the edge of the bill of latch member 152 is held in contact with the adjacent edge of plate 145 by tension spring 153. Carriage 132 is now held at the right hand end (Figures 14 and 17) of track 130, with the drum 189 declutched from shaft 190 as above explained. The clutch member 198 is still engaged, however, and the pin receiving table 262 continues to rotate with accompanying rearward swinging movement of distributor 230. As the distributor swings rearward, it displaces stop arm 250 toward the left (Figure 8) to about its position indicated in dotted lines. Distributor 230 is moved by cam strip 350 rearward a slight distance beyond stop arm 250, which then returns to its normal full line position, and cam strip 350 then passes out of contact with roller 428. The distributor then moves forward a slight distance, into contact with arm 250, by which it is then held in its position indicated in dotted lines. When the distributor 230 reaches its position slightly rearward of stop arm 250, and just before cam strip 350 passes out of contact with roller 428, the cam abutment 440 of distributor 230 depresses latch member 225 and disengages it from bracket 161. Since the drum 189 is now declutched from shaft 190, as above explained, the carriage 132 is now moved along track 130 toward the left end thereof, as viewed in Figure 14, as will be explained more fully later.

In the continued rotation of table 262 plunger 322 of one of the three outer pin receiving buckets of table 262 picks up the first pick-up plate 442 (Figure 10) and the distributor 230 is then swung further rearward in the continued rotation of table 262. As the pin bucket associated with the plunger 322 in engagement with pick-up plate 442 approaches a position in vertical alignment with the pin suspended at the outermost or first station of the distributor 230, the camming edge 446 (Figures 3 and 8) of plate 364 contacts roller 447. In the continued rearward swinging of distributor 230, plate 364 is forced outward, into its outer position in which recesses 377 thereof are in register with recesses 363 of plate 360. Plate 364 reaches that position when the pin bucket is in vertical alignment with the pin suspended in the distributor 230 at the first station thereof. At that time the pin is released and drops into the underlying bucket of table 262. When the pin drops into the pin bucket 307 (Figures 20 and 22), it moves the cam plate 310 outward through slot 310ª. The pin 315 then enters the substantially vertical portion of the cam slot 314 and the plunger 322 moves downward by gravity to retracted position. When plunger 322 is retracted in the manner stated, the pick-up plate 442 (Figure 10) is released. The distributor 230 is then swung forward (Figures 4A and 8) by torsion spring 361f. If the carriage 132 is not then at the left end of its track 130, as will be explained more fully later, the stop arm 250 will be in its full line position shown in Figure 8 and will stop the distributor at its position indicated in dotted lines. In such case, when the carriage 132 is returned to the left end of track 130, it contacts finger 250ª (Figure 14) of stop arm 250 and swings the latter to, and holds it in, its releasing position indicated in dotted lines in Figure 8. Normally, the stop arm 250 is held in releasing position by carriage 132, in the manner stated. When the pick-up plate 442 (Figure 10) is released by the downward movement of plunger 322, or the distributor is released from the stop arm 250, as the case may be, the distributor is swung into its full forward or outer position, in which it is then latched as previously explained. That completes the operation of delivering the first pin of the new set to the pin receiving table 262 by the distributor 230.

It will be remembered that when the distributor 230 has been swung rearward by cam strip 350 to about its dotted line position of Figure 8, the cam member 440 thereof (Figures 3 and 14) contacts cam 229 of latch 225 and depresses it into releasing position. The cam member 440 then is moved clear of cam 229, in the rearward swinging of distributor 230. When latch 225 is depressed, as just stated, it is disengaged from bracket 161 of carriage 132, which is then free for travel toward the left end of track 130. The weight 185 (Figure 18), previously raised in the travel of the carriage toward the right end of track 130, as viewed from in front—the left end in Figure 18—then descends and, through pulley 184b and cable 183, pulls carriage 132 along track 130 toward the cam 411. At that time, one or more of the pin boxes 98 (Figures 6, 12 and 13) contain pins delivered thereto in the manner previously described. The rods 124 of the latch plates 102 of such pin boxes 98 then extend downward and rearward, with the rollers 125 at the lower ends thereof disposed in the rearward portions of the slots 126 (Figure 18) in plate 127. As the carriage 132 travels along track 130 toward the right end thereof, as viewed in Figure 18, the then leading edge of extension 165 (Figure 15) of plate 145, then in raised position, contacts roller 125 (Figure 18) of the first box 98 having a pin in it. The roller 125 is then moved forward in its slot 126 and enters notch 166 of extension 165, stopping carriage 132 in position under that pin box. The forward movement of roller 125 withdraws the corresponding latch plate 102 from beneath the doors 99 of pin box 98, as previously described. The doors 99 then swing downward into open position and the pin is delivered to carriage 132, and doors 99 are then closed by torsion springs 101. The pin drops into cup 151 (Figure 16) and moves plate 145 to its lowered position, below the roller 125, at which time the bill of latch member 152 engages over the edge portion of plate 145. That releases the carriage 132 which then resumes its travel toward the right end (Figure 18) of track 130. As the carriage 132 travels in that direction extension 165 of plate 145 passes beneath cam member 256 and then displaces cam member 411 forwardly. At that time, however, the distributor is being swung rearward over the pin receiving table 262, as previously described, and the forward movement of cam member 411 is ineffective. The carriage 132 then continues its travel to the end of the track and, during this portion of its travel, contacts the depending finger 250[a] (Figure 14) of stop arm 250, swinging the latter to its position indicated in dotted lines in Figure 8, and holding it there. The carriage is then so disposed that the then leading edge of extension 165 of plate 145—the right hand edge in Figure 15—is a short distance to the right, as viewed in Figure 18—the left in Figure 8—of cam member 411. When plunger 322 is moved down, releasing the first pick-up plate 442 (Figure 10), as has been described, distributor 230 is swung into its forward position and latched there, as explained above. Since plate 364 of distributor 230 has been moved to its outer position, and latched there, incident to delivery of the first pin to table 262, the distributor 230 clears stop arm 250 when it is swung into its forward position.

When the distributor 230 reaches its forward position, the cam member 440 thereof (Figure 14) contacts cam 229 of latch member 225 and then passes forward beyond it. The adjustable abutment 439 then moves latch member 219 to releasing position and tension spring 216 swings arm 214 counter-clockwise, thereby lowering shift lever 211 (Figure 17) and clutching drum 189 to shaft 190, as before. The carriage 132, with a pin in it, is then pulled along track 130 toward the right end (Figure 14) thereof, by the cable 182 as it is wound onto drum 189. In the first part of the travel of carriage 132 finger 250[a] of stop arm 250 is released and arm 250 is moved to its full line position of Figure 8. At about the same time extension 165 of plate 145 moves cam member 411 forward (Figure 18), swinging lever 406 clockwise and thereby moving bill 405 thereof downward so as to depress finger 402 of latch member 394 (Figures 3 and 4B). That releases plate 364 of distributor 230, which plate is then moved to its inner position by tension spring 365. When plate 364 was moved to its outer position, in delivering the first pin to table 262, the pawl 462 was engaged with the first or innermost one of the teeth 467 of rack bar 468. Consequently, when plate 364 now moves inward the rack bar 468 is moved inward the distance of one tooth 470 thereof by pawl 462 and is then latched in that position by holding pawl 471. The pawl 462 is then moved to disengaged position by post 465 and remains ineffective in the remainder of the inward travel of plate 364. In the continued travel of carriage 132 to the right (Figure 14)—the left in Figure 18—extension 165 of plate 145 (Figure 15) passes beneath the cam member 256 and the rollers 125 at the lower ends of rods 124. As the carriage 132 continues advancing in the direction indicated, the pin is pulled therefrom at the first—outward—station of distributor 230, roller 164 (Figure 14) contacts lever 387 (Figure 18) releasing distributor 230 for rearward swinging movement and the carriage 132 contacts arm 415 (Figure 4) of the crank lever 417 thereby moving the holding lever 418 to releasing position, as has been explained. The inner or rearward arm of angle lever 426 then drops, lowering roller 428 into operative position and is then held down by pawl 430, and the first pick-up plate 442 (Figure 10) also drops to operative position. The drum 189 (Figure 17) is then declutched from shaft 190, plate 145 of carriage 132 is released from latch 152 and moved into raised position, and carriage 132 is latched in position at the right end of track 130 (Figure 14). In the continuing rotation of pin receiving table 262 (Figures 8 and 17) a cam strip 350 picks up roller 428 and swings distributor 230 rearward slightly beyond its dotted line position indicated (Figure 8), in which it is temporarily held by stop arm 250, and then passes beyond roller 428. At about that time the carriage 132 is released by cam member 440 of the distributor 230 (Figure 14) and is returned to the left end of track 130 and in its travel in that direction receives a pin, and moves stop arm 250 to its dotted line position of Figure 8, as explained above. Shortly after cam strip 350 passes out of contact with roller 428, the plunger 322 of one of the two remaining outer buckets of pin receiving table 262 picks up the first pick-up plate 442 (Figure 10) and swings distributor 230 a further distance rearward, into its full line position of Figure 8. As the distributor 230 reaches that position, plate 364 is moved into its outer position and latched there, the pin drops into the underlying bucket, and the distributor 230 is then returned to its forward position and latched there; as before. The carriage 132, with the third pin in it then moves toward the right end (Figures 8 and 14) of track 130 and the third pin is delivered to the third outer bucket of table 262 in the same manner as the first and second pins. In the first part of the travel of carriage 132 to the right, with the third pin in it, plate 364 (Figure 3) of distributor 230 is released and moved inward, and the rack bar 468 is moved inward a further distance of one tooth 470 thereof. That completes delivery of the pins to the three outer buckets of table 262.

After the third pin has been delivered by distributor 230, the carriage is at the left end (Figures 8 and 14) of track 130, with a pin in it, the distributor 230 (Figure 3) is latched in its forward position with plate 364 thereof latched in its outer position, and drum 189 (Figure 17) has been clutched to shaft 190; as has been explained. In the first part of the travel of carriage 132 to the right, plate 364 (Figure 3) of distributor 230 is released and moved inward, as before. The inward movement of plate 364 moves the rack bar 468 inward to the left as viewed in Figure 3 a further distance of one tooth 470 thereof, into position clear of cam 486 (Figures 3 and 10) of the lever 487, cam arm 478 having been previously moved clear of both of the cam elements 486 and 476 as above described. That releases lever 487, as previously described, and the second pick-up plate 491 then drops to its lowered operative position. The rack bar 468 is now disposed to contact the downwardly extending bill indicated in dotted lines of pawl 385 (Figure 3) locking it against turning movement counter-clockwise. In the continued travel of carriage 132 the pin is pulled from carriage 132 at the second station of the distributor 230, the distributor 230 is released for rearward movement, and the holding lever 418 (Figures 4 and 10) is released with accompanying downward movement of the inner arm of angle lever 426 and of the first pick-up plate 442, as before. The roller 428 is then picked up by one of the cam strips 350 (Figures 8 and 17), the distributor 230 is swung rearward and temporarily held in its full line position of Figure 8 by stop arm 250, the drum 189 is declutched from shaft 190, and the carriage 132, previously latched in position at the right end (Figure 14) of track 130 is released and returned to the left end thereof; as previously explained. Shortly after cam strip 350 passes out of contact with roller 428, a plunger 322 of one of the six intermediate buckets of table 262 picks up the second pick-up plate 491. In that connection, it will be noted (Figure 10) that pick-up plate 491 is disposed inwardly of distributor 230 beyond the first pick-up plate 442, which is disposed to clear the plunger 322 of the six intermediate buckets. Also, at the time that the second pick-up plate 491 is released and drops down, the three outer buckets of the table 262 contain pins and the plungers 322 thereof are then in their retracted lowered positions and will not pick up plate 442. It will be understood, from what has been said that while pins are being delivered by distributor 230 to the six intermediate buckets of table 262, the first pick-up plate 442 remains ineffective and the third pick-up plate 500 is held in its raised inoperative position by latch member 495 (Figure 4) as has been explained.

The distributor 230 is swung rearward to its full line position of Figure 8, the fourth pin is delivered thereby to one of the intermediate buckets of table 262 and the distributor 230 is then returned to and latched in its forward position. During the first part of the travel of carriage 132 for delivering the fifth pin to distributor 230, plate 364 (Figure 3) is released and moves inward of distributor 230, thereby moving the rack bar 468 inward a further distance of one tooth 470 thereof, as explained above. The operation is the same in delivering a pin to each of the six intermediate buckets of table 262, and the description thereof need not be repeated here.

It will be understood, from what has been said, that incident to delivery of each pin by distributor 230 to table 262 all of the pick-up plates previously released and the inner arm of angle lever 426 are raised, and upon return of distributor 230 to its forward position and release of plate 364 thereof, the rack bar 468 is moved inward a distance of one tooth 470 thereof. Accordingly, after the ninth pin has been delivered to table 262 by distributor 230 (Figure 3), but before plate 364 has been released for inward movement subsequent to delivery of the ninth pin, rack bar 468 has been moved inward a distance corresponding to eight of the teeth 470 thereof, into position with cam 508 (Figure 11) in proximity to roller 509 of the lever 510. The carriage 132 is then moved along track 130 toward the right end (Figures 8 and 14) thereof for delivering the tenth pin to distributor 230. In the first part of the travel of carriage 132 in that direction, plate 364 (Figure 3) is released and moved inward. That moves the rack bar 468 inward a further distance of one tooth 470 thereof. During this inward movement of rack bar 468, cam 508 passes beneath roller 509 projecting plunger 515 downward below distributor 230, and bill 497 of latch member 495 (Figure 4) is withdrawn from beneath stud 498 releasing the third pick-up plate 500 (Figure 10), which then drops down to operative position. The pin is pulled from carriage 132 in the further travel thereof and is then suspended in the distributor 230 at the innermost or third station of the latter. In the continued travel of the carriage toward the right (Figure 14) (left Figure 18), roller 164 actuates trip lever 387 and releases distributor 230 for rearward swinging movement. The carriage 132 then actuates the crank lever 415, which turns holding lever 418 to releasing position. Shortly thereafter, the carriage is latched in position at the right end (Figure 14) of track 130 and drum 189 (Figure 17) is declutched from shaft 190, as has been explained. When holding lever 418 is moved to releasing position, the inner arm of angle lever 426 moves downward, lowering roller 428 (Figure 4) into operative position, and the first pick-up plate 442 (Figure 10) also drops to lowered position. Also, at this time, the second pick-up plate 491, previously released as explained above, is in lowered position. Since the plungers 322 of the three outer and the six intermediate buckets of pin receiving table 262 are now all in lower retracted position, both of the plates 442 and 491 are now ineffective. In the continued rotation of pin receiving table 262 (Figures 8 and 17), one of the cam strips 350 picks up the roller 428 and swings distributor 230 rearward into its dotted line position of Figure 8, in which it is temporarily held by stop arm 250, as has been explained. Shortly after cam strip 350 passes out of contact with roller 428, post 529 (Figure 8) fixed on pin receiving table 262 picks up arm 501 (Figure 10) of the third pick-up plate 500. It will be noted that arm 501 extends inward of distributor 230, and the plates 491 and 442 are disposed to clear post 529. The post 529 swings the distributor 230 a further distance rearward into its full line position of Figure 8. As the distributor 230 reaches that position, plate 364 thereof is moved into its outer position, by contact of camming edge 446 thereof (Figures 3 and 8) with roller 447, and is then latched in that position. When plate 364 reaches its outer position, the pin is released and drops into the underlying center bucket of table 262. As the pin enters the center bucket, it trips the latches 270 (Figure 19) and releases ring 266. The ring, and with it the center bucket, with the pin in it, moves downward and projects the plungers 303 and 305 upward above table 262, plunger 305 being then disposed in front of plate 500. Since all of the pick-up plates, including the third plate 500, were raised by the cam arm 478 (Figures 3 and 10) in the outward movement of plate 364, and are now held raised by that arm, plunger 305 is projected above table 262 to a sufficient extent to assure contact thereof with arm 501 of plate 500 when the latter is in its raised position. As table 262 continues to rotate the plunger 305 picks up plate 500 and continues swinging of distributor 230 rearward until it reaches its most rearward position, indicated in dot and dash lines in Figure 8, in which it is then held by hook 334, as has been explained. As distributor 230 reaches its rearmost position just mentioned, cam 531 (Figures 3 and 17) thereof contacts roller 206 of shift lever 203 and declutches pinion 196 from shaft 69. That stops rotation of pin receiving table 262, which is then latched in predetermined angular position by plunger 303 (Figures 8, 19 and 21), in cooperation with bill 340 of hook member 341 and gravity pawl 532, in the manner previously described. That concludes the operation of delivering a set—ten—of pins to the pin receiving table 262. It will be understood, from what has been said, that the table 262 rotates continuously while a set of pins is being delivered to it by the distributor 230, and is stopped only after receiving the tenth pin.

Upon completion of the operation of delivering a set of pins to table 262, as above explained, this table is held stationary in predetermined angular position, the setting up table 542 (Figure 9) is in its intermediate position with rollers 744 of frame 543 thereof resting upon arms 719 (Figure 32) of sleeves 718, and is also then held in its rearward position by latch bar 551 and arm 550 (Figure 23), the pin gripping members 560ª and 560ᵇ (Figures 24 to 26) of the units 560 are in full open position, latch plates 616 are held raised by fingers 622, camming rails 627 are down, detents 610 are in engagement with ratchet wheels 582, the gripping plates 596 and the feelers 625 are in their retracted outer positions, and the sweep 650 (Figures 1, 30 and 32) is in its neutral raised position, with the forward rollers 660 thereof in contact with cam hooks 705. The machine is now conditioned for either a resetting operation or a dead wood operation. The resetting operation, initiated by energizing solenoid 555 (Figure 23) has been described in detail and requires no further description here.

A dead wood operation is performed after a ball, other than the last ball of a frame, has been played and pins are left standing on the alley. The dead wood operation is initiated by energizing solenoid 763 (Figure 32A) conveniently by briefly closing a suitable switch located adjacent the foul line, as previously noted. Plunger 764 of solenoid 763 is then forced downward, raising latch bolt 728 and thereby releasing rod 714 for movement forwardly along channel rail 662 (Figures 1, 2 and 32). The cam hook 705, rod 707, rod 714 and associated parts are then moved as a unit forward along channel rail 662, by the sweep 650 (Figures 1, 2 and 3) urged in that direction by tension springs 690, then under substantial tension. The sleeves 718 are moved forwardly with rods 714, by compression springs 721 and the flanged bushings 723. When sleeves 718 have been moved forward a short distance, arms 719 are withdrawn from beneath rollers 744 (Figure 9) releasing table 542, which then moves down to its dead wood position R indicated in dotted lines in Figures 5 and 6. In the continued forward movement of cam hooks 705 they are cammed up into releasing position, out of the path of travel of the forward rollers 660 of the sweep, which then passes forward beyond cam hooks 705. The rods 707 and 714 and associated parts, including sleeves 718 and hooks 705, are then returned to their normal positions by the compression springs 709 and 725.

In the continued forward travel of sweep 650, the forward rollers 660 thereof contact arms 675 of plates 676 (Figure 31) and move the latter into open position, in opposition to tension springs 680. When rollers 659 (Figure 30) of sweep 650 reach the openings 678 provided by the forward movement of plates 676, they pass downward through such openings and the sweep is then disposed in its substantially vertical operative position. When the sweep 650 swings downward to operative position, arm 675 of one of the plates 676 (Figure 31) contacts arm 834 of pull rod 838 and moves it forward. That swings lever 840 (Figure 30) counter-clockwise thereby clutching drum 694 to shaft 695. The cables 691 are then wound onto drum 694 and the sweep 650 is moved rearward along the channel rails 662. In the meantime the table 542 has moved downward and picked up the standing pins or live wood and has been returned to its intermediate position, clear of the sweep before the latter, in its rearward stroke, reaches the pin area of the alley, as will be now explained.

At the start of the dead wood operation, the table 542 is in its intermediate vertical position and is held in its rearward position by latch bar 551 (Figures 23 and 34) and arm 550, with hooks 824ª engaged over stud rollers 825ª of rails 826. When solenoid 763 (Figure 32A) is energized, table 542 is released for downward movement, in the manner described above. As table 542 moves downward it carries with it the rails 826, the rounded nose of the respective latches 828 being forced out of the corresponding recess in the edge of the rail at the start of downward movement thereof. Table 542 then continues moving downward to its dead wood position R (Figures 5 and 6), in which it is stopped by contact of adjustable stops 831 (Figure 23) with blocks 832, its descent being cushioned somewhat, in the latter part of its down travel, by tension springs 822. As table 542 moves downward arm 900 of multiple crank lever 901 (Figure 38) contacts finger 903 at the lower end of rail 904. The rail 904 then moves downward with table 542 until the latter is but a short distance above its dead wood position, with the pins standing on the alley extending upward through the openings in table 542. At that time, the adjustable abutment 906 contacts block 908, stopping down travel of rail 904. The table 542 then continues to move down for a short distance and the crank lever 901 is then turned clockwise.

It will be remembered that the pin gripping members 560ª and 560ᵇ (Figures 9, 24, 25 and 26) of the respective units 560 are now in their fully opened positions, with arm 872 (Figure 37) in contact with the button of switch 875, holding it open; as previously explained. At that time, the rearward end portion of arm 872 underlies the left trip finger 913 (Figure 38) of arm 913ª. Accordingly, when the multiple crank lever 901 is turned clockwise, as above, arm 872 is swung downward into position clear of the button of switch 875, which then closes and sets the motor 572 (Figure 23) into operation. The pin gripping members 560ª and 560ᵇ then move toward each other, in closing direction, and the nut 808 travels toward the pairs of motor starting field reversing jaws 886. In the first part of the closing movement of pin gripping members 560ª and 560ᵇ, the flange 620 of the respective latch plates 616 (Figure 25) is moved clear of trip finger 622. The latch plate 616 is then swung down into latching position at the inner face of flange 615ª of angle finger 615 and the feeler 625 is projected inward beyond gripping plate 596, by tension spring 618. At this time the camming rails 627 are down and gripping plates 596 are in retracted position, the arms 605 are depressed and the detents 610 are engaged with ratchet wheels 582. In the continued travel of nut 808 (Figures 23, 29 and 37) toward jaws 886, pawl 642 contacts roller 641, depressing arm 640 and raising the camming rails 627. But the gripping plates 596 (Figures 24 to 26) are then latched in retracted position, by the latch plates 616 and angle fingers 615, effective for holding arms 605 depressed with detents 610 engaged with ratchet wheels 582. The gripping members 560ª and 560ᵇ continue travelling in closing direction and the feelers 625 thereof contact the pin standing on the alley between them. When that occurs, the feeler 625 is swung outward into retracted position and held there, and latch plate 616 thereof is swung upward into releasing position, thereby releasing the gripping plate 596, which is then swung into its projected inner position by tension spring 601. That stops the inward or closing movement of the pin gripping member. If the pin between the members 560ª and 560ᵇ is off spot, as frequently happens, one of those members will be stopped before the other thereof, as will be obvious. Whether the pin is off spot or on spot, the gripping members 560ª and 560ᵇ will, in either case, be stopped at opposite sides of and equidistant from the pin between them. Shortly after the pin gripping members 560ª and 560ᵇ have been stopped as just described, the pawl 642 (Figures 23, 29 and 37) in the continued travel of nut 808 toward jaws 886, passes beyond roller 641 and the camming rails 627 are moved to lowered position by tension springs 632. That depresses arms 605 (Figures 24 to 26), which are then held depressed by the camming rails 627, with the detents 610 engaged with the ratchet wheels 582. The gripping members 560ª and 560ᵇ then resume their travel in closing direction, and move into fully closed position with the shoulder and neck portion of the pin P gripped firmly between the gripping plates 596 thereof, as in Figure 26. During travel of the nut 808 (Figure 37) toward the pairs of motor field reversing jaws 886, the arm 872 (Figures 37 and 38) passes beyond the left finger 913 of arm 913ª and is returned, by compression spring 884 to its normal position, in which it is then above the other finger 913 of arm 913ª. The motor 572 continues in operation, after the first standing pin has been securely gripped between the gripping plates 596 of members 560ª and 560ᵇ, for a sufficient length of time to assure that all of the standing pins have been so gripped. When that has been done, in the continued travel of nut 808 toward the pairs of jaws 886, foot 890 of finger 877 moves the button of switch 888 inward, briefly closing and then opening that switch, and immediately thereafter arm 872 moves the button of switch 876 inward, opening that switch and stopping motor 572. The table 542 is now in its dead wood position, with all of the standing pins or live wood, firmly gripped by the units 560.

When the switch 888 is briefly closed, as above, the solenoid 793 (Figure 34) is energized and moves the rail 781 downward, clutching the drum 768 to shaft 695. The cables 769 are then wound onto drum 768 and table 542 is moved upward. In the upward travel of table 542 rail 904 (Figure 38) is returned to its raised position, by tension spring 909, and the crank lever is turned counter-clockwise by tension spring 910. The right hand finger 913 of arm 913ª, in the upward movement thereof, passes above the then overlying arm 872, as permitted by the tension spring 914, which is quite light relative to compression spring 885 (Figure 37), without displacing arm 872 from its normal position, and is then disposed in overlying relation to and above arm 872. Also, as the table 542 moves upward the rails 826 (Figure 23) are returned to normal raised position and held there by the latches 828. As the table 542, in its up travel, approaches its normal intermediate vertical position, the rollers 744 of frame 543 thereof contact the upwardly and forwardly inclined camming surfaces 720 (Figure 32) of arms 719. The sleeves 718 are then forced rearward, in opposition to the compression springs 721. When rollers 744 pass above arms 719, the sleeves 718 are returned to their normal forward position, by compression springs 721, with arms 719 thereof then underlying rollers 744. At that time, or soon thereafter, the strong back 630 (Figure 34) of table 542 contacts abutment 782 and raises rail 781, thereby declutching drum 768 from shaft 695. The table 542, with the live pins gripped by the units 560 thereof, is then supported by the arms 719 in its intermediate position.

It will be remembered that the sweep 650 (Figures 1 and 30) was set into operation incident to releasing table 542 for downward movement to pick up the live pins. The pins are picked up and table 542 is returned to its intermediate position, as above described, before the sweep, in its rearward stroke, reaches the pin area of the alley. Thereafter, the sweep, in its continued rearward travel, passes beneath table 542 and sweeps the dead wood and any balls which may be on the alley or in the gutters into the pit elevator basket 665 (Figure 1). When the sweep reaches the end of its rearward stroke, it swings lever 840 (Figure 30) clockwise, thereby declutching drum 694 from shaft 695 and clutching drum 852 to shaft 695, in the same manner as in the resetting or setting up operation. The pit elevator basket 665 is raised and dumped, drum 852 is declutched from shaft 695, and basket 665 is returned to its normal lowered position, in the same manner as in the setting up operation. When drum 694 is declutched from shaft 695, as just described, the sweep 650 is returned to its neutral position by the tension springs 690 (Figures 1 and 30). In the forward travel of sweep 650, the rollers 659 thereof are deflected by the latch members 666 and angle members 667 upward into the channel rails 662, and displace upward the gate members 668, which then drop to closed position behind rollers 659. That swings the sweep into substantially horizontal position, above and clear of the alley. The sweep 650 then moves forward a further distance, until stopped and held by contact of the forward rollers 660 thereof with cam hooks 705 (Figure 32). During this further forward movement of sweep 650, shortly before it reaches the cam hooks 705, it contacts the lower portions of trip arms 735 and swings them in counter-clockwise direction. At that time, sleeves 718 are in their normal forward positions, and pins 738 are at the rearward ends of slots 739 in links 740. Swinging of the trip arms 735 counter-clockwise forces the sleeves 718 rearward, in opposition to compression springs 721, moving the arms 719 rearward from beneath rollers 744 (Figure 9) of frame 543 of table 542. The table 542 then moves downward again to dead wood position in the same manner as before, but this time the sweep is not set in operation and remains in its neutral inoperative position. When the table reaches dead wood position, the multiple crank lever 901 (Figure 38) is again turned clockwise, as before. At this time, the right hand finger 913 of arm 913ª is in overlying relation to arm 872, which is then in position holding the button of switch 876 in, as has been explained. Turning of lever 901 clockwise moves arm 872 downward, in opposition to compression spring 884. That releases the button of switch 876, which then closes, setting the motor 572 (Figure 23) in operation. The pin gripping members 560ª and 560ᵇ (Figure 26) are then moved away from each other, in opening directions, and leave the pins sitting upon the alley in precisely the same positions thereon which they occupied before being picked up. While the pin grippers are moved in opening directions, the nut 808 (Figure 37) is traveling from the pairs of jaws 886 toward the pairs of jaws 879. In the continued travel of nut 808 in the direction stated, pawl 642 (Figures 23 and 29) contacts roller 641 and swings upward and passes over and beyond it, without actuating arm 640. It will be remembered that the camming rails 627 (Figures 24, 25 and 29) are now down, and they remain in that position. In the travel of nut 808 (Figure 37) toward the jaws 879, the blades 878 enter between the respective pairs thereof, for reversing the starting field winding of motor 572 preparatory to a subsequent operation, as has been explained, and arm 872 passes beyond the right finger 913 (Figure 38) of arm $913_a$. The arm 872 is then returned to its normal position, by compression spring 884, above arm $913_a$ and in the plane of the button of switch 875 (Figure 37). The pin gripping members $560_a$ and $560_b$ (Figures 24, 25 and 26) continue their travel to full open position and, as they reach that position, the flanges 620 of latch plates 616 contact trip fingers 622 and the latch plates 616 are swung upward into releasing position. The camming rails 627 are still down, as above noted, and the various parts of the pin gripping members now are in the same positions as at the start of the resetting operation, previously described. Shortly before the pin gripping members $560^a$ and $560^b$ reach their fully opened position, in the continued travel of nut 808 (Figure 37) toward jaws 879, the foot 890 of finger 877 moves the button of switch 889 inward, thereby briefly closing and then opening it, and shortly thereafter arm 872 moves the button of switch 875 inward, thereby opening that switch and stopping motor 572 (Figure 23). When the switch 889 is briefly closed, the solenoid 793 (Figure 34) is energized and moves rail 781 downward, clutching drum 768 to shaft 695. The table 542 is then raised by cables 769 and the rails 826 and 904 (Figures 23 and 38) are returned to their raised positions. In the up travel of table 542 the crank lever 901 is turned counter-clockwise by tension spring 910, as before, and the left finger 913 of arm $913^a$ is moved upward into overlying relation to and above arm 872. As the table 542 approaches its normal intermediate position, in its upward travel, the rollers 744 (Figure 9) of frame 543 thereof contact the cam surfaces 720 (Figure 32) of arms 719 and move the sleeves 718 rearward, in opposition to compression springs 721. When rollers 744 pass above arms 719, sleeves 718 are returned to normal position, by compression springs 721, with arms 719 then underlying rollers 744. As the table 542 moves further upward a short distance, strong back 630 thereof (Figure 34) contacts abutment 782 and raises rail 781, thereby declutching drum 768 from shaft 795. The table 542 is then supported in its normal intermediate position, by rollers 744 resting upon arms 719, and the machine is then conditioned for either a resetting operation or a dead wood operation, as has been explained.

As above indicated, and as will be understood by those skilled in this art, changes in construction and arrangement of parts of the machine above described may be resorted to without departing from the field and scope of my invention, and I intend to include all such variations, as fall within the scope of the appended claims, in this application in which the preferred form only of my invention has been disclosed.

I claim:

1. In a bowling pin setting machine, a vertically adjustable setting up table, a pair of opposed pin gripping members mounted on said table for rectilineal closing and opening movements toward and away from each other, said members having relatively narrow upper gripping elements disposed and adapted to fit about and grip the neck of a pin suspended between them in a raised position of said table and relatively wide lower gripping elements a fixed distance below said upper elements and disposed to grip the neck and shoulder portions of a pin sitting on the alley between them in a lowered position of said table, and means for moving said members toward and away from each other.

2. In a bowling pin setting machine, a vertically adjustable setting up table, a pair of opposed pin gripping members mounted on said table for rectilineal closing and opening movements toward and away from each other, said members having relatively narrow upper gripping elements disposed and adapted to fit about and grip a pin suspended between them in a raised position of said table and relatively wide lower gripping elements a fixed distance below said upper elements and disposed to grip a pin sitting on the alley between them in a lowered position of said table, means for moving said members toward and away from each other, and timing means controlling the movements of said members.

3. In a bowling pin setting machine, a setting up table, a pair of opposed pin gripping members mounted on said table for closing and opening movements toward and away from each other, said members having pin gripping elements disposed to grip a pin sitting on the alley between them, drive means for moving said members toward and away from each other, and control means comprising means disposed to be actuated by either an on-spot or an off-spot pin on the alley for stopping said members in the closing movement thereof at opposite sides of and equidistant from the pin and thereafter permitting closing said members by said drive means into gripping engagement with the pin.

4. In a bowling pin setting machine, a setting up table, a pair of opposed pin gripping members mounted on said table for closing and opening movements toward and away from each other, said members having pin gripping elements disposed to grip either an on-spot or an off-spot pin sitting on the alley between them, and means for moving said members toward and away from each other to independently variable extent comprising means for stopping said members in the closing movement thereof at opposite sides of and equidistant from the pin and thereafter closing said members into gripping engagement with the pin.

5. In a bowling pin setting machine, a setting up table movable to an upper position and a lower pin setting position, a pair of shafts on said table, a pair of opposed pin gripping members on said shafts, drive means for rotating said shafts, operating connections between said shafts and said gripping members for propelling the latter along said shafts toward and away from each other, means for temporarily stopping travel of said gripping members toward each other at positions equidistant from a pin therebetween, timing means associated with said drive means, and means cooperating with said drive and timing means for causing said drive means to move said gripping members after said temporary stoppage thereof a further distance toward each other into gripping engagement with the pin therebetween and then stopping rotation of said shafts and subsequently causing said drive means to move said gripping members away from each other for releasing the pin when said table is lowered to pin setting position.

6. In a bowling pin setting machine, a setting up table movable to an upper position and a lower pin setting position, a pair of shafts on said table, drive means for rotating said shafts, a pair of opposed pin gripping members on said shafts, operating connections between said shafts and said gripping members for propelling the latter along said shafts toward and away from each other, means for disabling said operating connections and thereby temporarily stopping said gripping members equidistant from a pin therebetween, timing means, means actuated by said timing means for enabling said operating connections after said temporary stoppage of said gripping members and thereby causing said drive means to move said gripping members a further distance toward each other into gripping engagement with the pin therebetween and then stopping said shafts and subsequently causing said drive means to drive said shafts in direction effective for moving said gripping members away from each other for releasing the pin when said table is lowered to pin setting position.

7. In a bowling pin setting machine, a setting up table movable to an upper position and a lower pin setting position, a pair of shafts on said table, drive means for rotating said shafts, a pair of opposed pin gripping members on said shafts, operating connections between said shafts and said gripping members for propelling the latter along said shafts toward and away from each other, said connections comprising friction drag means effective for respectively enabling and disabling said connections when held against rotation and released for rotation, timing means driven by said drive means, means for restraining said drag means against rotation and thereby stopping said gripping members equidistant from a pin therebetween, and means actuated by said timing means for releasing said drag means and thereby causing said drive means to move said gripping members a further distance toward each other into gripping engagement with the pin therebetween and for subsequently reversing said drive means and thereby causing the latter to move said gripping members away from each other for releasing the pin when said table is lowered to pin setting position.

8. In a bowling pin setting machine, a setting up table movable to an upper position and a lower pin setting position, a pair of shafts on said table, drive means for rotating said shafts, a pair of opposed pin gripping members on said shafts, operating connections between said shafts and said gripping members for propelling the latter along said shafts toward and away from each other, said connections comprising friction drag means effective for respectively enabling and disabling said connections when held against rotation and released for rotation, timing means driven by said drive means, means limiting movement of said gripping members away from each other, means for restraining said drag means against rotation and thereby stopping said gripping members equidistant from a pin therebetween, and means actuated by said timing means for releasing said drag means and thereby causing said drive means to move said gripping members a further distance toward each other into gripping engagement with the pin therebetween and for subsequently reversing said drive means and thereby causing the latter to move said gripping members away from each other for releasing the pin when said table is lowered to pin setting position.

9. In a bowling pin setting machine, a setting up table movable to an upper position and a lower pin setting position, a pair of shafts on said table, drive means for rotating said shafts, a pair of opposed pin gripping members on said shafts, operating connections between said shafts and said gripping members for propelling the latter along said shafts toward and away from each other, said connections comprising friction drag means effective for respectively enabling and disabling said connections when held against rotation and released for rotation, timing means driven by said drive means, means for restraining said drag means against rotation and thereby stopping said gripping members equidistant from a pin therebetween, and means actuated by said timing means for releasing said drag means and thereby causing said drive means to move said gripping members a further distance toward each other into gripping engagement with the pin therebetween and for subsequently reversing said drive means and thereby causing the latter to move said gripping members away from each other for releasing the pin when said table is lowered to pin setting position and then stopping said drive means.

10. In a bowling pin setting machine, a setting up table movable to an upper position and a lower pin setting position, said table comprising a plate having an opening therein of an area materially greater than the maximum cross sectional area of a pin, a pair of cross threaded shafts alongside said opening, a pair of opposed pin gripping members movable across said opening and comprising upper elements disposed to grip between them the neck of a pin and lower gripping plates of a length approximately the width of said opening and disposed above the latter and to grip between them the neck and shoulder portions of a pin, drive means for rotating said shafts, operating connections between said shafts and said gripping members for propelling the latter along said shafts toward and away from each other, means limiting travel of said gripping members away from each other, means for temporarily stopping travel of said gripping members toward each other at positions equidistant from a pin therebetween, timing means driven by said drive means, and means actuated by said timing means for causing said drive means to move said gripping members a further distance toward each other into gripping engagement with the pin therebetween and for subsequently reversing the drive of said shafts and thereby causing said drive means to move said gripping members away from each other for releasing said pin when said table is lowered to pin setting position.

11. In a setting up table for a pin setting machine, a plate and a pair of opposed gripping members slidably mounted thereon for rectilineal movement toward and away from each other, said members having upper gripping jaws disposed to grip the neck of a pin and lower gripping plates adapted to grip the neck and shoulder portion of a pin, means urging said plates toward projected pin gripping position, means normally holding said plates retracted out of pin gripping position, means for releasing said plates for movement to projected position comprising feelers disposed for contact with a pin in the movement of said members toward each other, means for moving said members toward and away from each other, means actuated by said plates in the movement thereof to projected position effective for stopping said gripping members in positions equidistant from a pin therebetween, and timing means controlling the movement of said gripping members comprising means for moving them from their said stopped positions toward each other into gripping engagement with the pin.

12. In a bowling pin setting machine, a setting up table, a pair of opposed pin gripping members mounted on said table for closing and opening movements toward and away from each other, said members having pin gripping elements disposed to grip a pin sitting on the alley between them, drive means for moving said members toward and away from each other, control means comprising feelers carried by said members disposed to contact either an on-spot or an off-spot pin on the alley between them, means actuated by said feelers responsive to contact thereof with a pin effective for stopping said members in the closing movement thereof at opposite sides of and equidistant from the pin, and timing means controlling the opening and closing of said gripping members comprising means for causing further closing movement by said drive means of said gripping members after stopping thereof into gripping engagement with the pin and for subsequently moving said gripping members by said drive means away from each other for releasing the pin.

KENNETH C. SHERMAN.

REFERENCES CITED

The following references are of record in the file of this patent:

UNITED STATES PATENTS

| Number | Name | Date |
|---|---|---|
| 1,149,318 | Anderson | Aug. 10, 1915 |
| 1,190,644 | Hedenskoog | July 11, 1916 |
| 1,190,649 | Hedenskoog | July 11, 1916 |
| 1,190,651 | Hedenskoog | July 11, 1916 |
| 1,449,012 | Lorenz et al. | Mar. 20, 1923 |
| 1,468,212 | Redfield | Sept. 18, 1923 |
| 1,573,643 | Proch | Feb. 16, 1926 |
| 1,584,030 | Gray | May 11, 1926 |
| 2,017,143 | Bentz | Oct. 15, 1935 |
| 2,081,580 | Diffenderffer | May 25, 1937 |
| 2,300,802 | Parra et al. | Nov. 3, 1942 |
| 2,346,189 | Schmidt | Apr. 11, 1944 |
| 2,359,432 | McNamara | Oct. 3, 1944 |
| 2,445,688 | Parra et al. | July 20, 1948 |